(12) United States Patent
Özden et al.

(10) Patent No.: US 12,215,540 B2
(45) Date of Patent: *Feb. 4, 2025

(54) VIG FRAME SOLUTION WITH FLEXIBLE PORTION

(71) Applicant: VKR HOLDING A/S, Hørsholm (DK)

(72) Inventors: Utku Ahmet Özden, Hørsholm (DK); Jacob Christian Molbo, Hørsholm (DK); Jens Troels Plesner Kristensen, Hørsholm (DK)

(73) Assignee: VKR HOLDING A/S, Horsholm (DK)

( * ) Notice: Subject to any disclaimer, the term of this patent is extended or adjusted under 35 U.S.C. 154(b) by 756 days.

This patent is subject to a terminal disclaimer.

(21) Appl. No.: 17/422,886

(22) PCT Filed: Jan. 13, 2020

(86) PCT No.: PCT/DK2020/050008
§ 371 (c)(1),
(2) Date: Jul. 14, 2021

(87) PCT Pub. No.: WO2020/147899
PCT Pub. Date: Jul. 23, 2020

(65) Prior Publication Data
US 2022/0065026 A1  Mar. 3, 2022

(30) Foreign Application Priority Data

Jan. 14, 2019 (DK) .............................. PA201970020
Jan. 14, 2019 (DK) .............................. PA201970021
(Continued)

(51) Int. Cl.
*E06B 3/54* (2006.01)
*E04D 13/03* (2006.01)
(Continued)

(52) U.S. Cl.
CPC ............ *E06B 3/6612* (2013.01); *E04D 13/03* (2013.01); *E04D 13/031* (2013.01);
(Continued)

(58) Field of Classification Search
CPC ... E06B 3/025; E06B 3/24; E06B 3/54; E06B 3/5454; E06B 3/5481; E06B 3/549;
(Continued)

(56) References Cited

U.S. PATENT DOCUMENTS 2,595,927 A   5/1952  Chapin
2,617,159 A * 11/1952  Leighton ............... E06B 3/5409
                                                   52/204.593
(Continued)

FOREIGN PATENT DOCUMENTS

CN   2835403 Y   11/2006
CN   106760122 A   5/2017
(Continued)

OTHER PUBLICATIONS

International Search Report for corresponding application PCT/DK2020/050008 filed Jan. 13, 2020; Mail date Apr. 3, 2020.
(Continued)

*Primary Examiner* — Ryan D Kwiecinski
(74) *Attorney, Agent, or Firm* — CANTOR COLBURN LLP

(57) ABSTRACT

The present disclosure relates to a vacuum insulated glass (VIG) unit frame assembly (10), wherein said vacuum insulated glass unit frame assembly (1) comprises: a vacuum insulated glass unit (1), and a frame (20) comprising elongated frame profile arrangements (20a-20d, 70) which frames said vacuum insulated glass unit (1) in a frame opening (21). The frame further comprises: —holding parts (6) for fixating said vacuum insulated glass unit (1), and— flexible connection arrangements (7) connecting the holding
(Continued)

Figure 1:
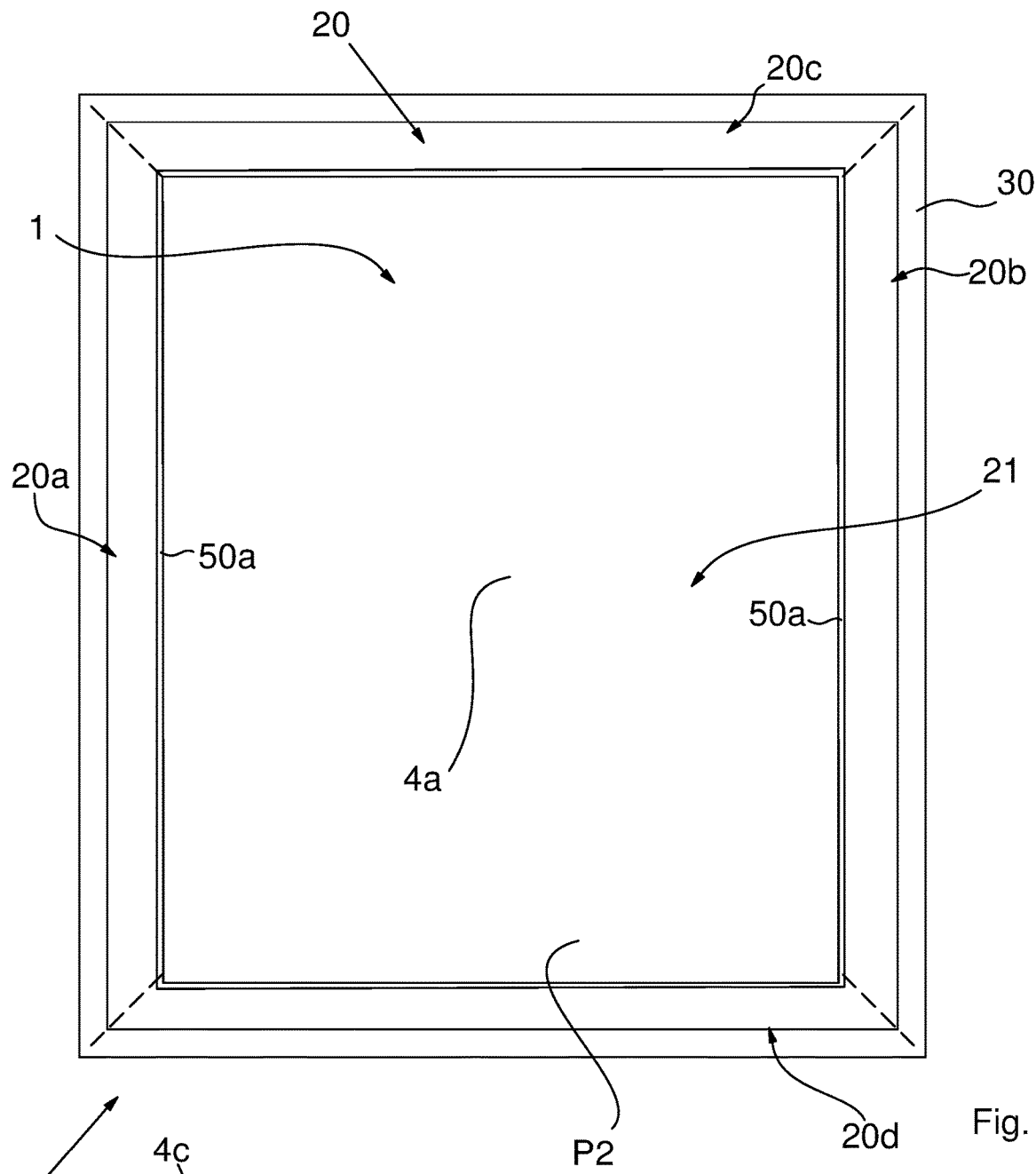

parts (6) to elongated frame profile arrangements (20a-20d). The flexible connection arrangements (7) are configured to flex when said vacuum insulated glass unit (1) exerts a bending moment (M) on the holding parts (6), so that said holding parts (6) will move relative to the elongated frame profile arrangements (20a-20d, 70) to which the individual holding part (6) is connected. The present disclosure moreover relates to a vacuum insulated glass unit and a frame.

18 Claims, 19 Drawing Sheets

(30) Foreign Application Priority Data

| Jan. 14, 2019 | (DK) | PA201970022 |
|---|---|---|
| Jan. 14, 2019 | (DK) | PA201970023 |
| Jan. 14, 2019 | (DK) | PA201970024 |
| Jan. 14, 2019 | (DK) | PA201970025 |
| Jan. 14, 2019 | (DK) | PA201970026 |

(51) Int. Cl.

| E04D 13/035 | (2006.01) |
|---|---|
| E06B 3/02 | (2006.01) |
| E06B 3/14 | (2006.01) |
| E06B 3/56 | (2006.01) |
| E06B 3/62 | (2006.01) |
| E06B 3/66 | (2006.01) |
| E06B 3/677 | (2006.01) |
| E06B 7/23 | (2006.01) |

(52) U.S. Cl.
CPC ....... *E04D 13/0315* (2013.01); *E04D 13/035* (2013.01); *E04D 13/0351* (2013.01); *E04D 13/0354* (2013.01); *E06B 3/025* (2013.01); *E06B 3/14* (2013.01); *E06B 3/5427* (2013.01); *E06B 3/5454* (2013.01); *E06B 3/5481* (2013.01); *E06B 3/56* (2013.01); *E06B 3/62* (2013.01); *E06B 3/6621* (2013.01); *E06B 3/677* (2013.01); *E06B 7/2301* (2013.01); *E06B 7/2305* (2013.01); *E06B 2003/6208* (2013.01); *E06B 2003/6229* (2013.01); *E06B 2003/6238* (2013.01); *E06B 2003/6291* (2013.01); *Y02A 30/249* (2018.01); *Y02B 80/22* (2013.01)

(58) Field of Classification Search
CPC . E06B 3/5427; E06B 3/56; E06B 3/62; E06B 3/6612; E06B 3/66304; E06B 3/5409; E06B 3/6608; E06B 3/677; E06B 2003/2625

See application file for complete search history.

(56) References Cited

U.S. PATENT DOCUMENTS

| 2,781,561 | A | | 2/1957 | Gifford | |
|---|---|---|---|---|---|
| 3,686,795 | A | | 8/1972 | La Barge | |
| 3,861,085 | A | | 1/1975 | Jacob | |
| 4,134,234 | A | | 1/1979 | Auger | |
| 4,134,238 | A | * | 1/1979 | Auger | E06B 3/5409 |
| | | | | | 52/656.5 |
| 4,193,236 | A | * | 3/1980 | Mazzoni | E06B 3/66342 |
| | | | | | 52/204.593 |
| 5,216,855 | A | * | 6/1993 | Richter | E06B 3/5821 |
| | | | | | 52/204.593 |
| 5,373,672 | A | * | 12/1994 | Schulz | E06B 3/5427 |
| | | | | | 52/235 |
| 5,657,607 | A | * | 8/1997 | Collins | E06B 3/66304 |
| | | | | | 52/786.13 |
| 5,891,536 | A | * | 4/1999 | Collins | E06B 3/66304 |
| | | | | | 52/786.13 |
| 6,263,623 | B1 | * | 7/2001 | Weiss | E04D 13/0305 |
| | | | | | 52/200 |
| 6,295,774 | B1 | * | 10/2001 | Lindgren | E04D 13/031 |
| | | | | | 52/204.1 |
| 6,435,360 | B1 | | 8/2002 | Anin | |
| 6,435,630 | B1 | * | 8/2002 | Anin | A47F 3/0434 |
| | | | | | 52/786.13 |
| 6,676,786 | B1 | * | 1/2004 | Collins | E06B 3/6775 |
| | | | | | 156/286 |
| 7,588,653 | B2 | * | 9/2009 | Crandell | E06B 3/24 |
| | | | | | 52/204.5 |
| 7,845,142 | B2 | * | 12/2010 | Theios | E06B 3/64 |
| | | | | | 52/204.6 |
| 7,950,192 | B2 | * | 5/2011 | Glover | B29C 66/72523 |
| | | | | | 52/204.593 |
| 8,181,405 | B2 | * | 5/2012 | Nash | E04F 11/1851 |
| | | | | | 52/800.18 |
| 8,863,440 | B1 | * | 10/2014 | Champlin | F41H 5/26 |
| | | | | | 52/204.53 |
| 9,447,627 | B2 | * | 9/2016 | Thompson | E06B 3/221 |
| 10,415,302 | B2 | * | 9/2019 | Vander Bent, Jr. | E06B 3/5409 |
| 10,597,933 | B2 | * | 3/2020 | Abe | E06B 3/6612 |
| 10,704,320 | B2 | * | 7/2020 | Sønderkær | C03C 27/06 |
| 10,919,236 | B2 | * | 2/2021 | Vaccari | E06B 3/5454 |
| 11,060,341 | B1 | * | 7/2021 | Sprague | E06B 3/549 |
| 11,187,027 | B2 | * | 11/2021 | Hasegawa | E06B 3/663 |
| 11,285,703 | B2 | * | 3/2022 | Jørgensen | B32B 41/00 |
| 11,802,435 | B2 | * | 10/2023 | ?zden | E06B 3/5427 |
| 2003/0037493 | A1 | * | 2/2003 | Guhl | E06B 3/24 |
| | | | | | 52/786.13 |
| 2005/0126093 | A1 | * | 6/2005 | Wagner | E04D 13/0305 |
| | | | | | 52/200 |
| 2007/0032972 | A1 | * | 2/2007 | Glover | B29C 65/7841 |
| | | | | | 702/77 |
| 2009/0324858 | A1 | * | 12/2009 | Jaeger | E06B 3/6612 |
| | | | | | 156/107 |
| 2012/0137607 | A1 | | 6/2012 | Kristensen | |
| 2013/0101759 | A1 | * | 4/2013 | Jones | E06B 3/6612 |
| | | | | | 428/34 |
| 2014/0007396 | A1 | | 1/2014 | Jones | |
| 2014/0069034 | A1 | * | 3/2014 | Jones | E06B 3/585 |
| | | | | | 52/204.593 |
| 2015/0345207 | A1 | * | 12/2015 | Thompson | E06B 3/677 |
| | | | | | 52/204.6 |
| 2017/0002599 | A1 | * | 1/2017 | Thompson | E06B 3/5454 |
| 2017/0268285 | A1 | * | 9/2017 | Abe | C03C 27/10 |
| 2022/0065026 | A1 | * | 3/2022 | ?Zden | E06B 3/5427 |

FOREIGN PATENT DOCUMENTS

| DE | 3202639 | A1 | | 8/1983 | |
|---|---|---|---|---|---|
| DE | 102006020455 | A1 | | 6/2007 | |
| DE | 202009016113 | U1 | | 5/2011 | |
| DE | 202012006687 | U1 | * | 12/2013 | E05C 1/04 |
| DE | 10201400186 | A1 | | 2/2016 | |
| EP | 0418461 | A1 | | 3/1991 | |
| EP | 0421239 | A2 | | 4/1991 | |
| EP | 0472109 | A2 | | 2/1992 | |
| EP | 1298100 | A1 | | 4/2003 | |
| EP | 1908914 | A1 | | 4/2008 | |
| EP | 2169172 | A2 | * | 3/2010 | E04D 13/0354 |
| EP | 2921632 | A1 | | 9/2015 | |
| EP | 3101195 | A1 | | 12/2016 | |
| EP | 3124733 | A1 | | 2/2017 | |
| EP | 3170799 | A1 | * | 5/2017 | C03C 27/10 |
| ES | 2169172 | T3 | * | 7/2002 | A47L 15/4229 |
| FR | 2514057 | A1 | | 4/1983 | |
| FR | 2823789 | A1 | | 10/2002 | |
| FR | 2942843 | A1 | | 9/2010 | |
| FR | 3075245 | A1 | * | 6/2019 | E06B 3/5454 |
| GB | 2264742 | A | * | 9/1993 | E06B 3/5481 |
| GB | 2492380 | A | | 1/2013 | |
| GB | 2521419 | A | | 6/2015 | |

(56) References Cited

FOREIGN PATENT DOCUMENTS

| | | | | |
|---|---|---|---|---|
| JP | 2000064732 A | * | 2/2000 | ............ E06B 3/6205 |
| JP | 2001031449 A | * | 2/2001 | ............ E06B 3/6775 |
| JP | 2001146881 A | | 5/2001 | |
| JP | 2002021437 A | | 1/2002 | |
| JP | 2002255593 A | * | 9/2002 | |
| JP | 2007132637 A | | 5/2007 | |
| KR | 20180128659 A | | 12/2018 | |
| WO | WO-9914169 A1 | * | 3/1999 | ............. C03C 27/06 |
| WO | WO-2011048559 A1 | * | 4/2011 | ............ E04B 2/7401 |
| WO | 2014039642 A1 | | 3/2014 | |
| WO | WO-2014183606 A1 | * | 11/2014 | ............ E06B 3/6621 |
| WO | 2015183863 A1 | | 12/2015 | |
| WO | 2017210701 A1 | | 12/2017 | |
| WO | WO-2020147903 A1 | * | 7/2020 | ......... E04D 13/0351 |
| WO | WO-2020147906 A1 | * | 7/2020 | ............. E04D 13/03 |
| WO | WO-2020147907 A1 | * | 7/2020 | ......... E04D 13/0351 |
| WO | WO-2021228713 A1 | * | 11/2021 | ............. E04D 13/03 |

OTHER PUBLICATIONS

International Search Report for corresponding application PCT/DK2020/050009 filed Jan. 13, 2020; Mail date Mar. 30, 2020.
International Search Report for corresponding application PCT/DK2020/050010 filed Jan. 13, 2020; Mail date Mar. 25, 2020.
International Search Report for corresponding application PCT/DK2020/050011 filed Jan. 13, 2020; Mail date Apr. 7, 2020.
International Search Report for corresponding application PCT/DK2020/050012 filed Jan. 13, 2020; Mail date Apr. 9, 2020.
International Search Report for corresponding application PCT/DK2020/050013 filed Jan. 13, 2020; Mail date Mar. 19, 2020.
International Search Report for corresponding application PCT/DK2020/050014 filed Jan. 13, 2020; Mail date Apr. 14, 2020.
International Search Report for corresponding application PCT/DK2020/050015 filed Jan. 13, 2020; Report dated Mar. 27, 2020.
International Search Report for corresponding application PCT/DK2020/050016 filed Jan. 13, 2020; Mail date Apr. 1, 2020.
International Search Report for corresponding application PCT/DK2020/050017 filed Jan. 13, 2020; Mail date Feb. 18, 2020.
International Search Report for corresponding application PCT/DK2020/050018 filed Jan. 13, 2020; Mail date Feb. 18, 2020.
Written Opinion for corresponding application PCT/DK2020/050008 filed Jan. 13, 2020; Mail date Apr. 3, 2020.
Written Opinion for corresponding application PCT/DK2020/050009 filed Jan. 13, 2020; Mail date Mar. 30, 2020.
Written Opinion for corresponding application PCT/DK2020/050010 filed Jan. 13, 2020; Mail date Mar. 25, 2020.
Written Opinion for corresponding application PCT/DK2020/050011 filed Jan. 13, 2020; Mail date Apr. 7, 2020.
Written Opinion for corresponding application PCT/DK2020/050012 filed Jan. 13, 2020; Mail date Apr. 9, 2020.
Written Opinion for corresponding application PCT/DK2020/050013 filed Jan. 13, 2020; Mail date Mar. 19, 2020.
Written Opinion for corresponding application PCT/DK2020/050014 filed Jan. 13, 2020; Mail date Apr. 14, 2020.
Written Opinion for corresponding application PCT/DK2020/050015 filed Jan. 13, 2020; Report dated Mar. 27, 2020.
Written Opinion for corresponding application PCT/DK2020/050016 filed Jan. 13, 2020; Mail date Apr. 1, 2020.
Written Opinion for corresponding application PCT/DK2020/050017 filed Jan. 13, 2020; Mail date Feb. 18, 2020.
Written Opinion for corresponding application PCT/DK2020/050018 filed Jan. 13, 2020; Mail date Feb. 18, 2020.

* cited by examiner

Fig. 16B-B

VIG FRAME SOLUTION WITH FLEXIBLE PORTION

The present disclosure relates to a vacuum insulated glass unit frame assembly, a vacuum insulated glass unit and a vacuum insulated glass unit frame.

BACKGROUND

Vacuum insulated glass (VIG) units provides several advantages such as good insulated properties and reduced thickness. A VIG unit may typically comprise glass sheets kept separated by support structures arranged in an airtight and evacuated gap between the glass sheets. To provide an airtight gap, an edge sealing is applied along the glass sheet edges so as to enclose the gap between the glass sheets. This edge seal may be made from e.g. a glass frit material such as low melting point glass frit material which is applied along the edges of a glass sheet and then subsequently heated in order to melt the glass material to provide an airtight and strong edge sealing.

Patent document U.S. Pat. No. 9,447,627B2 discloses a window frame unit for vacuum insulated glass unit. A base member and a glazing member of a frame provides a recess wherein a distal edge of a VIG unit is arranged. The recess is disclosed to be designed to accommodate distortion of the VIG unit rather than constraining the VIG unit at the distal edge of the VIG unit. This is obtained by a resilient, flexible tab of a glazing member that is/are snapped into engagement with a base member of the frame, so that the tabs may allow the glazing member to pivot to accommodate distortion of the VIG unit.

Patent documents U.S. Pat. No. 6,435,630 B1 and JP2007132637 discloses other solutions for holding a VIG unit. Patent document EP2169172 B1 discloses a further solution where a frame holds a VIG unit by means of an adhesive at a surface facing a part of the frame.

It however appears that problems still exists when arranging a VIG unit in a frame to provide a window or door for e.g. covering building apertures.

The present disclosure provides one or more solutions where a VIG unit is arranged in a frame, which may e.g. help to improve or ensure the lifetime, such as the estimated lifetime, of the VIG unit, provide a more simple mechanical solution for holding a VIG unit in/at a frame, provide a solution that may be used under varying climatic conditions, and/or provide a solution which is advantageous from a manufacturing point of view.

SUMMARY

VIG units are normally made from glass sheets kept separated by support structures such as pillars arranged in an airtight and evacuated gap between the glass sheets. To provide the airtight gap, an edge sealing is provided along the glass sheet edges so as to enclose the gap between the glass sheets. This edge seal may be made from e.g. a glass frit material such as low melting point glass frit material which is applied along the edges of a glass sheet and then subsequently heated in order to melt the glass material to provide an airtight and strong edge sealing. The edge seal may alternatively be made from a metal seal which is heated to a melting point and then cooled to cure.

The gap(s) between the glass sheets are normally evacuated by means of an evacuation cup connected to an evacuation pump, and the evacuation cup is arranged to cover an evacuation hole in one of the glass sheets for the VIG unit, which is then sealed after the evacuation of the gap. Alternatively, the gap may be evacuated in an evacuation chamber enclosing the entire VIG unit. The gap is normally evacuated to below $10^{-3}$ bar, such as below $10^{-4}$ bar, e.g. to about or below $10^{-3}$ mbar.

The VIG unit is normally subjected to significant temperature differences $\Delta T$ between the VIG unit glass sheets due to the good insulation capabilities of the VIG unit. As the edge seal for sealing the gap between the VIG unit glass sheets is normally very stiff in nature, the temperature difference $\Delta T$ between the glass sheets causes the VIG unit to deflect (also known as thermal bending, thermal deflection or thermal distortion), as the hotter glass sheet of the VIG unit will expand compared to the colder of the glass sheets.

Especially VIG units according to aspects of the present disclosure may provide a $U_g$-value below 0.7 W/(m$^2$K), such as below 0.6 W/(m$^2$K), e.g. below 0.5 W/(m$^2$K) such as below 0.4 W/(m$^2$K), and such VIG units may suffer from increased thermal deflection due to the good insulation provided by means of the VIG unit. This low $U_g$-value may be obtained by means of the evacuation of the gap between the VIG glass sheets, e.g. in combination with one or more one or more of

- One or more low-e coatings such as thin tin dioxide or thin silver layers or any other suitable low e-coating layers at e.g. the inner surface(s) of the glass sheets of the VIG unit facing the VIG unit gap,
- a larger/increased support structure distance, such as above 3 or above 4 centimetres between neighbouring support structures in the VIG unit gap to reduce the number of potential "cold-bridges" provided by the support structures,
- by using support structures of a material having a low thermal conductivity and/or a small size,
- By providing a 3-layer VIG unit (i.e. with two evacuated gaps)
- By providing a Hybrid VIG unit.

The present disclosure relates to a vacuum insulated glass (VIG) unit frame assembly, wherein said vacuum insulated glass unit frame assembly comprises:

a rectangular vacuum insulated glass unit comprising at least two glass sheets separated by a gap between said glass sheets, wherein a plurality of support structures are distributed in said gap and wherein said gap is sealed, and a frame comprising elongated frame profile arrangements which frames said vacuum insulated glass unit in a frame opening. The frame further comprises holding parts for fixating said vacuum insulated glass unit, and flexible connection arrangements connecting the holding parts to elongated frame profile arrangements. Said flexible connection arrangements are configured to flex when said vacuum insulated glass unit exerts a bending moment on the holding parts, so that said holding parts will move relative to the elongated frame profile arrangements to which the individual holding part is connected.

The VIG unit thermally deflect over time due to a temperature difference between the VIG glass sheets. This temperature difference may change over time, and may induce varying stress conditions in the VIG unit. A temperature difference between the VIG unit glass sheets may provide the thermal deflection of the VIG unit edges, and the amount of thermal deflection is dependent on the size of the temperature difference $\Delta T = T1 - T2$, where T1 is the temperature of one VIG unit glass sheet, and the temperature T2 is the temperature of the other VIG unit glass sheet. The operational sign of the resulting temperature difference ΔT determines to which side of the VIG unit frame assembly, the VIG unit's edges deflects relative to the frame opening plane due to the temperature difference.

The present inventors have seen indications that an inappropriate constraining of the VIG unit's thermal deflection along/at the VIG unit edges by the frame assembly may induce a larger stress at the VIG unit edges or corner areas, such as in an edge sealing the VIG unit gap of the VIG unit at the glass sheet edges. This may increase the risk that the VIG unit is damaged over time, so that the reduced pressure in the gap of the VIG unit is released to be that of the ambient pressure of the VIG unit, and this requires a replacement of the entire VIG unit.

For example, the present inventors have seen that the edges of the VIG unit glass sheets may tend to describe an "edge deflection curve" when the VIG unit is subjected to temperature differences, and this may be caused by the properties of the VIG unit such as the rigidity of the edge sealing solution for sealing the VIG gap along the edges of the VIG unit. The edge of the vacuum insulated glass unit may thus thermally deflect in a direction perpendicular to a frame opening plane extending in the frame opening between the elongated frame profile arrangements due to the temperature difference. Tests confirmed that such edge deflection curves occur when a VIG unit is subjected to temperature differences.

At the same time, the VIG unit should be kept sufficiently in the frame assembly so that it does not permanently displace to an undesired position due to gravity or outer forces such as wind gusts (in case it is e.g. used for a door or a window), hails or other objects such as birds, balls or the like provides impacts such as sudden impacts on the VIG unit surface.

The flexible connection arrangement is configured to flex when the VIG unit is subjected to temperature differences between the VIG unit glass sheets enclosing the evacuated gap. This allows a thermal deflection of the VIG unit relative to the elongated profiles. This may help to provide a longer lasting VIG unit, which may e.g. last longer despite being subjected to varying temperature differences. Also or alternatively, it may provide a more cost efficient solution as the same frame assembly may be used in a range of varying climates, and/or in that the same frame assembly system may be utilized for varying sizes of VIG units.

The flexible connection arrangement may thus be deflected more or less by the VIG unit's thermal edge deflection due to a varying temperature difference between the VIG unit glass sheets, hence allowing the VIG unit and the edges of this to thermally deflect.

The elongated frame profile arrangements to which the flexible connection arrangement is connected may in aspects be a sash profile.

In one or more aspects of the present disclosure, said holding parts each comprises a recessed portion provided between holding members arranged at opposite outwardly facing surfaces of the vacuum insulated glass unit, and wherein an edge of the vacuum insulated glass unit extends into the recessed portion and is held in said recess by means of the holding members.

This may e.g. provide a controlled fixation of the VIG unit during the thermal deflection of the VIG unit edges, it may help to provide a space saving frame solution and/or help to provide a solution that may be advantageous from a tightening perspective in relation to provide a sufficient water tightening between the VIG unit and the frame.

In one or more aspects of the present disclosure, the vacuum insulated glass unit edges are allowed to thermally deflect relatively to said recess between the holding members. Alternatively, or additionally, walls of the holding part may be arranged to deflect due to the thermal deflection of the edges of the VIG unit. This/these solutions may provide that the VIG unit's edges may be allowed to sufficiently deflect thermally in the frame.

In other aspects of the present disclosure, the holding part may comprise a single holding member bonded to a surface of the VIG unit by means of a structural adhesive such as silicone or another suitable, structural adhesive. Accordingly, a recess portion between two holding members may in this particular aspect be omitted. The VIG unit may hence here be bonded to and fixed to the frame by the structural adhesive.

In one or more aspects of the present disclosure, said flexible connection arrangements may each comprise one or more wall members configured to provide said flexing. This may e.g. help to provide a cost efficient and simple solution for providing a reduced stress in the VIG unit.

A wall member of said one or more wall members of the flexible connection arrangement may in aspects of the present disclosure be configured to provide or support one of said holding members of the holding part. This may e.g. help to provide a space saving and/or more simple, mechanical solution.

In one or more aspects of the present disclosure, said flexible connection arrangements may comprise one or more wall members arranged opposite to an outer, outwardly facing major surface of the vacuum insulated glass unit.

This may be advantageous as this may e.g. help to provide a space saving, and yet flexible, frame solution.

In one or more aspects of the present disclosure one or more of said one or more wall members of the flexible connection arrangement may extend along, such as substantially parallel to, said opposite, outwardly facing major surface of the vacuum insulated glass unit.

This may e.g. help to provide a more mechanically simple solution, and/or a more space saving frame solution.

In one or more aspects of the present disclosure, a flexing space may be provided between said outwardly facing major surface of the vacuum insulated glass unit and said elongated frame profile arrangements to which the individual holding part is connected, and wherein said vacuum insulated glass unit is configured to flex towards and away from said flexing space in response to said bending moment.

Hence, when the flexing due to said bending moment exerted by the vacuum insulated glass unit, and caused by a thermal deflection of the VIG unit edge is provided, the resulting movement of the VIG unit may be allowed into and away from the flexing space.

This may e.g. help to provide a space saving frame solution, and/or help to provide a simple, flexible frame solution that can flex in response to the bending moment subjected to the holding part due to a thermal deflection of the VIG unit.

In aspects, the holding part may also be arranged so as to flex towards and away from the flexing space in response to said bending moment.

In one or more aspects of the present disclosure, one or more distancing walls of the flexible connection arrangement may provide said flexing space.

This may e.g. help to provide a simple mechanical solution for the frame assembly, and/or help to provide a more controlled flexing of the VIG unit edge(s).

The holding member may thus in aspects of the present disclosure be configured to suspend the vacuum insulated glass unit from the elongated frame profile arrangements to which the holding part is connected.

In one or more aspects of the present disclosure, one or more wall portions of the flexible connection arrangement, such as distancing walls of the flexible connection arrangement providing said flexing space may be arranged in said flexing space.

This may e.g. help to provide a space saving frame solution, such as a narrower frame solution.

However, the wall member(s) may also in one or more other aspects of the present disclosure extend in a direction away from, ore merely parallel to such a space, and not into the space.

In one or more aspects of the present disclosure, the maximum distance between an outer surface of the elongated frame profile arrangement facing the flexing space, and a surface of a holding member of the holding part proximate to and facing the flexing space may be between 0.4 cm and 15 cm, such as between 0.5 cm and 10 cm, such as between 0.7 and 7 cm, e.g. between 1 or 2 cm and 6 cm when the temperature difference ($\Delta T=T1-T2$) of the glass sheets of the vacuum insulated glass unit is 0° C.

This may e.g. be determined when the VIG unit is arranged vertically, or horizontally so that the VIG unit provides a gravity force on the flexible connection arrangement.

This may e.g. provide a sufficient flexing space for the flexing of the VIG unit edge in the frame. The distance may in aspects be different dependent of the size (length and/or width) of the VIG unit.

In one or more aspects of the present disclosure, the minimum distance between an outer surface of the elongated frame profile arrangement facing the flexing space, and a surface of a holding member of the holding part proximate to and facing the flexing space is at least 0.4 cm, such as at least 0.5 cm, e.g. at least 1 cm, such as at least 1.5 cm when the temperature difference ($\Delta T=T1-T2$) of the glass sheets of the vacuum insulated glass unit is 0° C.

This distance between the outer surface of the elongated frame profile arrangement facing the flexing space, and a surface of a holding member proximate to and facing the flexing space may e.g. help to provide that the VIG unit is allowed to flex sufficiently relative to the elongated member to which the flexible connection arrangement is connected, in response to a thermal deflection of the VIG unit edge. The distance may e.g. dependent on the VIG unit size (height and/or width) and/or the layout of the flexible connection system. This distance may in one or more aspects of the present disclosure apply for one or more positions along the edge seal, or along the entire edge seal. The said distance may e.g. be determined substantially perpendicularly to the outer surface of the VIG unit facing the flexing space, at one or more positions opposite to the edge seal. It is understood that the distance may vary as the temperature difference varies, and thus causes a flexing of the flexible connection arrangement.

In one or more aspects of the present disclosure, said flexible connection arrangements comprises a wall member such as extending from said holding member, wherein the wall member comprises one or more bends towards and/or away from a plane, wherein said plane extends substantially perpendicularly to said frame opening and is substantially parallel to the respective edge of the VIG unit held by the holding part, such as extending into said recess of the holding part.

The one or more bends on the flexible connection arrangements may e.g. help to provide one or more valleys in the flexible connection arrangement. These valleys may help to provide an advantageous flexing and/or improved control of the flexing of the wall member or members of the flexible connection arrangement when the thermal deflection changes.

This/these bends may be placed at the wall members at positions of the wall member between the holding part and the part of the wall that is fixed to the elongated frame assembly such as a sash profile.

The bend(s) may e.g. provide a C-shaped, >-shaped <-shaped, M-shaped and/or Z-shaped or Sigma shaped, or Zigzag shaped.

The frame opening may define a frame opening plane defined by and between the elongated frame profile arrangements, the plane extending substantially perpendicularly to the frame opening is substantially perpendicular to this frame opening plane.

In one or more aspects of the present disclosure, a separation wall arrangement is arranged between said flexing space and the frame opening. This may e.g. improve the aesthetic appearance of the frame assembly. Also or alternatively, it may help to protect the flexible connection arrangement from external forces striking the flexible connection arrangement and/or it may help to provide an improved tightening solution, such as in case the separation wall is used for supporting or holding a resilient gasket/seal. In aspects of the present disclosure, the separation wall arrangement may be arranged between said flexible connection arrangement and the frame opening.

In one or more aspects of the present disclosure, said flexible connection arrangement may be configured to allow a rotational and/or linear movement of the holding parts relative to the elongated frame profile arrangements to which the individual holding part is connected, in response to a thermal deflection of the edges of the vacuum insulated glass unit extending into the recessed portion of the respective holding part.

This may e.g. help to reduce the stress provided by the holding member and acting on the VIG unit edge extending into the recess when the VIG unit thermally deflects, and/or it may help to provide that the VIG unit edge may adapt to varying temperature differences between the glass sheets of the VIG unit enclosing the evacuated gap.

In one or more aspects of the present disclosure said holding parts will rotate relative to the elongated frame profile arrangements to which the individual holding part is connected about a rotation axis which is parallel to said edge of the vacuum insulated glass unit extending into the recessed portion in case said bending moment comprises a component having a bending axis which is parallel to said rotation axis.

This may e.g. help to allow the VIG unit to provide varying thermal deflections of the edge.

The rotation may e.g. be provided into and away from a flexing space provided between an outwardly facing major surface of the vacuum insulated glass unit and the elongated frame profile arrangement to which the holding part is connected.

In one or more aspects of the present disclosure, one or more resilient, elongated tightening gaskets or sealing may be arranged to seal a space between a major surface of the vacuum insulated glass unit and said holding members.

This may e.g. help to provide a water and/or air tightening between the frame and the vacuum insulated glass unit, thus helping to reduce heat transfer, and/or to provide a water tightening to avoid rain water or condensation on the major outwardly facing surfaces of the VIG unit arranged in the frame opening from entering parts of the frame.

In one or more aspects of the present disclosure, an elongated tightening gasket or sealing may be arranged between said frame opening and the flexible connection arrangement, and wherein said elongated tightening gaskets or sealing provides a tightening between a major surface of the vacuum insulated glass unit and said frame.

This may e.g. help to provide a water and/or air tightening between the frame and the vacuum insulated glass unit, thus helping to reduce heat transfer, and/or to provide a water tightening to avoid rain water or condensation on the major outwardly facing surfaces of the VIG unit arranged in the frame opening from entering parts of the frame.

In one or more aspects of the present disclosure, said flexible connection arrangements and holding parts may be integrated in the same frame profile which is an extruded, moulded and/or pultruded profile.

This may e.g. help to provide a cost efficient and/or fast manufacturing of the frame profile. Also or alternatively, this frame profile may be configured to be connected to the elongated frame profile arrangement, and hence, an advantageous manufacturing of the VIG unit frame assembly may be obtained, or advantageous thermal characteristic may be obtained. It may also provide an advantageous solution for obtaining the flexible connection arrangement.

In one or more aspects of the present disclosure, said flexible connection arrangements, elongated frame profile arrangements and holding parts are integrated in the same frame profile which is an extruded, moulded or pultruded profile.

This may provide that a large part of the frame may be provided by few one piece solutions, and hence e.g. a cost efficient fast, and/or simpler manufacturing of the frame profile may be provided.

In one or more aspects of the present disclosure, an interconnecting wall part of the holding part interconnects holding members and provides a bottom wall member of the recess receiving the vacuum insulated glass unit edge.

This may e.g. help to provide a simple holding part, such as a U or C shaped holding part that may be easy to manufacture.

In one or more aspects of the present disclosure, said interconnecting wall part providing a bottom wall member may comprise a weakening arrangement such as one or more slits, holes, perforations and/or hollow channels. This may e.g. help to support that the VIG unit edge extending into the recess can deflect between the corners, and this may help to allow a change in the distance between the holding members in response thereto.

In one or more aspects of the present disclosure, one or more of said flexible connection arrangements and/or holding parts is/are elongated profiles extending in the longitudinal direction of the edge of the vacuum insulated glass unit connected to the holding part, such as an edge extending into said recess.

This may e.g. help to provide a solution that may be easy and/or cost efficient to manufacture. Also or alternatively, it may help to provide a solution where tightening between the frame opening and the rest of the frame may be more simple and/or provide a solution giving an improved support of the VIG unit edge.

The respective frame profile arrangement may in one or more aspects of the present disclosure comprise a plurality of said elongated fixation parts and/or holding part extending in the longitudinal direction of the edge of the vacuum insulated glass unit extending into said the recess. In one or more other aspects, the respective frame profile arrangement may comprise a single elongated flexible arrangement portion, fixation part and/or holding part extending at the longitudinal direction of two, three or four edges of the vacuum insulated glass unit.

In one or more aspects of the present disclosure, one or more of said elongated holding parts and/or elongated flexible members may extend at least 30%, such as at least 50%, such as at least 80%, e.g. at least 95% of the length of the edge of the vacuum insulated glass unit extending into said the recess.

In one or more aspects of the present disclosure, one or more of said elongated holding parts and/or elongated flexible members may extend less than least 90%, such as less than 80%, e.g. less than 60%, of the length of the respective edge of the VIG unit.

In one or more aspects of the present disclosure said flexible connection arrangements may comprise a plurality of discrete flexible wall members distributed in the longitudinal direction of the edge of the vacuum insulated glass unit to which the flexible wall members are connected, such as connected by extending into said recess.

This may e.g. help to allow a thermal flexing of the VIG unit edge between corners of the edge, so that the edge may be allowed to describe a deflection curve when attached to the frame, and/or may help to reduce stress in the frame parts due to the thermal deflection In one or more aspects of the present disclosure a plurality of discrete holding parts may be distributed discretely in the longitudinal direction of the edge of the vacuum insulated glass unit fixed to said discrete holding parts, such as an edge extending into a recess of the discrete holding parts.

This may also e.g. help to allow a thermal flexing of the VIG unit edge between corners of the edge, so that the edge may be allowed to describe a deflection curve when attached to the frame, and/or may help to reduce stress in the frame parts due to the thermal deflection In one or more aspects of the present disclosure, the magnitude of the thermal deflection of the vacuum insulated glass unit edge fixed to the holding part, such as extending into said recess, may be configured to vary along the vacuum insulated glass unit edge between corners where the respective edge terminates, due to a temperature difference ($\Delta T=T1-T2$) between said glass sheets of the VIG unit.

This may help to provide a solution where the risk of the VG unit breaking due to thermal deflection of the VIG unit, is reduced. The magnitude of the thermal deflection of the vacuum insulated glass unit edge may change over time and even be provided in different directions over time when the temperature difference between the VIG unit glass sheets enclosing the evacuated gap changes. The frame may be configured to handle and allow such deflections, and thus help to provide a longer lasting VIG unit.

The magnitude of the bending moment exerted on the holding parts by the vacuum insulated glass unit may be is configured to vary between the corners where the edge of the vacuum insulated glass unit terminates, due to a temperature difference $\Delta T=T1-T2$ between the two glass sheets of the VIG unit. Hence, the frame may in aspects be configured to allow the magnitude of the thermal deflection of the edge to vary between the corners in response to the varying magnitude of the bending moment.

In one or more aspects of the present disclosure, said vacuum insulated glass unit may be fixed between said holding members by means of fixation arrangements arranged between the respective holding member and an outwardly facing surface of the vacuum insulated glass unit.

This may e.g. help to provide a good fixation of the VIG unit between the holding members.

Said fixation arrangements may in one or more aspects of the present disclosure comprise one or more suspension elements compressed between a first of said holding members and one of said opposite outwardly facing surfaces, and one or more resilient suspension elements compressed between a second of said holding members and the other of said opposite outwardly facing surfaces,
- wherein said compressed, resilient suspension elements provides a holding force towards said opposite outwardly facing surfaces of the vacuum insulated glass unit so as to suspend the vacuum insulated glass unit between said first and second holding members, and
- wherein each of said compressed, resilient suspension elements are configured to be further compressed or expand in response to said thermal deflection of the edge of the VIG unit due to a temperature difference ($\Delta T=T1-T2$) between the two glass sheets.

This may help to provide an improved fixation of the VIG unit in a frame, where the VIG unit edge is allowed to deflect when subjected to varying temperature differences between the glass sheets of the VG unit. For example, it may help to reduce stress conditions in the VIG unit edge.

The magnitude of the thermal deflection of the respective VIG unit edge may e.g. be determined relative to a plane extending in said frame opening between the elongated frame profile arrangements due to the temperature difference. The VIG unit edges may thus describe a "deflection curve", and the compressed resilient suspension elements are configured to follow/adapt to this deflection curve by either expanding or be further compressed.

This may provide that the compression of one of the resilient suspension elements may become larger near the corner where the respective VIG edge terminates, than the compression of the same (or another) resilient suspension element at the same side of the VIG, but at another a position closer to the centre of the respective edge. In the same way, the other suspension element(s) at the other side of the VIG unit may simultaneously become less compressed near the corner where the same VIG edge terminates, and become more compressed at a position closer to the centre, such as substantially at the centre of the respective edge.

In one or more aspects of the present disclosure, the compression and expansion of the resilient suspension elements at the ⅛, such as the 1/10, such as 1/12 of the length of the vacuum insulated glass unit edge nearest a corner where the respective edge terminates, is configured to be larger than the compression and expansion, respectively, of the same resilient suspension elements at a position closer to the centre of the respective edge.

In one or more aspects of the present disclosure, said resilient suspension elements may be foam elements, rubber elements, such as substantially solid rubber elements from a rubber material such as natural rubber and/or synthetic rubber, and/or be made from a plastic material or a silicone material.

In one or more aspects of the present disclosure, said resilient suspension elements has a height of at least 8 mm such as at least 10 mm, for example at least 12 mm in an uncompressed state. This may help to provide a solution where a sufficient tightening between the VIG unit and the frame assembly may be provided, and/or provide a fixation solution that may sufficiently adapt to the thermal deflection of the VIG unit.

In one or more aspects of the present disclosure, said resilient gaskets have a height of between 7 mm and 30 mm, such as between 8 mm and 20 mm, e.g. between 10 mm and 16 mm in an uncompressed state.

The resilient suspension elements may e.g. in one or more aspects of the present disclosure be configured to be pre-compressed between the VIG unit and the respective holding member to an at least 2 mm, such as at least 3 mm, such as at least 4 mm, when the temperature difference between the VIG unit glass sheets providing the evacuated gap is about 0° C.

In one or more aspects of the present disclosure, one or both of said fixation arrangements are elongated gasket strips arranged to extend in a direction parallel to an edge of the vacuum insulated glass unit.

This may e.g. help to provide an improved force distribution when the VIG unit is suspended between the compressed, resilient suspension elements and/or help to provide an improved air and/or water tightening.

In one or more aspects of the present disclosure, the distance between said holding members may be configured to vary less than 20%, such as less than 10%, such as less than 8% of said distance (W2) determined at temperature difference ($\Delta T$) of 0° C., upon a thermal deflection of the vacuum insulated glass unit edge (8a-8e) extending into said recess (29), at a temperature difference ($\Delta T=T1-T2$) between the two glass sheets (2a, 2b) of the vacuum insulated glass unit (1) of 65° C.

This may e.g. help to provide a good control of the positioning of the VIG unit between the holding members, and/or help to assist in a controlled thermal bending of the VIG unit. It may also or alternatively help to improve the aesthetic appearance of the VIG unit frame assembly. The distance between the holding members may e.g. in aspects of the present disclosure be substantially constant, at least when a temperature difference between the VIG unit glass sheets enclosing the gap is less than e.g. 40° C. or less than 65° C.

In one or more aspects of the present disclosure, said frame assembly may comprise substantially parallel top and bottom frame profile arrangements, and substantially parallel side frame profile arrangements, wherein two, three or all of said top, bottom and/or side frame profile arrangements at least partly, such as fully, encloses said edges, and wherein two or more of said frame profile arrangements comprises one or more of said holding parts and one or more of said flexible connection arrangements.

The bottom frame profile arrangement may be of a different design/constitution than the side and top profile frame arrangements, as it may e.g. comprise a water drainage system for draining water from the surface of the vacuum insulated glass (VIG) unit away from the vacuum insulated glass (VIG) unit frame assembly which is not present at the side and top profile frame arrangements. This may at least be relevant for e.g. windows or doors.

In one or more aspects of the present disclosure, two or more of said top, bottom or side frame profile arrangements each comprise a holding part, which holds the vacuum insulated glass unit between two holding members as described e.g. above or below. For example side frame profile arrangements may both comprise a holding part and flexible connection arrangement, and the same may the top profile frame arrangement and/or bottom profile frame arrangement.

In one or more aspects of the present disclosure, said vacuum insulated glass unit may be a laminated vacuum insulated glass unit, where a lamination glass sheet, such as an annealed glass sheet, is laminated to an outer major surface of a glass sheet of the vacuum insulated glass unit by means of a lamination layer.

Simulation results have indicated that even though a lamination glass sheet may restrict the thermal deflection of the VIG unit edges with between 30% to 60% compared to free bending where the lamination glass sheet is not present, it may still be relevant to allow said edge deflection in the frame, as tensile stresses in the VIG unit glass sheets and/or the edge sealing may still become significant during thermal deflection. The lamination glass sheet may together with the flexible connection arrangement help to reduce the stress in the VIG unit, such as in edge seal sealing the evacuated gap.

In one or more aspects of the present disclosure, one or both of the VIG unit glass sheet enclosing the evacuated gap may be tempered glass sheets, e.g. thermally tempered glass sheets. A tempered glass sheet may provide increased safety and/or strength of the VIG unit. In other aspects of the present disclosure, at least one of said glass sheets of the VIG unit may be an annealed glass sheet.

In one or more aspects of the present disclosure, the holding part may be attached to the VIG unit at outer outwardly facing and oppositely directed major surfaces of the VIG unit. However In further aspects, the holding parts may also instead be attached to a major surface of another glass sheet of the VIG unit than the one comprising the outer, outwardly facing major surface of the VIG unit. This may e.g. be provided by that that a glass sheet providing an outer, outwardly facing major surface of the VIG unit (such as a lamination glass sheet) have smaller dimensions than other glass sheet(s) of the VIG unit so that these/this other glass sheet is exposed to allow the holding member to be attached at the edge of the major surface of this other glass sheet.

In one or more aspects of the present disclosure, said frame, such as the fixation arrangements, the flexible connection arrangement and/or the like may be configured to restrict the thermal deflection of the vacuum insulated glass unit edges compared to free, un-constricted thermal deflection of the respective edge.

Restricting the VIG unit edge completely from thermal deflection may cause the VIG unit to break and the pressure in the evacuated gap to equalize to the ambient pressure. However, by restricting the VIG unit edge deflection to a certain amount compared to free thermal deflection and no thermal deflection, this may provide a solution where the VIG unit may be less likely to break over time due to thermal deflections. Also or alternatively, it may allow for a more space saving frame solution.

The edge deflection may e.g. in aspects be restricted between 20 and 90%, such as between 40-70% compared to free, un-constricted thermal deflection of the respective edge.

In one or more aspects of the present disclosure, the magnitude of the thermal deflection of the edges of the vacuum insulated glass unit may be configured to vary along one or more of the vacuum insulated glass unit edges between the corners where the respective edge terminates due to said temperature difference ($\Delta T=T1-T2$) between the two glass sheets, thereby describing an edge deflection curve (DC) relative to a frame opening plane defined between the elongated frame profile arrangements.

This may e.g. help to reduce the stresses in the VIG unit compared to a more rigid fixation of the VIG unit in a frame solution, and hence reduce the risk of the VIG unit being damaged after it is installed in the frame of the frame assembly.

In one or more aspects of the present disclosure, the largest total edge deflection of any of the edges of the vacuum insulated glass unit, at a temperature difference ($\Delta T=T1-T2$) between the two glass sheets of 65° C. as compared to the vacuum insulated glass unit at a temperature difference ($\Delta T=T1-T2$) of 0° C. may be at least 2 mm, such as in the range of 2 to 40 mm, such as in the range of 5 to 35, mm, preferably in the range of 8 to 20 mm.

By the term "total edge deflection" is herein understood the largest distance in a direction perpendicularly to a frame opening plane, between any two positions of an edge of the vacuum insulated glass unit. In some embodiments this will be the sum of the largest distances of positions of the edge in question from the frame opening plane in each their direction (D1, D2) from that plane. The frame opening plane is provided/defined by the frame between at least two elongated (such as parallel) frame profiles.

In one or more other or further aspects of the present disclosure, the largest total edge deflection of any of the edges of the vacuum insulated glass unit, at a temperature difference $\Delta T=T1-T2$ between the two glass sheets of 65° C. as compared to the vacuum insulated glass unit at a temperature difference ($\Delta T=T1-T2$) of 0° C. may be at least 0.3% of the length of the deflecting edge, such as in the range of 0.3% to 3.5% of the length of the deflecting edge, such as in the range of 0.4% to 2% of the length of the deflecting edge, such as in the range of 0.6% to 1.5% of the length of the deflecting edge 8a-8d.

In one or more aspects of the present disclosure, the largest total deflection of any of the edges of the vacuum insulated glass unit, at a temperature difference $\Delta T=T1-T2$ between the two glass sheets of 40° C. as compared to the vacuum insulated glass unit at a temperature difference ($\Delta T=T1-T2$) of 0° C. may be at least 0.15% of the length of the deflecting edge, such as in the range of 0.15% to 3% of the length of the deflecting edge, such as in the range of 0.25% to 1.8% of the length of the deflecting edge, such as in the range of 0.35% to 1.2% of the length of the deflecting edge.

In one or more aspects of the present disclosure, the largest total edge deflection of any of the edges of the vacuum insulated glass unit at a temperature difference ($\Delta T=T1-T2$) between the two glass sheets of 65° C. as compared to the vacuum insulated glass unit at a temperature difference ($\Delta T=T1-T2$) of 0° C. may be at least 0.3% of the length of the deflecting edge, such as in the range of 0.3% to 3.5% of the length of the deflecting edge, such as in the range of 0.4% to 2% of the length of the deflecting edge, such as in the range of 0.6% to 1.5% of the length of the deflecting edge.

The above mentioned allowed total edge deflection may e.g. help to reduce the risk that the VIG unit is damaged over time after it has been installed in the frame, as the frame allows the edge to deflect, e.g. to describe a deflection curve, and hence this may reduce the stresses in the VIG unit compared to a more rigid fixation of the VIG unit in a frame solution.

In one or more aspects of the present disclosure, all four edges of said vacuum insulated glass unit are allowed to thermally deflect in a deflection direction perpendicular to the frame opening plane defined between the elongated frame profile arrangements due to a temperature difference ($\Delta T=T1-T2$) between the two glass sheets.

In one or more aspects of the present disclosure, said vacuum insulated glass (VIG) unit frame assembly may be a building aperture cover such as a door or a window, such as a roof window.

VIG units may generally provide good heat insulation and/or other advantages in building aperture covers when compared to windows or doors comprising gas insulated glass units.

The present inventors have found that computer simulations revealed that in certain situations when a VIG unit is arranged in a roof window so that the major outer surfaces are not completely vertical, gravity acts on the VIG unit and may cause a further deflection of the edges of the VIG unit. This may in some situations add on to the already present thermal deflection of the VIG unit edges due to a temperature difference between the VIG units. Hence a "worse case" scenario may be if the hotter surface of the VIG unit is the interior VIG unit glass sheet surface (often a surface of a lamination glass sheet in roof windows), as both gravity and thermal deflection acts in the same deflection direction. The present solution may be advantageous in order to also cope such scenarios in roof window solutions.

In aspects of the present disclosure, the VIG unit frame assembly may be a window or door sash.

Windows and doors arranged in outer walls of a building and arranged to cover a building aperture in that outer building wall to allow sunlight to enter a room in the building from the exterior of the building may be largely exposed to varying temperature differences between the VIG unit glass sheet over the lifetime of the VIG unit frame assembly. Also the climatic condition varies largely dependent on the geographical location where the window or door is installed and/or may vary dependent on the type of window or door. The present disclosure may provide a solution that may be advantageous and suitable for such windows or doors comprising a VIG unit. It may though also be suitable to use in refrigerators, cooler covers or doors, or as or in oven doors.

In one or more aspects of the present disclosure, said holding members provides fixation of the vacuum insulated glass unit at said holding part at opposite, outer surfaces of the vacuum insulated glass unit along and opposite to an edge seal of the vacuum insulated glass unit which seals the gap between the VIG unit glass sheets.

At least a part of the edge seal is thus provided between the locations where the holding members provides fixation/holding of the VIG unit on the holding part. Hence, when outer forces, such as provided by wind loads or objects, strikes the VIG unit, the forces are transferred to the frame assembly at a location where the edge seal of the VIG unit is placed.

This may e.g. help to reduce or avoid a compression force caused by the compressed gaskets to be subjected to support structures in the gap of the VIG unit, and/or help to provide a VIG unit frame assembly which is less likely to break.

In one or more aspects of the present disclosure, said holding part is configured so as to allow a shift in the direction of the thermal deflection of the corners and/or centre parts of the edges of the vacuum insulated glass unit in response to a change in the temperature difference ($\Delta T=T1-T2$) between the two glass sheets of the vacuum insulated glass unit. It is here understood that said change in the temperature difference $\Delta T=T1-T2$ between the two glass sheets of the vacuum insulated glass unit provides a switch between which of the glass sheets that is the hotter glass sheet and the colder glass sheet respectively. This may e.g. be provided by means of suspension elements, by means of flexible wall(s) of the holding part and/or the like.

This may e.g. help to provide a more cost efficient solution may be obtained and/or a solution where the VIG unit frame assembly can be used in a larger range of climatic conditions and/or applications.

In one or more aspects of the present disclosure, a minimum distance may be provided between an outer major surface of the vacuum insulated glass unit and walls of said frame, wherein said minimum distance is at least 4 mm such at least 5 mm, for example at least 6 mm at a temperature difference $\Delta T$ between the two glass sheets of the vacuum insulated glass unit of substantially 0° C. This may e.g. provide more space and/or deflection freedom in order to allow the VIG unit to thermally deflect relative to the frame. The minimum distance may provide a space in which a fixation system and/or a resilient tightening gasket is placed.

The present disclosure additionally relates in a second aspect to a vacuum insulated glass unit comprising a linear edge with an edge seal sealing an evacuated gap between two glass sheets of the vacuum insulated glass unit, wherein the vacuum insulated glass unit is structurally affixed to a frame by means of holding parts, wherein one or more walls of the flexible connection arrangements connects the holding parts to elongated frame profile arrangements of the frame, and suspends the vacuum insulated glass unit from the elongated frame profile arrangements to which the holding part is connected, wherein said flexible connection arrangements are configured to flex when said vacuum insulated glass unit exerts a bending moment on the holding parts, so that said holding parts will move relative to the elongated frame profile arrangements to which the individual holding part is connected.

This may e.g. provide one or more of the above mentioned effects.

In aspects of the second aspect, said vacuum insulated glass unit may be provided by means of a frame assembly.

The present disclosure additionally in a third aspect relates to a vacuum insulated glass unit frame for holding and framing a rectangular vacuum insulated glass unit comprising at least two glass sheets separated by a gap between said glass sheets, wherein said frame comprises:

a frame comprising elongated frame profile arrangements for framing said vacuum insulated glass unit in a frame opening, the frame further comprising:

holding parts for fixating said vacuum insulated glass unit, such as wherein said holding parts each comprise a recessed portion provided between holding members configured to be arranged at opposite outwardly facing surfaces of a vacuum insulated glass unit having an edge arranged to extend into the recessed portion, so as to be held in said recess by means of the holding members, and flexible connection arrangements connecting the holding parts to elongated frame profile arrangements, wherein said flexible connection arrangements are configured to flex when said vacuum insulated glass unit exerts a bending moment on the holding parts, so that said holding parts will move relative to the elongated frame profile arrangements to which the individual holding part is connected.

In aspects of the third aspect, said frame is configured to provide a frame assembly solution when a vacuum insulated glass unit is attached to said holding parts.

FIGURES

Aspects of the present disclosure will be described in the following with reference to the figures in which:

FIG. 1: Illustrates a VIG unit frame assembly according to embodiments of the present disclosure, FIG. 2: illustrates schematically a VIG unit 1 to be arranged in a frame according to embodiments of the present disclosure, FIGS. 3-4: Illustrates a thermally deflecting VIG unit according to embodiments of the present disclosure, FIG. 5: Illustrates a thermally deflecting VIG unit subjected to varying temperature difference according to embodiments of the present disclosure, FIGS. 6a-6b: illustrates an elongated frame profile arrangement comprising a flexible connection portion according to embodiments of the present disclosure FIGS. 7-9: illustrates an elongated frame profile arrangement comprising a flexible connection portion according to further embodiments of the present disclosure FIG. 10: illustrates a VIG unit frame assembly 10 which is a window according to embodiments of the present disclosure, FIG. 11: illustrates an embodiment of the present disclosure where holding members deflect together with a VIG unit edge, and where the magnitude of the VIG unit edge deflection varies along the edge FIG. 12-13: illustrates further embodiments of a frame assembly according to the present disclosure, FIGS. 14-15: illustrates embodiments of the present disclosure where discrete holding parts are arranged along a VIG unit edge, FIGS. 16-17: illustrates a fixation gasket assembly according to embodiments of the present disclosure, FIGS. 18-19: illustrates a VIG unit frame assembly comprising an elongated base member and an elongated glazing member according to embodiments of the present disclosure, FIGS. 20-22: illustrated a frame assembly comprising a laminated VIG unit according to embodiments of the present disclosure, FIG. 23: illustrates an embodiment of the present disclosure where a fixation arrangement hold a VIG unit at one glass sheet, according to embodiments of the present disclosure, FIGS. 24-25: illustrates embodiments of the present disclosure where a VIG unit is a hybrid type VIG unit according to embodiments of the present disclosure, FIGS. 26-27: illustrates a frame assembly comprising a flexible connection arrangement according to further embodiments of the present disclosure, FIG. 28: illustrates an embodiment of the present disclosure where substantially no fixation arrangements are placed between VIG unit surfaces and holding members of a holding part, FIG. 29: illustrates an embodiment of the present disclosure where a holding part comprises weakening portions in a wall, FIG. 30: illustrates a visualized computer simulation of a thermal deflection of a VIG unit, and FIGS. 31-32: illustrates a thermal deflection test of a laminated VIG unit.

DETAILED DESCRIPTION

In relation to the figures described below, where the present disclosure may be described with reference to various embodiments, without limiting the same, it is to be understood that the disclosed embodiments are merely illustrative of the present disclosure that may be embodied in various and alternative forms. The figures are not to scale; some features may be exaggerated or minimized to show details of particular components. Therefore, specific structural and functional details disclosed herein are not to be interpreted as limiting, but merely as a representative basis for e.g. teaching one skilled in the art to variously employ the present disclosure.

FIG. 1 illustrates schematically a vacuum insulated glass unit frame assembly 10 for use as e.g. a building aperture cover such as a window or a door according to embodiments of the present disclosure. The vacuum insulated glass unit frame assembly 10 comprises a vacuum insulated glass (VIG) unit 1, and a frame 20. The frame 20 comprises elongated frame profile arrangements 20a-20d which frames the vacuum insulated glass unit 1 in a frame opening 21, defining a frame opening plane P2.

These elongated frame profile arrangements 20a-20d comprises substantially parallel top and bottom frame profile arrangements 20c, 20d, and substantially parallel side profile frame arrangements 20a, 20b. Two, two, three or all (as illustrated) of said top, bottom and/or side profile frame arrangements 20a-20d at least partly, such as fully, encloses the VIG edges 8a-8d. Two or more of frame profile arrangements 20a, 20b, 20c, 20d may each comprise one or more holding parts 6 and one or more flexible connection arrangements 7 as disclosed in more details below.

Gasket arrangements 50a, 50b may in one or more embodiments of the present disclosure be arranged to seal a space between the frame profile arrangements 20a-20d and the VIG unit 1 in one or more embodiments of the present disclosure, as e.g. described in more details later on.

As can be seen, the frame 20 may be attached to a fixed frame arrangement 30, such as in case the frame 20 is configured to be opened and closed while hanging from a hinge system (not illustrated) connecting the frame 20 and the fixed frame arrangement 30. In other embodiments, the sash or frame 20 may also be fixed in an un-openable manner to the fixed frame or directly to a building structure.

The frame profile arrangements 20a-20d defines a frame opening 21 plane P2 extending between the frame profile arrangements 20a-20d in the frame opening 21.

Figure 2:
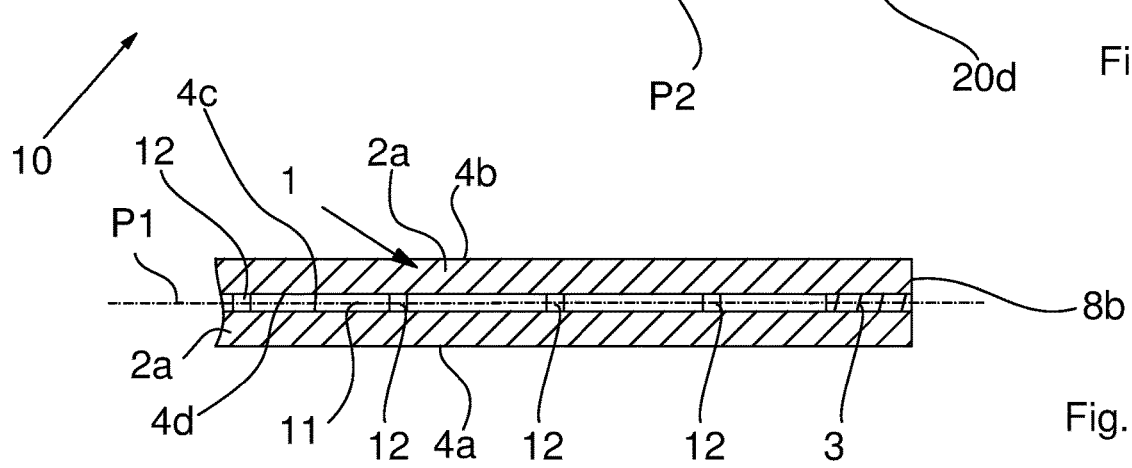

FIG. 2 illustrates schematically a cross sectional view of a rectangular VIG unit 1 to be arranged in the frame 20 according to embodiments of the present disclosure. The VIG unit 1 comprises two glass sheets 2a, 2b such as tempered glass sheets, e.g. thermally tempered glass sheets, but it may also be annealed glass sheets.

The glass sheets 2a, 2b are separated by a gap 11 between the glass sheets 2a, 2b, and a plurality of support structures 12 are distributed in the gap 11. The gap 11 may for example be 0.05-0.5 mm. The gap 11 is sealed by an edge sealing 3, such as a fused edge sealing, which may e.g. be made from a solder glass material, e.g. low melting temperature solder glass material, or a metal solder material.

The support structures 12 may be made from metal, glass or polymer and be arranged in a grid or another pattern. 12 maintain the gap 11 between the glass sheets 2a, 2b when the gap is evacuated to a pressure below e.g. $10^{-3}$ bar, such as below $10^{-4}$ bar, e.g. to about or below $10^{-3}$ mbar. The glass sheets 2a, 2b comprises major surfaces 4c, 4d facing the gap, and the support structures support on these surfaces. The glass sheets also comprises outwardly facing major surfaces 4a, 4b facing away from the gap 11.

The VIG unit's thickness, measured between the outwardly facing surfaces of the VIG unit may in embodiments be between 4-15 mm such as between 4-12 mm, e.g. 4-10 mm.

Especially if the VIG unit glass sheets 2a, 2b are tempered glass sheets, the distance between neighbouring/adjacent support structures may be above 3 cm or above 4 cm, such as between 3 cm and 6 cm in the evacuated VIG unit gap 11.

As described in more details later on, the VIG unit 1 may also be a laminated VIG unit and/or a VIG unit of a hybrid type comprising a further glass sheet providing a further sealed gap between this glass sheet and the VIG unit that may be filled with a gas.

The VIG unit 1 defines a VIG unit plane P1 that will extend parallel to or coincide with the frame opening 21 plane P2 when the VIG unit is arranged in the frame 20. This plane P1 may e.g. be determined when the VIG unit glass sheets 2a, 2b have the substantially same temperature and no substantial thermal deflection of the VIG unit occur ($\Delta T=0°$ C.).

Figure 3:
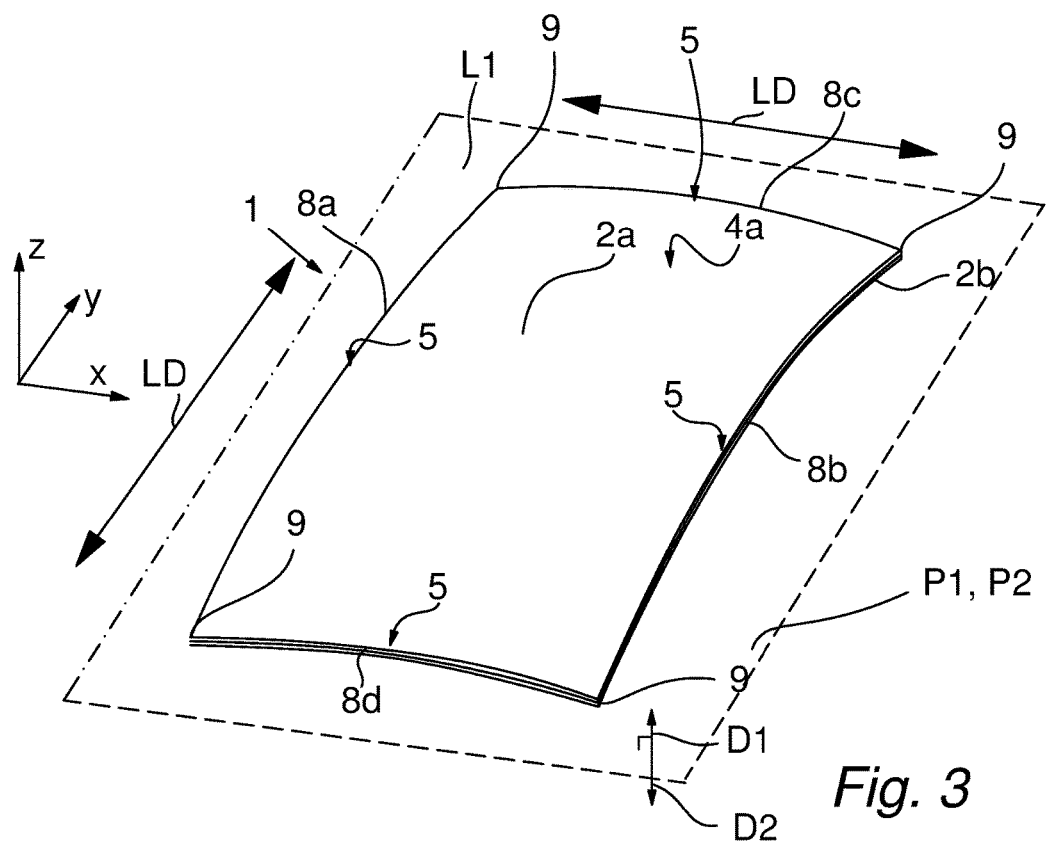
Figure 4:
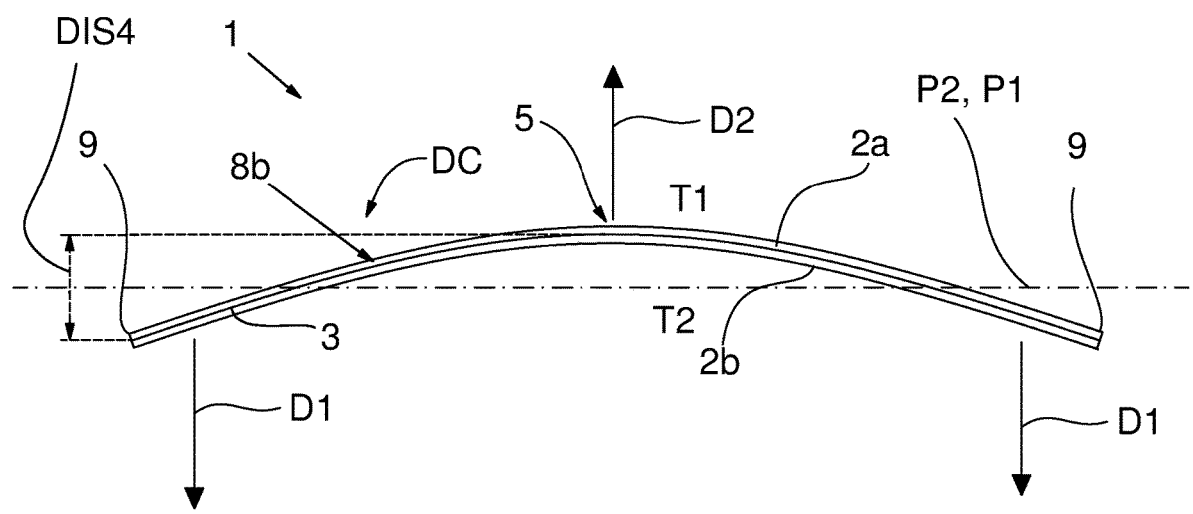

FIGS. 3 and 4 illustrates schematically a VIG unit thermal deflection as a result of a temperature difference $\Delta T=T1-T2$ between the two glass sheets 2a, 2b, according to embodiments of the present disclosure.

In FIG. 3, the VIG unit 1 is shown schematically and in perspective, where it can be seen that the outer major surface 4a of the VIG unit 1 may thus obtain a convex shape when T1 is higher than T2 whereas the outer surface 4b of the other (lower) glass sheet 2b (not visible in FIG. 3) provides a concave shape due to a thermal deflection.

The VIG unit 1 deflects relative to the VIG unit plane P1 (determined where $\Delta T$ is substantially zero) and relative to the frame opening plane P2, in the directions D1, D2 which are perpendicular to the planes P1 and/or P2.

The planes P2 and P1 extends in the x-y direction, and the thermal deflection of the VIG unit edges 8a-8d is provided in the z direction relative to the planes P1, P2.

The length of the longer opposing edges 8a, 8b may in embodiments of the present disclosure be in the range of 500 to 3000 millimetres, preferably in the range of 600 to 1300 millimetres.

In embodiments of the present disclosure, the length ratio between the shorter opposing edges 8c, 8d and the longer opposing edges 8a, 8b, may be in the range of 0.3 to 0.9, preferably in the range of 0.35 to 0.85.

In further embodiments, the length ratio between the shorter opposing edges 8c, 8d and the longer opposing edges 8a, 8b may be in the range of 0.3 to 0.7, preferably in the range of 0.35 to 0.6.

FIG. 4 illustrates schematically and seen from the side onto the long edge 8b, the thermal deflection of the edge 8b. As can be seen, the VIG unit edge 8b may tend to describe a deflection curve DC due to thermal deflection of edge 8b, caused by a temperature difference $\Delta T=T1-T2$ between the two glass sheets 2a, 2b. In the present example, the glass sheet 2a is subjected to a higher temperature T1 than the glass sheet 2b subjected to temperature T2. This cause the glass sheet 2a to expand more than glass sheet 2b. As the edge seal 3 may provide a very rigid connection between the glass sheets, this causes the VIG unit to thermally deflect, and this temperature difference may cause the edge 8b to describe a deflection curve that varies relative to the frame opening plane P2 and the VIG unit plane P1.

As can be seen from various figures of the present disclosure, the plane P1 and the frame opening plane P2 may coincide. In other embodiments of the present disclosure however, the plane P1 may be parallel to the frame opening plane P2, but may not coincide with the plane.

The outer, major surface 4a of the VIG unit 1 at or near the edge, e.g. at the surface 4a opposite to the edge seal 3 may thus obtain a convex shape when T1 is higher than T2 whereas the outer surface 4b of the other (lower) glass sheet 2b provides a concave shape.

As can be seen, the corners 9 of the VIG unit where the edge 8b terminates may move in a first direction D1 relative to the plane P1 and/or P2, whereas the centre portion 5 of the edge 8b, is may move in the opposite direction D2 than the first direction D1, relative to the plane P1 and/or P2.

When/if the glass sheet 2b gets hotter than glass sheet 2a, caused by a temperature change of T1 or T2, the corners 9 of the VIG unit moves in the second direction D2 relative to the plane P1 and/or P2, and the centre portion 5 of the edge 8b, move in the first direction D1, relative to the plane P1 and/or P2.

In one or more embodiments of the present disclosure, the largest total edge deflection DIS4 of any of the edges 8a-8d of the vacuum insulated glass unit 1, between the corners 9 at a temperature difference $\Delta T=T1-T2$ between the two glass sheets 2a, 2b of 65° C. as compared to the vacuum insulated glass unit at a temperature difference ($\Delta T=T1-T2$) of 0° C. is at least 2 mm, such as in the range of 2 to 40 mm, such as in the range of 5 to 35, mm, preferably in the range of 8 to 20 mm.

In one or more other embodiments of the present disclosure, the largest total deflection DIS4 of any of the edges 8a-8d of the vacuum insulated glass unit 1, at a temperature difference $\Delta T=T1-T2$ between the two glass sheets 2a, 2b of 40° C. as compared to the vacuum insulated glass unit at a temperature difference ($\Delta T=T1-T2$) of 0° C. is at least 1 mm, such as in the range of 1 to 25 mm, such as in the range of 3 to 15 mm, preferably in the range of 4 to 12 mm.

In one or more other embodiments of the present disclosure, the largest total edge deflection DIS4 of any of the edges 8a-8d of the vacuum insulated glass unit 1, at a temperature difference $\Delta T=T1-T2$ between the two glass sheets 2a, 2b of 65° C. as compared to the vacuum insulated glass unit at a temperature difference ($\Delta T=T1-T2$) of 0° C. may be at least 0.3% of the length of the deflecting edge 8a-8d, such as in the range of 0.3% to 3.5% of the length of the deflecting edge 8a-8d, such as in the range of 0.4% to 2% of the length of the deflecting edge 8a-8d, such as in the range of 0.6% to 1.5% of the length of the deflecting edge 8a-8d.

In one or more other embodiments of the present disclosure, the largest total deflection of any of the edges 8a-8d of the vacuum insulated glass unit 1, at a temperature difference $\Delta T=T1-T2$ between the two glass sheets 2a, 2b of 40° C. as compared to the vacuum insulated glass unit at a temperature difference ($\Delta T=T1-T2$) of 0° C. may be at least 0.15% of the length of the deflecting edge 8a-8d, such as in the range of 0.15% to 3% of the length of the deflecting edge (8a-8d), such as in the range of 0.25% to 1.8% of the length of the deflecting edge 8a-8d, such as in the range of 0.35% to 1.2% of the length of the deflecting edge 8a-8d.

The above mentioned total thermal deflections are provided when the VIG unit is arranged in the frame 20, and is determined relative to the state of the VIG unit edge position/deflection when the VIG unit glass sheets 2a, 2b have an identical/the same temperature such as 20° C. It may e.g. be measured by an optical measuring instrument such as a laser distance measuring instrument/sensor.

In one or more other embodiments of the present disclosure, the largest total edge deflection DIS4 of any of the edges 8a-8d of the vacuum insulated glass unit at a temperature difference ΔT=T1−T2 between the two glass sheets 2a, 2b of 65° C. as compared to the vacuum insulated glass unit at a temperature difference ΔT=T1−T2 of 0° C. is at least 2 mm, such as at least 3 mm or at least 4 mm, such as in the range of 2 mm to 30 mm, preferably in the range of 3 mm to 20 mm.

As can be seen, in FIG. 4, the frame opening plane P2 here is determined to be placed to coincide with the VIG unit plane P1 in the frame (the frame is though not illustrated). In some embodiments, the total edge deflection DIS4 will be the sum of the largest distances of positions of the VIG unit edge in question from the frame opening plane in each their direction D1, D2 from that plane. In FIG. 4, the largest total edge deflection DIS4 is defined between the deflection of the edge seal 3 at the centre 5 of the edge 8b, and the edge seal 3 at the corner 9 of the same edge, in a direction perpendicular to the plane P2, P1.

Figure 5:
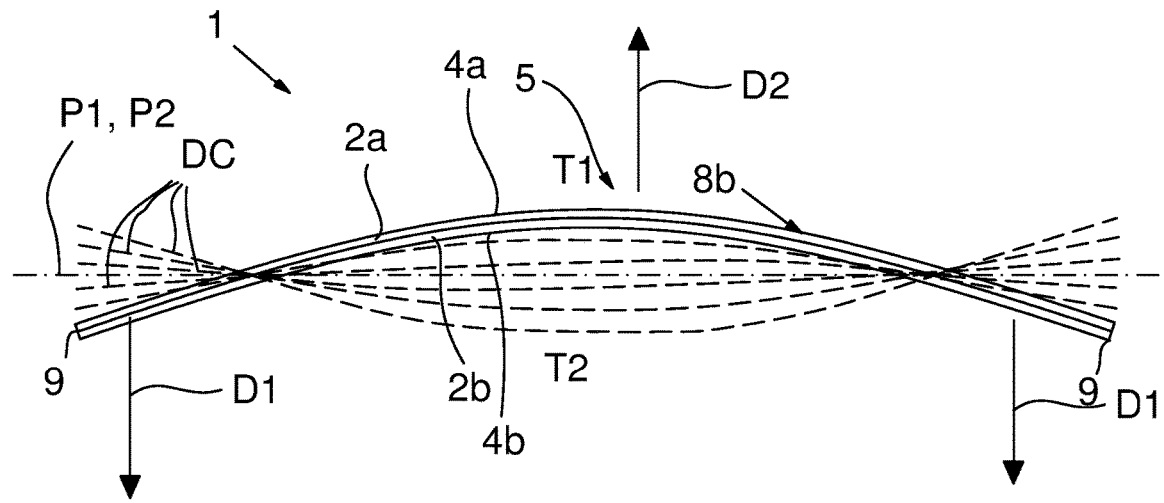

FIG. 5 illustrates an example of a situation where a VIG unit 1 is subjected to a varying temperature difference ΔT=T1−T2 between the glass sheets 2a, 2b over time, according to embodiments of the present disclosure.

For example, it is common for e.g. building aperture covers such as windows or doors arranged in openings of outer walls, roofs or the like of a building, that these are subjected to varying temperature differences over time after they have been installed. Similar temperature differences may also apply to refrigerator and cooler covers or doors.

For example, with a room temperature T1 of e.g. about 20° C. in the building, the temperature T2 at the other side (outside a building) of the VIG unit 1 may vary significantly, such as between e.g. 15° C. and 30° C. or even more, over 24 hours.

Even, the temperature difference ΔT=T1−T2 may so to say switch "operational sign" so that the hotter side of the VIG unit may shift one or more times over e.g. 24 hours, many times over a calendar year, or even in the mere case that a hail, rain or snow shower occurs for a short period of time. This may e.g. largely depend on the geographical area where the VIG unit frame assembly is installed, and causes the rate and even direction of the thermal deflection to change over time.

As an example over 24 hours, the outside temperature T2 may start to be 10° C. at 8 PM, and at 3 AM it may be 35° C., and it then gradually decreases again to 10° C. overnight. The inside temperature T1 is set to e.g. be 20° C. the whole 24 hours.

This causes the temperature difference ΔT to switch operational sign: The temperature T1 is 20° C. at the inside, and T2 (outside) is 10° C. at 8 PM. Thus, the VIG unit edge 8b corners 9 deflect in a first direction D1 as illustrated in FIG. 3. Then the thermal deflection of the VIG unit edge 8b gradually changes (illustrated by dashed deflection curves DC) as the temperature T2 changes to be 35° C. at 3 AM at surface 4b, and thus 15° C. higher than T1. Thus, the VIG unit thermal deflection changes so that the edges 8a-8d deflects in the other direction, and then, it deflects back again as the temperature T2 changes back to the about 10° C. overnight. This may even vary over the year dependent on the time of year, and e.g. in winter time, the outside temperature may be significantly below 0° C., and in the summer time, it may be significantly above 30° C., although the inside room temperature may be desired to be substantially constant, e.g. by help from a room heating system or cooling system (e.g. air-conditioning). These systems may also be known as HVAC (Heating, ventilation, and/or air conditioning).

Accordingly, the thermal deflection of the VIG unit 1 may vary significantly over 24 hours and even more over a longer period such as a calendar year and may depend on different weather conditions. A similar temperature difference may occur when a refrigerator or freezer door is opened or if the cooling device is turned on/off. This causes varying stress condition on the VIG unit over time, such as at the edges 8a-8d near the location where the VIG unit glass sheets are connected to seal the gap by e.g. an edge sealing 3. The stress conditions are complex. Examples of these stresses may be shear stresses at the VIG edge, differential stresses where tensile stress occurs at the deflecting glasses and/or stress concentrations at the corners.

If the VIG unit has a shape and/or size where at least some of the edges of the VIG unit may risk thermally deflecting more than the above mentioned deflection(s), the frame may in embodiments of the present disclosure comprise a restriction arrangement for restricting the thermal deflection of the edge(s) 8a-8d, such as for example the longest edges of the VIG unit or all edges of the VIG unit This restriction arrangement may comprise a gasket solution, one or more stop parts of the frame preventing an edge deflection above a certain point and/or the like. Also, the flexible connection arrangement may help to provide the restriction of the edge deflection.

Figure 6A:
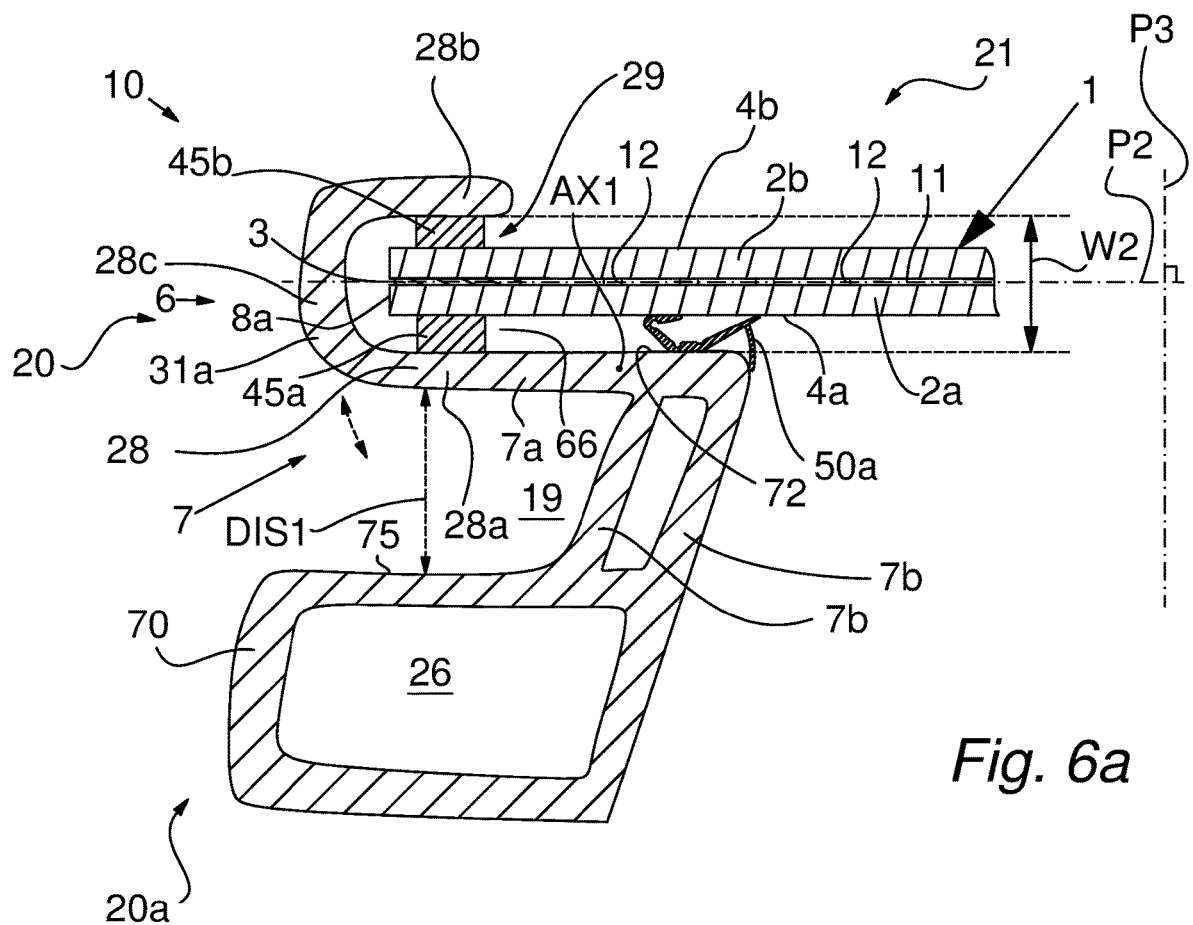
Figure 6B:
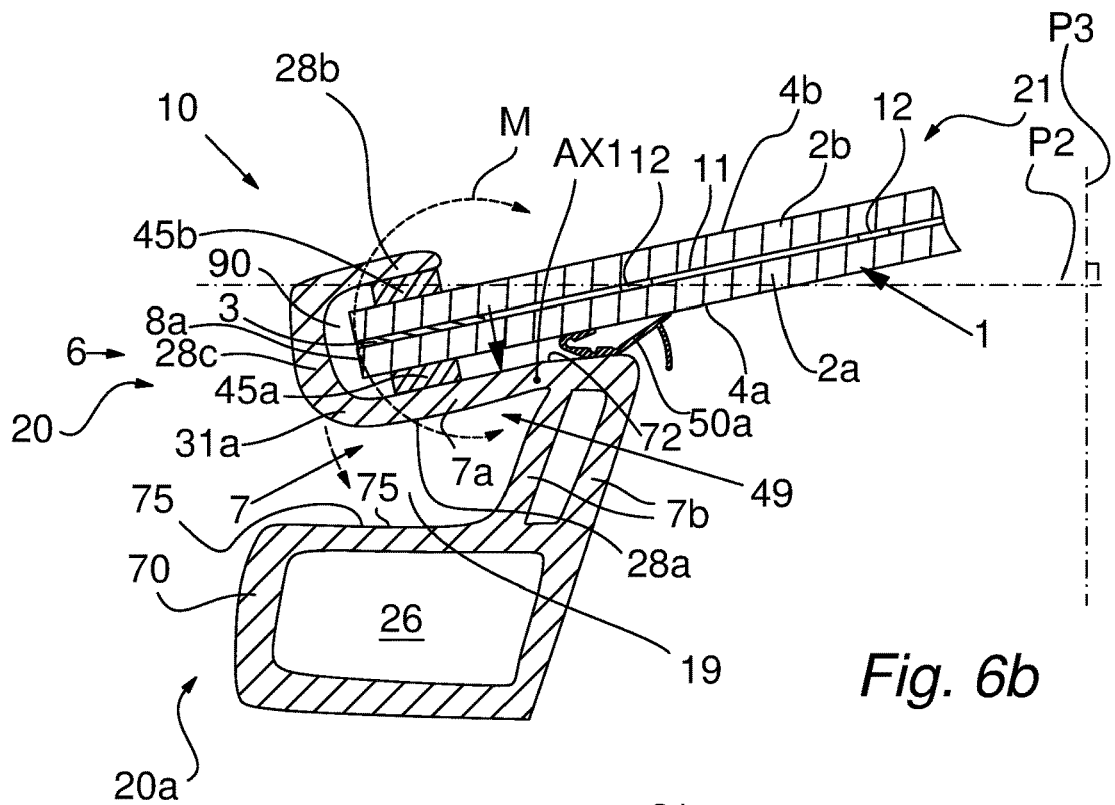

FIGS. 6a-6b illustrates schematically a cross sectional view of an elongated frame profile arrangement 20a of a frame 20 according to embodiments of the present disclosure. The elongated frame assembly 20a comprises an elongated sash profile 70 extending in the longitudinal direction of the VIG unit 1.

A holding part 6 fixates the VIG unit 1 in/to the frame 20. The holding part 6 comprises a recessed portion 29 that is provided between holding members 28a, 28b such as walls or legs. The holding members 28a, 28b are arranged at opposite outwardly facing surfaces 4a, 4b of the vacuum insulated glass unit 1, so that the edge 8a of the vacuum insulated glass unit 2 extends into the recessed portion 29 and is held in this recess 29 by means of the holding members 28a, 28b.

A wall part 28c of the holding part 6 interconnects the holding members 28a, 28b and provides a bottom wall member of the recess 29 receiving the vacuum insulated glass unit edge 8a.

A flexible connection arrangement 7 comprising a flexible wall 7a connects the holding part 6 to the elongated frame profile arrangement 20a, in the present embodiment an elongated sash profile 70.

The wall 7a of the flexible connection arrangement 7 is configured to flex (see also FIG. 6b) when the vacuum insulated glass unit 1 exerts a bending moment due to a thermal deflection as explained in various embodiments above in connection to e.g. FIGS. 3, 4 and/or 5. This bending moment is provided about an axis which is substantially parallel to the edge 8a-8d of the VIG unit 1 extending into the recessed portion 29. Hence, the flexible portion of the wall 7a flexes so that the holding part 6 is moved relative (see dashed arrow and FIG. 7) to the elongated frame profile arrangement 70, 20a to which the individual holding part 6 is connected.

As can be seen, the VIG unit 1 is held between the holding members 28a, 28b by means of fixation arrangements 45a, 45b of the holding arrangement 6. These fixation arrangements 45a, 45b may be elongated members made from a glue, a rubber material such as natural rubber and/or synthetic rubber, and/or or a plastic material, it may be a silicone material, a glue and/or an adhesive tape.

A resilient, elongated tightening gasket or sealing 50*a* may in embodiments of the present disclosure extend parallel to the edge 8*a* between a surface 72 of the elongated member 20*a* and the VIG unit 1 surface 4*a*. This elongated tightening gasket or sealing 50*a* is configured to seal the space 66 between the major surface 4*a* of the vacuum insulated glass unit and the frame 20. This provides a water and/or air tightening between the frame and the vacuum insulated glass unit 1. The gasket/seal 50*a* may be placed between a fixation arrangement 45*a* and the frame opening 21.

In FIGS. 6*a* and 6*b*, the resilient gasket/seal 50*a* is placed between the flexible connection arrangement 7 and the VIG unit 4*a* surface.

Hence, when the thermal deflection of the VIG unit changes due to a temperature difference change, the deflection (and/or compression) of the gasket/seal 50*a* will change, but the gasket/seal 50*a* will, due to the resiliency, still provide an air tightening between the surface 4*a* and the frame 20 in that it will follow the surface 4*a* movement.

The holding part 6 and/or flexible part 7, and e.g. also the elongated sash member 70 may in embodiments of the present disclosure e.g. be made from a plastic material such as a PVC (polyvinyl chloride) or PP (polypropylene) plastic material, it may be composite material such as a glass or carbon fibre material, the profiles may be made from a plastic material with fibres embedded to obtain a more strong/rigid profile and/or the like. Also, in one or more embodiments, one or more of the profiles of the frame may be made from a metal such as aluminium or another suitable metal alloy.

In the example of FIGS. 6*a* and 6*b*, the flexible connection arrangement 7, the elongated frame/sash member 70 and the holding part 6 is integrated in the same frame profile 28. The profile 28 may either be an extruded, moulded or pultruded, such as co extruded or co pultruded, profile. The elongated sash profile 70 extending in the longitudinal direction of the VIG unit comprises an insulating cavity 26 enclosed by the sash profile wall. It is understood that the elongated sash profile may comprise a plurality of cavities extending in the longitudinal direction of the profile (substantially along/parallel to the edge 8*a*), and these may be separated by partition walls (not illustrated) obtained during the manufacturing of the profile. One or more these compartments/cavities 26 may in embodiments of the present disclosure be filled with an insulating arrangement (not illustrated) such as an insulating foam, a polystyrene material, a glass fibre insulation such as glass wool or mineral wool, it may comprise an aerogel insulating material and/or the like, but it/they 26 may also be kept substantially empty and thus just be filled with a gas such as air.

The width W2 of the recess 29 provided between members 28*a*, 28*b* may in embodiments of the present disclosure be configured to substantially not change when the VIG unit edge 8*a* thermally deflect to describe an edge deflection curve as described above, and thus substantially no variation in the distance/width W2 may occur, for example when the temperature difference ΔT varies in the range of 5° C. to 40° C. or to 65° C., such as from −15° C. to +45° C. The allowed thermal deflection of the edge 8*a* describing a deflection curve may hence be provided in the spaces 66.

In other embodiments of the present disclosure, the distance/width W2 between the holding members 28*a*, 28*b* may, at least at some areas of the holding members 28*a*, 28*b* along the edge 8*a* be configured to be allowed to vary due to the thermal deflection of the VIG unit edge 8*a*, such as between 0.1% and 10% (or more), e.g. between 0.5% and 8%, such as between 0.1% and 4%, for example between 0.5% and 3% of the width W2 (determined at ΔT=0° C.). This may e.g. apply at least when the temperature difference varies in the range of 5° C. to 40° C. or to 65° C., such as from −20° C. to +45° C., or at even larger temperature differences.

The profile 28 comprises distancing walls/portions 7*b* providing the flexing space 19 which the holding part 6 and the wall 7*a* of the flexible connection arrangement 7 can deflect/move into and away from when subjected to a thermal bending. This space 19 is provided between the flexible wall 7*a* and the elongated sash profile 70.

The flexible connection arrangement 7 may thus suspend the vacuum insulated glass unit with a distance from the elongated frame profile arrangement's 70 to which the holding part 6 is connected.

In FIGS. 6*a* and 6*b*, two separated distancing walls/portions 7*b* providing an enclosed space there between are provided. This may e.g. help to improve rigidity of the profile in the area of the walls 7*b*, but it is understood that the profile 28 may also just, in other embodiments comprise just one distancing wall/portion 7*b* (see e.g. one or more embodiments of the present disclosure described below). The distancing wall or walls 7*b* may in further embodiments of the present disclosure also provide a flexible part of the flexible connection arrangement 7.

As can be seen in FIG. 6*a*, the wall 7*a* of the flexible connection arrangement extends from the holding member 6 and comprises a bend 31*a* towards a plane P3. This plane P3 extends substantially perpendicularly through the frame opening 21 plane P2 and is substantially parallel to the edge 8*a* of the VIG unit extending into the recess 29 of the holding part 6. The bend 31*a* provides that the flexible portion of the wall 7*a* is arranged opposite to the outwardly facing major surface 4*a* of the vacuum insulated glass unit.

As can be seen in FIG. 6*b*, the thermal deflection of the edge 8*a* is provided relative to the frame opening plane P2. Only a deflection towards the sash profile 70 is illustrated in FIG. 6*b*, but it is understood that the flexible wall 7*a* may allow the edge 8*a* to deflect in the opposite direction relative to the plane P2 if the temperature difference changes as e.g. previously explained, see e.g. FIG. 5.

In embodiments of the present disclosure, the maximum distance DIS1 between the outer surface 75 of the sash profile 70 facing the flexing space 19, and the surface of the holding member 28*a* facing the flexing space 19 (determined substantially perpendicularly to the surface 4*a* and opposite to the edge seal 3) may be between 0.5 cm and 15 cm, such as between 0.5 cm and 15 cm, such as between 0.7 and 7 cm, e.g. between 1 cm and 6 cm.

In embodiments of the present disclosure, the minimum distance DIS1 between the outer surface 75 of the sash profile 70 facing the flexing space 19, and the surface of the holding member 28*a* facing the flexing space 19 (determined substantially perpendicularly to the surface 4*a* and opposite to the edge seal 3) may be at least 0.4 cm, such as at least 0.5 cm, e.g. at least 1 cm, e.g. at least 1.5 mm.

This distance DIS1 may e.g. dependent on the VIG unit size (height and/or width) and/or the layout of the flexible connection system. This distance DIS1 may in embodiments of the present disclosure apply for one or more positions, or along the entire surface 4*a* of the VIG unit when the temperature difference between the glass sheets 2*a*, 2*b* is substantially 0° C.

Figure 7:
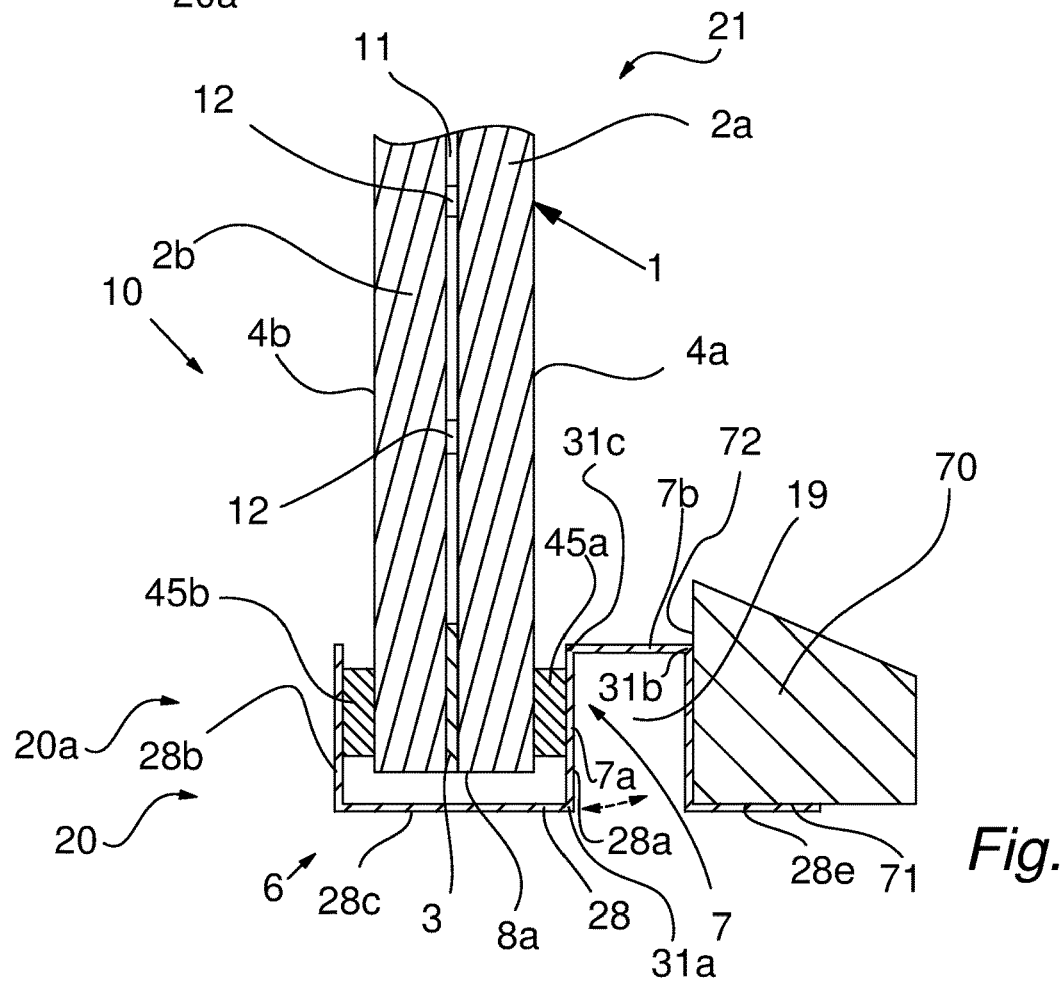

FIG. 7 illustrates schematically a cross sectional view of an elongated frame profile arrangement 20*a* of a frame 20 according to further embodiments of the present disclosure.

A frame profile 28 provides the holding part 6 as e.g. described in relation to FIG. 6a-6b. The bend 31a provides that the wall 7a of the flexible connection arrangement 7 extends into a space between the VIG unit outwardly facing surface 4a and the elongated sash profile 70 extending in the longitudinal direction of the VIG unit 1 edge 8a. The wall 7a provides the holding member 28a, and also the flexible portion. The distancing wall 7b extending from bend 31c provides the flexing space 19, and also it may provide a flexing when the VIG unit, due to thermal deflection, provides a bending moment of a part of the edge about an axis which is substantially parallel to the edge 8a-8d of the VIG unit 1 extending into the recessed portion 29.

In FIG. 7, the walls 7a, 7b, 7c together provides a U-shape where the flexing space 19 is provided between walls 7a, 7c.

The distancing portion/wall 7b ends at or extend from a bend 31b into a further wall portion 7c facing and abutting the surface 74 of the sash profile 70 facing the VIG unit surface 4a. This further wall portion 7c extends from a bend 31b away from the plane P3 (not illustrated in FIG. 7, see FIGS. 6a and 6b) and the distancing wall 7b.

In the embodiment of FIG. 7, the flexible connection arrangement 7 (comprising walls 7a, 7b and possibly also 7c) and the holding part 6 are integrated in the same frame profile 28 which is an extruded, moulded and/or pultruded profile. This profile 28 may e.g. be made from a material as described preciously in relation to FIG. 6. The profile 28 comprises a connection wall part 28e. This part 28e connects the profile 28 to the sash profile 70 at a connection area 71. The connection wall part 28e may be connected (at connection area 71) to the sash profile 70 by means of mechanical fasteners (not illustrated) such as screws or nails, one or more snap connections, one or more tongue and groove connections and/or the like. The connection wall part 28e may also or alternatively be connected to the profile 70 by means of an adhesive. Also, in one or more embodiments, the sash profile 70 to which the connection wall part 28e is connected may be made from a metal such as aluminium, and/or a wood material such as core wood or glued laminated wood. In further embodiments of the present disclosure, the sash profile 70 may be an extruded, pultruded or moulded profile, e.g. made from a plastic material such as a PVC (polyvinyl chloride) or PP (polypropylene) plastic material, it may be composite material such as a glass or carbon fibre material, it may be made from a plastic material with fibres embedded to obtain a more strong/rigid profile and/or the like. The sash profile 70 may either be hollow as e.g. previously described, or it may be solid (e.g. a solid wood material profile).

Figure 8:
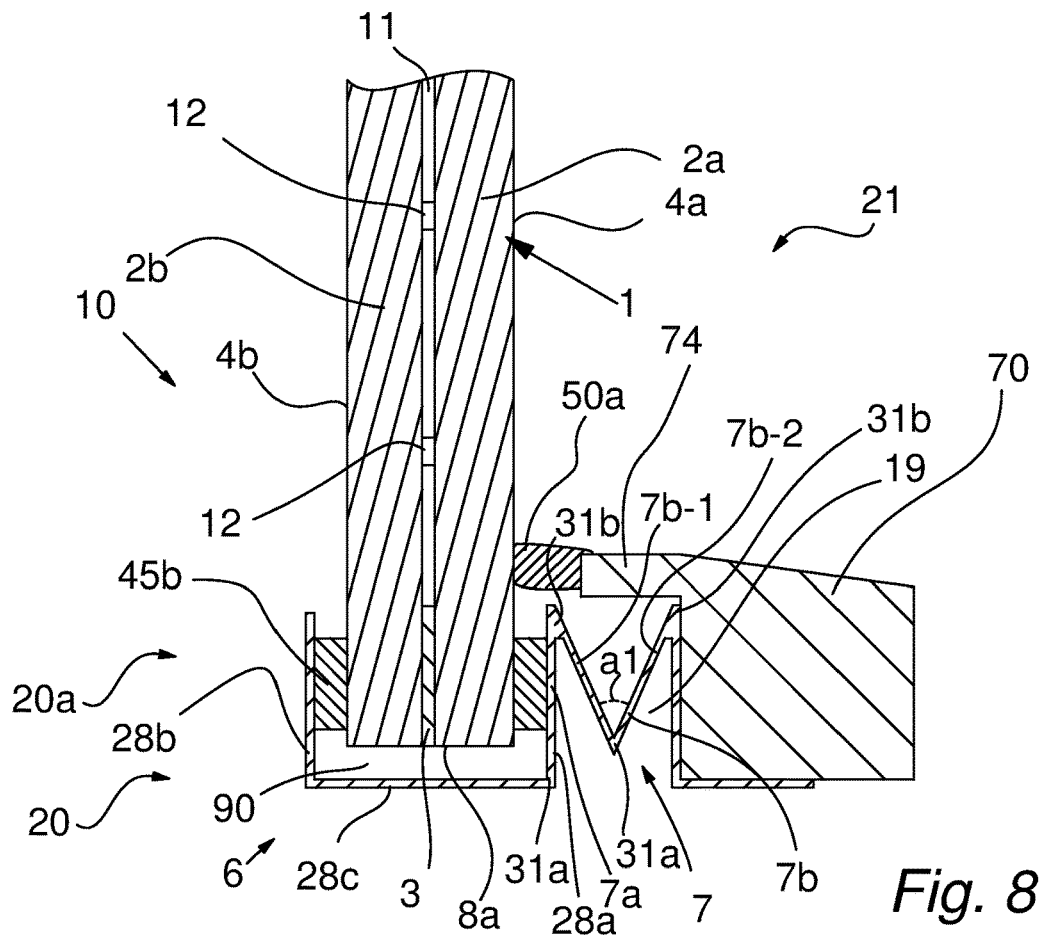

The sash profile 70 may generally in embodiments of the present disclosure be connected to one or more hinge connections so as to allow the sash profile 70 and thus the remaining part of the frame 20 and the VIG unit 1 to be moved and opened and closed relative to a fixed frame arrangement (not illustrated in FIG. 8).

When a thermal deflection of the VIG unit edge 8a is provided in the embodiment of FIG. 7, the walls 7a, 7b, or the distancing wall 7b alone of the flexible connection arrangement 7 may flex due to the provided flexing space 19. The flexing may also or alternatively be provided at or around the area of bend 31b and/or 31c of the flexible connection arrangement 7.

As can be seen, in various embodiments of the present disclosure, see e.g. FIGS. 6a-7 described above, the profile 28 may provide (in a cross sectional view) an S shape (shaped by profile 28 members 28a, 28c, 7a/28a, 7b, 7c) providing the holding part 6 and the flexible connection arrangement 7, so that one of the recesses of the S shape provides the recess 29, and the other, oppositely directed recess of the S defines/provides the flexing space 19.

FIG. 8 illustrates schematically a cross sectional view of an elongated frame profile arrangement 20a of a frame 20 according to a still further embodiment of the present disclosure. The flexible connection arrangement 7 here is substantially as in described and illustrated in relation to FIG. 7. However, the distancing wall 7b providing the flexing space 19 comprises two wall parts 7b1, 7b2 arranged with a mutual angle a1 which is less than 180°. For example, the angle a1 may be between 10° and 160°, such as between 20° and 120°, e.g. between 30° and 80°. These wall parts meets at a further bend 31a from which the wall parts 7b-1, 7b-2 extends towards the respective bends 31b. The bend 31a connecting the walls 7b1, 7b2 provides a bend of the wall 7b towards the plane P3. Hence, the walls 7a, 7b (comprising wall parts 7b-1 and 7b-2) and the wall 7c together provides a Σ(sigma)- or M-shape.

The wall 7a is displaced towards and away from the flexing space 19, and the angle a1 between wall members 7b-1, 7b-2 may be reduced or increased dependent on the amount and direction of thermal deflection of the VIG unit edge, thus also decreasing or increasing the distance between the wall members 7b-1 7b2 of the distancing wall 7b.

FIG. 8 illustrates a further embodiment of the present disclosure, wherein the sash profile 70 comprises a recessed portion defining a part of the space 19 for receiving a part of the flexible connection arrangement 7. An elongated, elevated sash part/wall 74 extends from the sash profile 70 and provides a separation wall 74 between the flexible connection arrangement 70 and the frame opening 21. This separation wall 74 provides a surface/support for supporting a resilient gasket/seal 50a (as previously explained) in a space between the VIG unit 1 and a surface, such as the surface of the separation wall 74 proximate the VIG unit surface 4a. The flexible connection arrangement 7 can flex relative to the wall 74, and the wall 54 and the seal/gasket 50a together separates and shields the flexible connection arrangement 7 and the flexing space 19 from the frame opening 21.

In embodiments of the present disclosure, the distance between the surface 4a and the partition wall 74 surface proximate the surface 4a, measured perpendicularly to the surface 4a) may be above 2 mm, such as above 4 mm, e.g. above 6 mm. In further or other embodiments of the present disclosure, the distance between the surface 4a and the partition wall 74 surface proximate the surface a4 may be between 2 mm and 5 cm, such as between 3 mm and 20 or 30 cm. This may in embodiments of the present disclosure apply for one or more positions, or along the entire surface 4a of the VIG unit when the temperature difference between the glass sheets 2a, 2b is substantially 0° C.

It is generally understood that the resilient gasket/seal 20a may be a rubber, plastic, silicone and/or foam seal or gasket which may be separate to the sash 70 and glued or in other was connected mechanically by compression of the gasket, by nails, screws, clips or the like to the sash profile 70 or a part of the profile 28 (see e.g. embodiments of FIG. 6a-6b described above). The gasket or seal 50a, may in further embodiments of the present disclosure be provided by co-manufacturing such as co-extrusion or co-pultrusion with the flexible connection arrangement 7 (e.g. in relation to the embodiment illustrated in FIG. 6a-6b) and/or the elongated sash profile 70.

Figure 9:
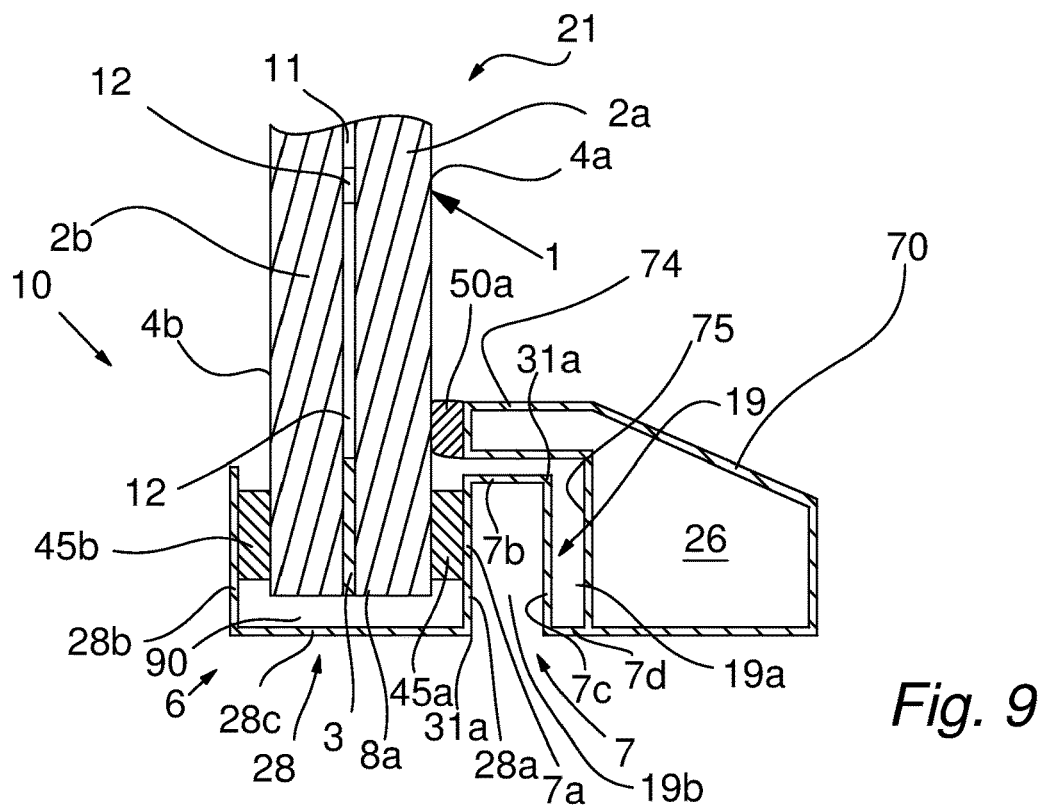

FIG. 9 illustrates schematically a cross sectional view of an elongated frame profile arrangement 20*a* of a frame 20 according to embodiments of the present disclosure. Here, the elongated sash profile 70 the holding part 6 and the flexible connection part 7 connecting the holding part 6 to the sash profile 70 are integrated together, and may be provided e.g. by means of pultrusion, extrusion or moulding.

The profile also provides the separation wall 74 as described in relation to FIG. 8, and extending from the sash profile 70.

FIG. 9 illustrates a further embodiment of the present disclosure, where a flexing space 19*a* is provided between the wall 7*c* of the flexible connection arrangement and the sash profile's 70 surface 72 facing the VIG unit. This flexing space 19*a* allows the U-shaped (or alternatively e.g. M or sigma shaped) flexible connection arrangement 7, including both of the walls 7*a*, 7*c* and 7*b* to flex into and away from this space 19*c* during thermal deflection of the VIG unit edge 8*a*. Additionally, the flexing space 19 between the sash profile 70 and the VIG unit surface 4*a* provides a space 19*b* between the walls 7*a*, 7*c*, and also the mutual distance between these walls 7*a*, 7*b* may be changed in response to the thermal deflection of the VIG unit edge 8*a* in response to a deflection of the walls 7*a*, 7*c* and/or the end distancing wall 7*b*.

Accordingly, the walls 7*c*, 7*b*, 7*a* may in embodiments of the present disclosure be distanced from the surface 72 of the sash profile 70 by means of a further distancing wall 7*d* of the flexible connection arrangement.

In FIGS. 6*a* and 6*b*, a flexing axis AX1 around which the flexible connection arrangement 7 flexes, due to the bending moment (M) exerted by the VIG unit on the holding parts (6) due to thermal deflection is illustrated. It is however understood that the flexing provided by the arrangement 7 may be complex and comprise one or more rotational movements and/or linear movements, and/or displacements of the wall or walls 7*a*, 7*b*, 7*c*, 7*d* of the flexible connection arrangement 7 into and away from the space(s) 19*a*, 19*b*, 19, e.g. as described in relation to one or more embodiments above in relation to FIG. 6*a*, 6*b*, 7, 8 and/or 9.

In FIG. 6*b*, the holding part 6 will rotate relative to the elongated frame profile arrangement 70 to which the holding part 6 is connected about the rotation axis AX1. This axis AX1 is parallel to the edge 8*a* of the VIT unit 1 extending into the recessed portion 29. This is naturally in the case that the bending moment M comprises a component having a bending axis AX1 which is parallel to the rotation axis.

As illustrated in several of the above mentioned embodiments (see e.g. FIGS. 6*a*-9) of the present disclosure, the bend 31*a* may, in embodiments of the present disclosure, provide that the wall 7*a* comprising the flexible portion can provide or support the holding member 28*a*. Hence, a space 66 may be provide between the wall 7*a* and the VIG unit surface 4*a*, so that a suspension element 45 may be provided in the space 66 between the connection member 28*a* and the wall 7*a*.

As also illustrated in FIGS. 6*a*-9, the fixation elements 45*a*, 45*b* may in embodiments of the present disclosure provide fixation of the vacuum insulated glass unit 1 in the frame 20 at opposite, outer surfaces 4*a*, 4*b*, of the vacuum insulated glass unit 1 unit along and opposite to the edge seal 3 of said vacuum insulated glass unit 1 sealing seals the gap 11 between the VIG unit glass sheets 2*a*, 2*b*. Hence, the edge seal 3 is placed between the fixation arrangements 45*a*, 45*b* and the holding member 28*a*, 28*b*.

The tightening gasket or sealing 50*a* is arranged between the frame opening 21 and the flexible connection arrangement 7 in FIGS. 8 and 9, and the gaskets or sealing provides a tightening between the outwardly facing major surface 4*a* of the VIG unit and the frame 20 (in the illustrated embodiment the separation wall 74).

Figure 10:
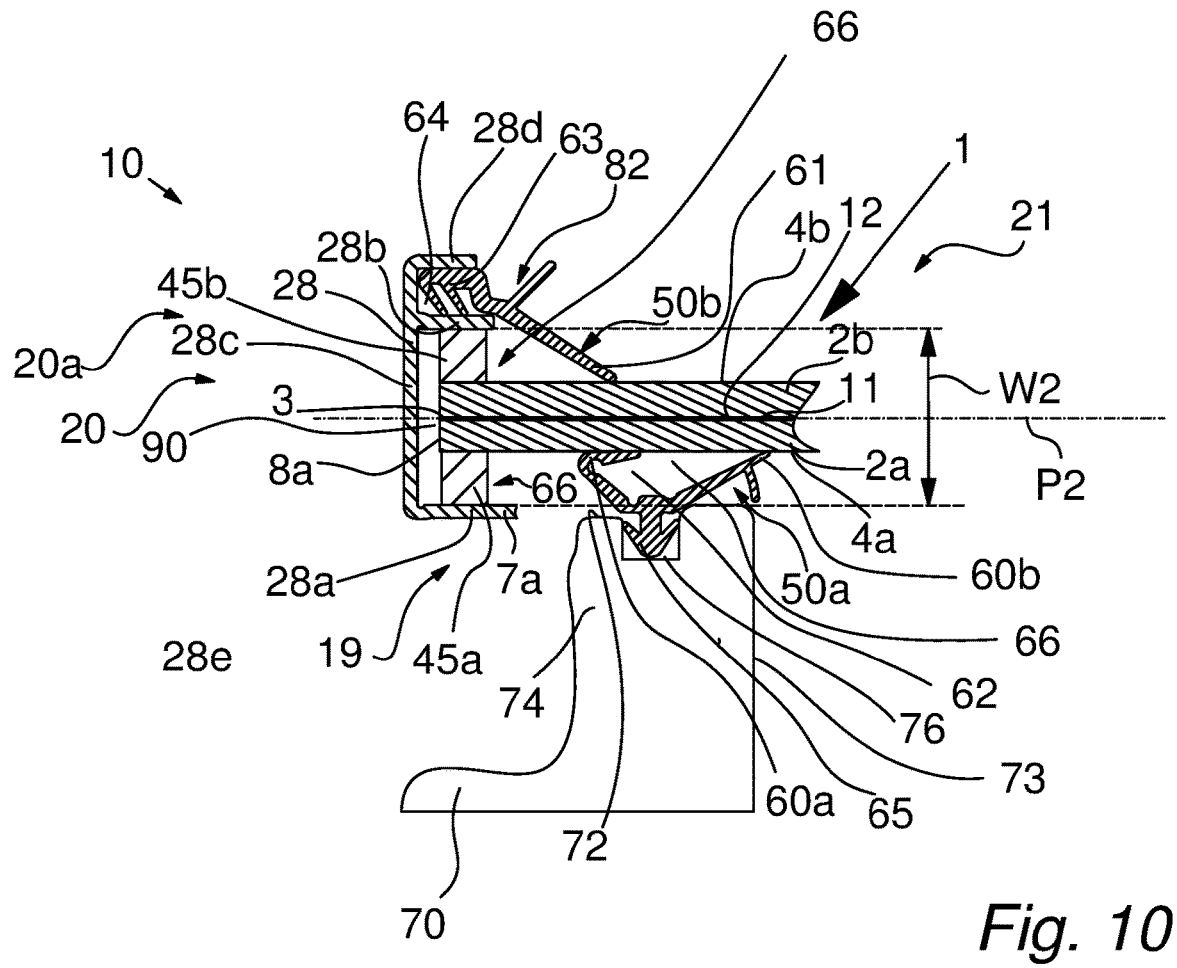

FIG. 10 illustrates schematically a cross sectional view of several embodiments of the present disclosure where the VIG unit frame assembly 10 is a window.

Here the gasket/seal arrangement 50*a* is placed between the separation wall 74 and the VIG unit surface 4*a*, but it may also alternatively have been placed between the wall 7*a* and the surface 4*a*, see e.g. FIGS. 6*a* and 6*b*.

The gasket arrangement 50*a* is arranged to provide an air tightening at the surface 4*a* of the VIG unit 1 for facing the interior of the building, and comprises two elongated flaps/lips 60*a*, 60*b* each deflected (and not as such compressed) by the VIG unit surface 4*a* compared to a free state, and in contact with/abutting the VIG unit surface 4*a*. These tightening flaps/lips 60*a*, 60*b* help to protect against condensation at the VIG unit edge 8*a* area due to a cold bridge provided between VIG unit glass sheets by the edge sealing 3.

A space 62 defined between the flaps/lips 60*a*, 60*b* and enclosed by the VIG unit surface 4*a* helps to provide an air and/or heat insulation.

The gasket arrangement 50*a* thus follow the VIG unit edge 8*a* movement when the VIG unit's thermal deflection changes due to a temperature difference variation, due to the resilient properties of the gasket arrangement 50*a*, so as to provide an air tightening functionality.

The seal/gasket arrangement 50*b* is arranged to provide a water tightening at the outer surface 4*b* of the VIG unit 1 to face away from the interior of the building. This gasket arrangement 50*b* also comprises an elongated flap/lip 61 deflected by the outer surface 4*b* of the VIG unit 1. This flap/lip 61 follow the VIG unit movement when the VIG unit's thermal deflection changes due to a temperature difference variation, due to the resilient properties of the gasket arrangement 50*b*, so as to provide a water tightening functionality, e.g. to protect the interior of the frame such as the space 66 and recess 29 from moist, dew, rain water and/or the like. The gasket arrangement 50*b* thus follows the difference in the edge deflection curve caused by thermal deflection.

Generally, as one of the gasket arrangements 50*a*, 50*b* hence become less deflected by the VIG unit as the thermal deflection of the VIG unit changes, the lips/flaps of the other gasket will at the same location of the VIG edge 8*a* simultaneously become more deflected.

As can be seen, the outer gasket 50*b* may in embodiments of the present disclosure be connected to the frame 20 by being inserted in a gasket recess 64 of the holding member profile 28 dedicated to this. The recess 76 receives a connection part 63 of the elongated gasket arrangement 61. This gasket recess or groove 64 is defined between the holding member 28*b*, and a further gasket support member/wall 28*d*.

The recesses 29 and 64 extends parallel in the longitudinal direction of the frame profile arrangement 20*a*, along the longitudinal direction of the edge 8*a* of the VIG unit.

The sash profile 70 may be configured to face the interior of the building. The separation wall 74 comprises a groove 76 in a surface 72 of the wall 74 facing the VIG unit surface 4*a*. This groove 71 receives a connection part 65 of the gasket arrangement 50*a*, so that the gasket arrangement 50*a* extend between the sash profile surface 72 and the VIG surface 4*a*. Also or alternatively, the groove 76 may be arranged in another surface 73 dependent on the design of the gasket/seal arrangement 50*a*.

Figure 14:
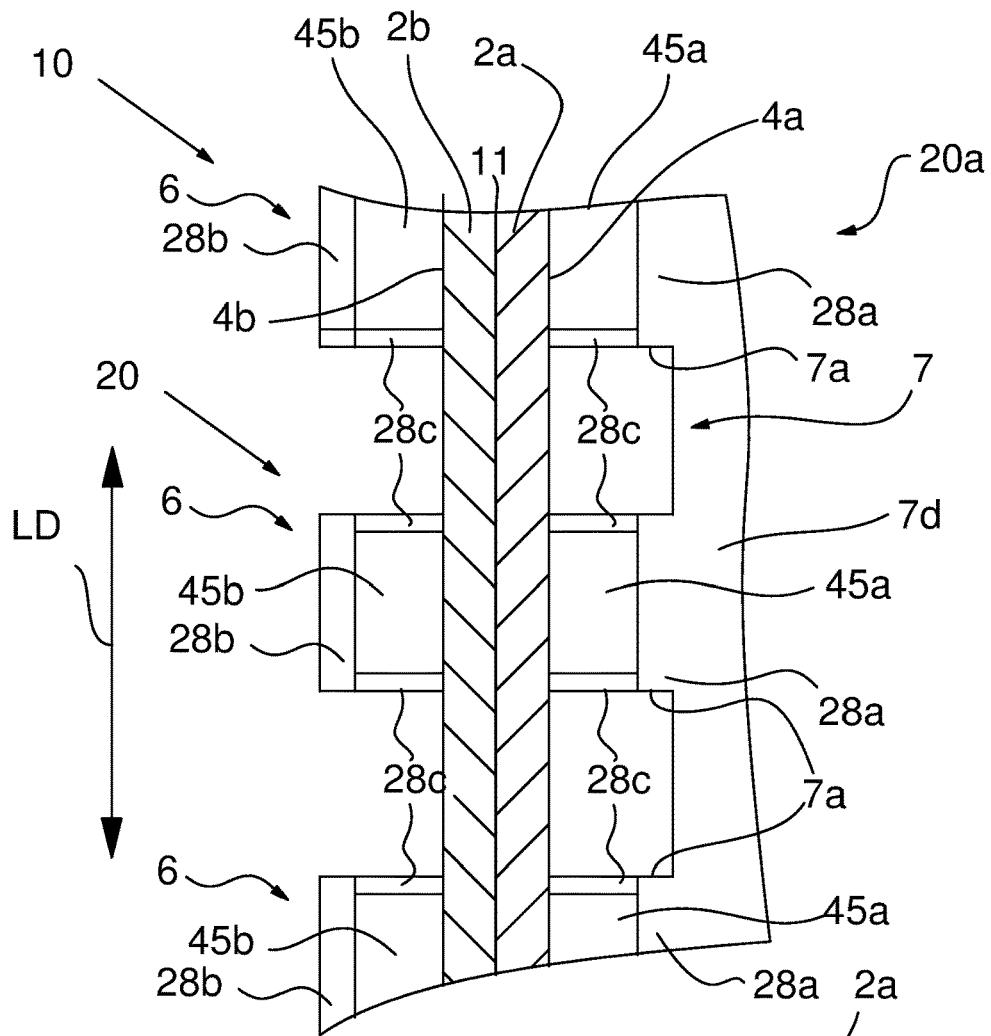

It is naturally to be understood that in other embodiments of the present disclosure, the gasket arrangements 50a, 50b may be attached/connected to the frame 20 by any other suitable means such as by means of glue, nails, screws or the like and/or be attached/connected to the frame at other location than the ones illustrated and described in relation to FIG. 14.

As illustrated in FIG. 10, the width W2 of the recess 29 between holding members 28a, 28b may be larger than the thickness of the part of the VIG unit edge 8a extending into the recess 29, and hence, a predefined space 66 may be provided between the outer surface 4a, 4b of the glass sheets 2a, 2b of the VIG unit 1, and holding members 28a, 28b.

The VIG unit 1 may either thermally deflect in this space 66 between the walls 28a, 28b so as to describe the previously described "deflection curve" of the edge 8a in the recess 29, and/or the holding members 28a, 28b may deflect along with it.

In embodiments of the present disclosure, the distance 66 between the holding members 28a, 28b and the respective VIG unit surface 4a, 4b may configured to be larger than 2 mm, such as larger than 4 mm e.g. larger than 6 mm, such as larger than 8 mm when the VIG unit is kept at a constant temperature such as 20° so that the glass sheets of the VIG unit are at the same temperature. In embodiments, the spaces 66 width between the respective holding member 28a, 28b and VIG unit surface 4a, 4b may be configured to be between 4 mm and 12 mm, such as between 4 mm and 10 mm, e.g. between 5 mm and 8m when the VIG unit is kept at a constant temperature such as 20° so that the glass sheets of the VIG unit are at the same temperature.

The gasket flap/lips 60a, 60b, 61 seals this space 66, and may thus comprise a surface facing the exterior of the frame arrangement 20, such as facing the frame opening 21.

The space 66 may in embodiments of the present disclosure provide a minimum distance between an outer major surface 4a, 4b of the vacuum insulated glass unit and walls 28a, 28b of said frame. This minimum distance may in embodiments of the present disclosure be at least 4 mm such at least 5 mm, for example at least 6 mm at a temperature difference ΔT=T1−T2 between the two glass sheets 2a, 2b of the vacuum insulated glass unit of substantially 0° C.

Figure 11:
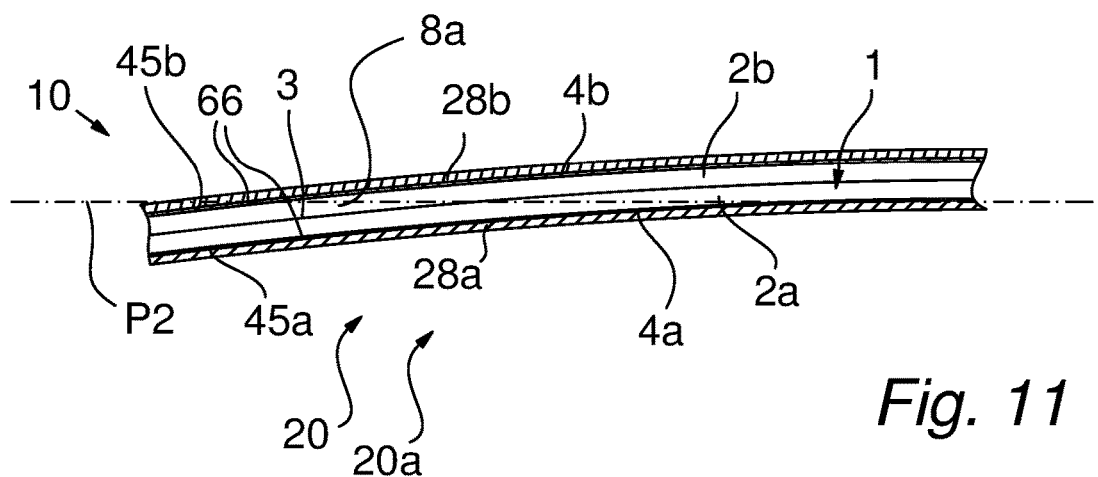

FIG. 11 illustrates schematically a cross sectional view according to embodiments of the present disclosure through the holding members 28a, 28b between the interconnecting wall 8c (not visible in FIG. 11) and the edge 8a, and is a view towards the edge 8a of the VIG unit 1. The edge 8a is subjected to thermal deflection, and hence describes a deflection curve. The flexible connection arrangement 7 and the elongated sash profile is omitted from FIG. 11 to improve understanding of the figure. In this embodiment of the present disclosure, the holding members 28a, 28b of the holding part 6 are configured to follow and deflect together with the deflection of the VIG unit 1 edge 8a. The holding members 28a, 28b of the holding part 6 are thus flexible enough to follow the deflection curve of the edge 8a. The fixation arrangements 45a, 45b may here e.g. be a glue or adhesive tape, it may be gaskets such as rubber gaskets and/or the like. The deflection forces provided by the VUG unit 1 due to thermal deflection is transferred through these fixation arrangements 45a 45b to the holding members 28a, 28b. The VIG unit 1 may here slide relative to the holding members 28a, 28b when the edge deflection changes. Thus, in FIG. 11, a certain deflection in the space between the holding members 28a, 28b, may occur in the space 66 relative to the holding members, but also, as illustrated, the holding members 28a, 28b may deflect together with the VIG unit due to the thermal deflection of the edge 8a.

Figure 12:
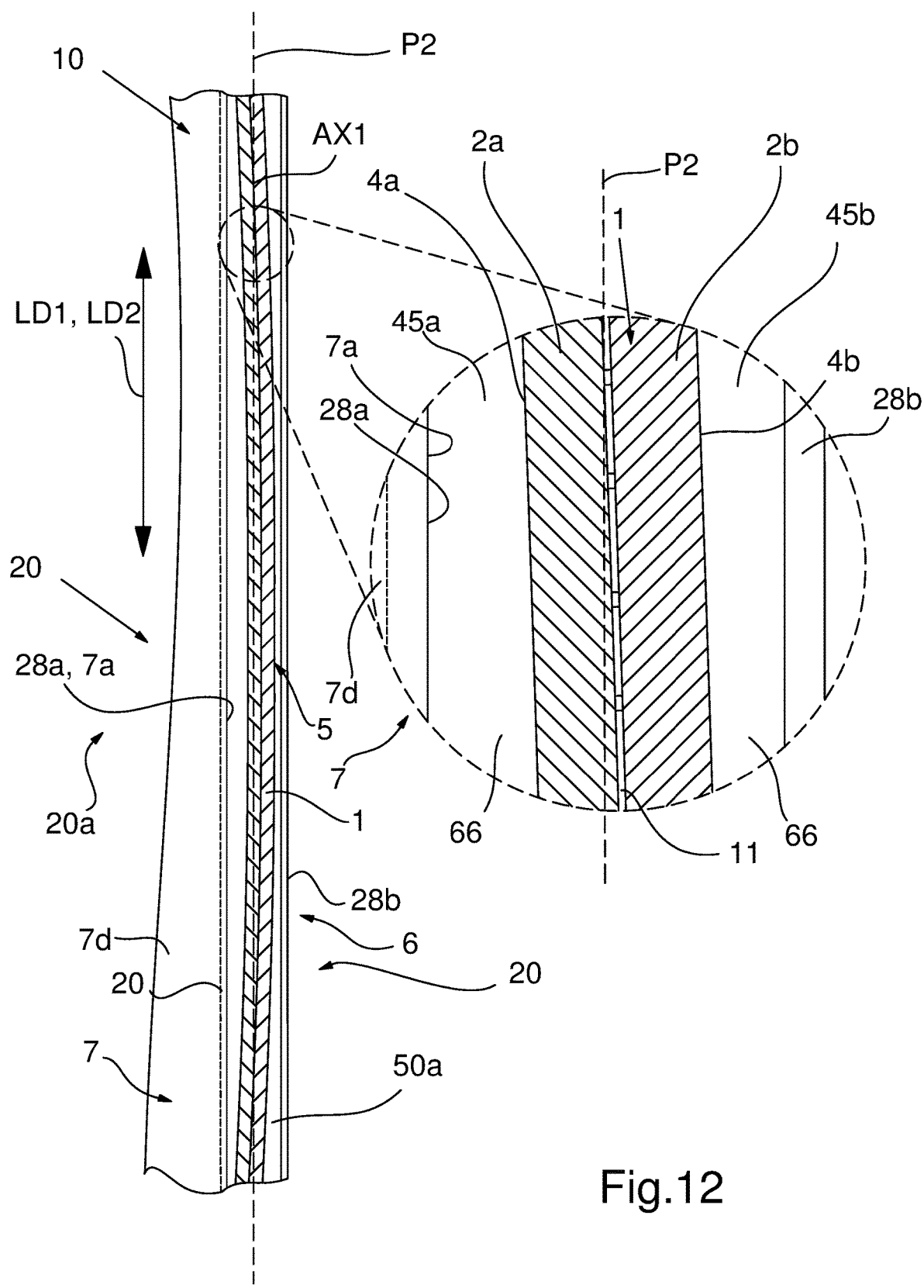

FIG. 12 illustrates a cross sectional view of a VIG unit 1 placed in a frame 20, seen in a direction parallel to the frame opening 21 provided by the frame 20 and towards the elongated frame profile 20a, according to embodiments of the present disclosure.

As can be seen, the VIG unit 1 edge may thermally deflect/bend relative to the holding members 28a, 28b, so that the distance between the outer major surfaces 4a, 4b of the VIG unit 1 and the holding members 28a, 28b/near the edge of the VIG unit varies due to a temperature difference between the VIG unit glass sheets 2a, 2b.

This causes the fixation arrangements 45a, 45b to expand or be further compressed in the space by the VIG unit due to the thermal deflection along the longitudinal direction LD1, of the holding members 28a, 28b, and the amount of compression of the respective fixation arrangements varies along the direction LD1 corresponding/according to the thermal deflection of the VIG unit edge. The amount and even direction of the thermal deflection of the VIG unit edge may change over time due to a change in the temperature difference between the VIG glass sheets 2a, 2b as e.g. previously described, and this also causes a change in the amount of compression of the 45a, fixation arrangements 45a, 45b over time.

FIG. 12 moreover illustrates a further embodiment of the present disclosure, wherein the fixation arrangements 45a, 45b are pre-compressed, elongated gasket strips configured to extend in the longitudinal direction of the edge 8a-8d of the vacuum insulated glass unit 1 extending in between the holding members 28a, 28b. These gasket strips are pre compressed between the VIG unit surfaces 4a, 4b and the respective holding member 28a, 28b, so that they may be further compressed or the compression may be reduced in response to a change in the thermal deflection of the VIG unit. This may provide that the VIG unit is allowed to deflect between the members 28a, 28b, and still, the fixation arrangements 45a, 45b provides a fixation of the VIG unit between the holding members 28a, 28b, and in the case where the fixation arrangements 45a, 45b are elongated gasket strips as illustrated, it may also provide a water and/or air tightening.

Generally, in embodiments of the present disclosure, the compression and expansion of the fixation arrangements 45a, 45b arranged at the ⅛, such as the 1/10, such as 1/12 of the length of the vacuum insulated glass unit edge nearest a corner where the respective edge terminates, may be configured to be larger than the compression and expansion, respectively, of the same resilient suspension elements at a position closer to the centre 5 of the respective edge.

FIG. 12 additionally illustrates an embodiment illustrates an embodiment of the present disclosure wherein the flexible connection arrangement 7, in this case the wall 7a and distancing wall 7d, and also the holding part 6 including the holding members 28a, 28b is an elongated profile extending in the longitudinal direction LD of the edge 8a8d) of the vacuum insulated glass unit extending into the recess 29 between members 28a, 28b.

Figure 13:
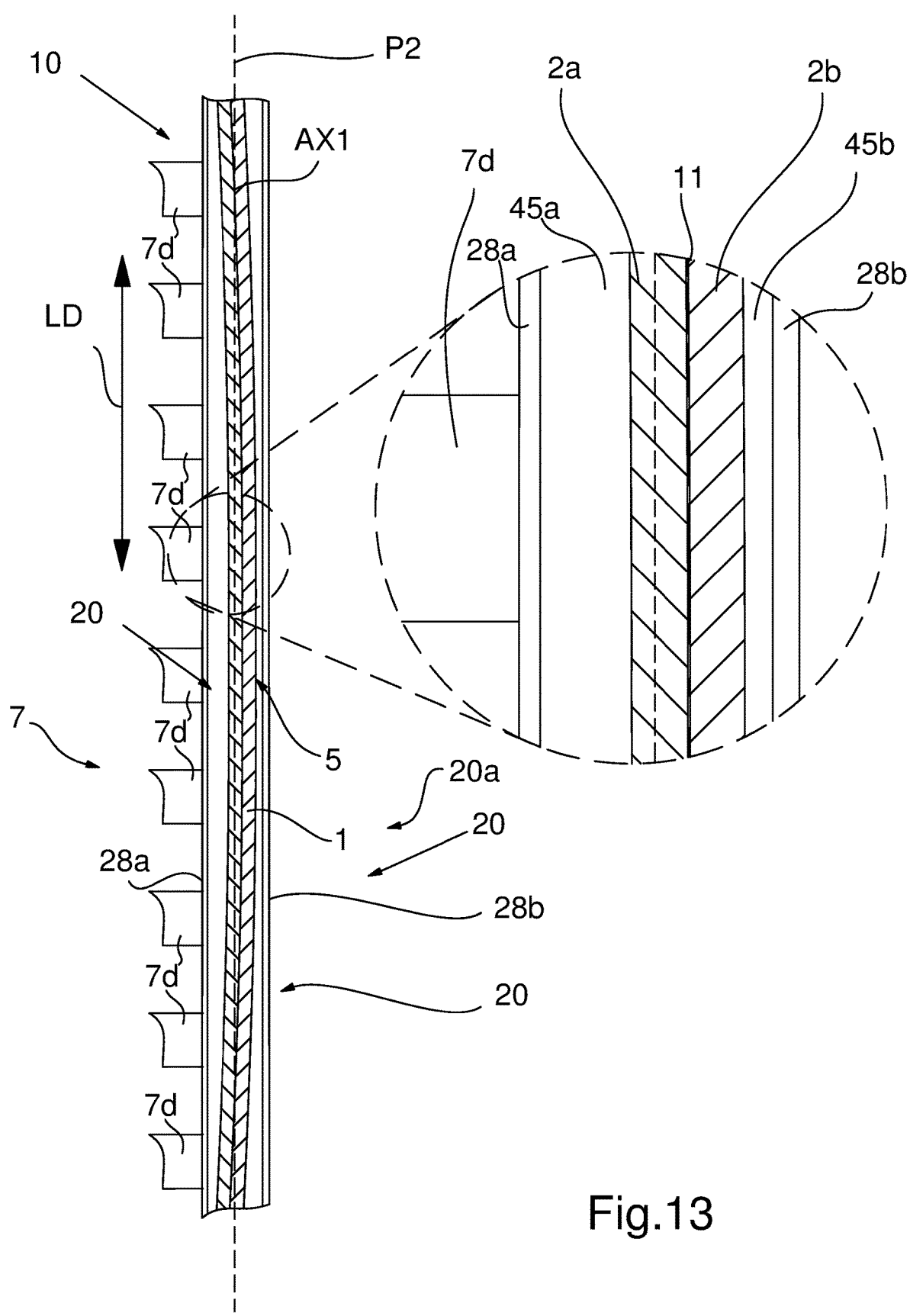

FIG. 13 illustrates schematically a solution according to the present disclosure substantially as illustrated and described in relation to FIG. 12. However, in this embodiment of the present disclosure, while the holding members 28a, 28b are elongated holding members as in FIG. 12, the flexible connection arrangement 7 comprises a plurality of discrete flexible wall members 7d, in this case it is a plurality of discrete distancing walls 7d, distributed in the longitudinal direction LD of the edge 8a-8d of the vacuum insulated glass unit 1 extending into the recess between the holding members 28a, 28b. This may help to improve the flexing properties of the flexible connection arrangement 7 to allow it to adapt to the thermal deflection of the VIG unit edge. It is understood that the discrete walls 7d in embodiments of the present disclosure may be obtained by individual wall members or may be obtained by providing slits in an elongated wall as e.g. illustrated in FIG. 12.

It is understood optional gaskets/seals 50a, 50b as e.g. previously described are not illustrated in FIGS. 12 and 13, but may be present in further embodiments of the present disclosure.

Figure 15:
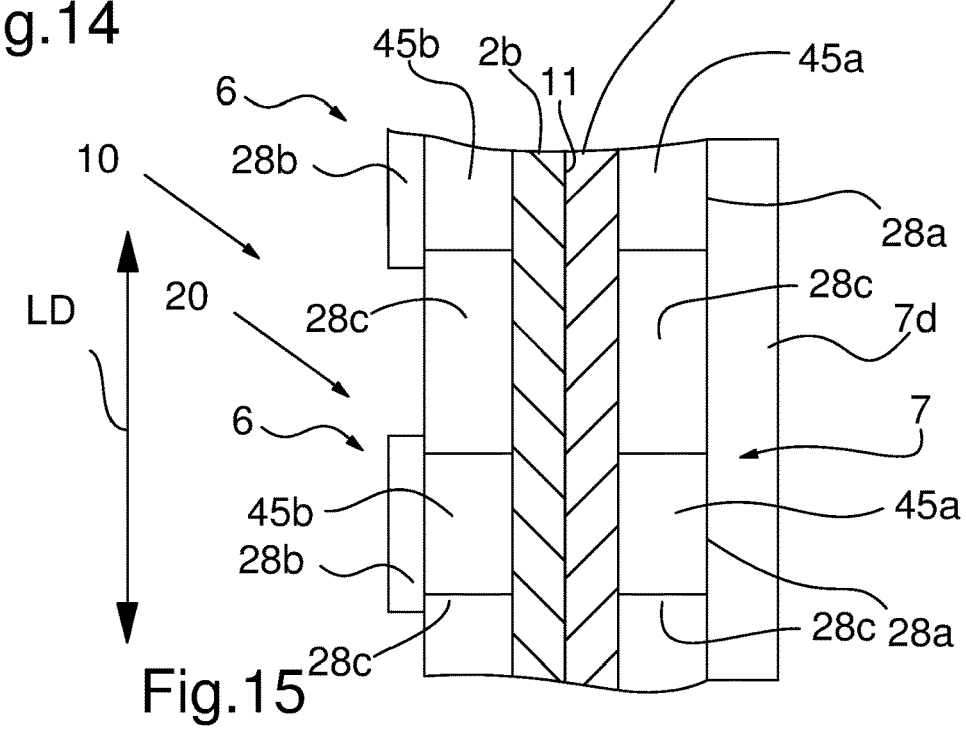

FIGS. 14-15 illustrates schematically embodiments of the present disclosure where a plurality of discrete holding parts 6 each comprising holding members 28a, 28b are distributed in the longitudinal direction LD of the edge 8a-8d of the vacuum insulated glass unit extending into said the recess 29 between the holding parts 28a, 28b. Discrete fixation arrangements 45a, 45b extends between the outwardly facing glass sheet surfaces 4a, 4b and the holding members 28a, 28b, and are distributed in the longitudinal direction of the edge LD at the positions of the holding parts 6.

The interconnecting walls 28c are also in the embodiment of FIG. 14 walls interconnecting the holding members 28a, 28b, and these walls 28c are discretely arranged in the longitudinal direction LD of the VIG unit 1 edge with a space there between. This may e.g. be obtained by individual walls 28c or by providing slits in an elongated wall 28c extending in the longitudinal direction LD of the edge.

In FIG. 15 however, the separation wall 28c is an elongated member extending in the longitudinal direction LD of the VIG unit edge. This wall 28c interconnects a plurality of discretely arranged holding members 28a, 28b.

It is understood that even though the fixation arrangements 45a, 45b illustrated in FIGS. 14 and 15 are discretely arranged in the longitudinal direction of the edge, it is generally understood that the fixation arrangements 45a, 45b may also comprise elongated strips extending between the holding members 28a, 28b along and substantially parallel to the VIG unit edge as e.g. illustrated in FIG. 12 or 13.

It is generally understood that in embodiments of the present disclosure, the fixation arrangements 45, 45b may be pre-compressed, resilient suspension elements 45a, 45b providing a holding force towards the opposite outwardly facing surfaces 4a, 4b of the vacuum insulated glass unit 1 so as to suspend the vacuum insulated glass unit between said first and second holding members. Each of said compressed, resilient suspension elements 45a, 45b may thus be configured to be further compressed or expand in response to the thermal deflection of the edge 8a-8d of the VIG unit 1 due to a temperature difference $\Delta T=T1-T2$ between the two glass sheets 2a, 2b. See e.g. FIG. 12 or 13. Hence, the VIG unit edge may thermally deflect between the holding members 28a, 28b to describe an edge deflection curve as previously explained.

The resilient suspension elements may in embodiments of the present disclosure have a height of at least 8 mm such as at least 10 mm, for example at least 12 mm in an uncompressed state where the VIG unit does not compress the suspension elements. In one or more aspects of the present disclosure, said resilient gaskets have a height of between 7 mm and 30 mm, such as between 8 mm and 20 mm, e.g. between 10 mm and 16 mm in an uncompressed state. The suspension arrangements 45a, 45b may be a gaskets or a plurality of resilient suspension arrangements made from foam, rubber, such as solid or hollow rubber, and/or the like.

Figure 16:
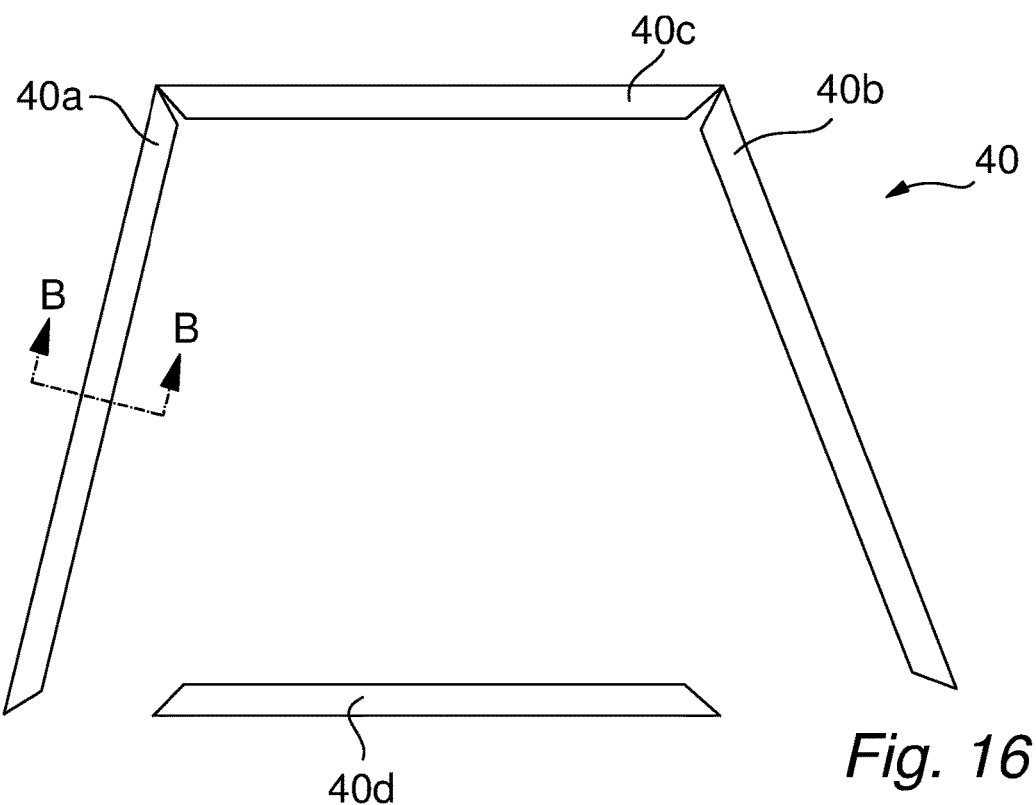

FIGS. 16 and 16B-B illustrates schematically a fixation gasket assembly 40 comprising elongated gasket strips 40a-40d for use in a VIG unit frame assembly 10 according to embodiments of the present disclosure to provide the fixation arrangements 45a, 45b. FIG. 16B-B illustrates a cross sectional view of the cutting planes B-B as illustrated in FIG. 16.

As can be seen from FIG. 16B-B, the gasket strips 40a-40d of gasket assembly 40 has/provides a C-profile providing a recess 43 for receiving the VIG unit edges 8a-8d (not illustrated in FIG. 11). The gasket assembly 40 comprises four elongated gasket strips 40a-40d, one for each VIG edge 8a-8d. Two, or as in the present example three, or four of these elongated gasket members 40a-40d may be folded around the corners of the VIG unit so that the edges of the VIG unit extend into the recess 43 of the C-profile.

The strips 40a-40d may be connected/unbroken at the corners 9 of the VIG unit, and may as illustrated comprise chamfered ends arranged to provide a substantially 90° bend at the corners between adjacent ends of the strips 40a-40d folded at the VIG corners, e.g. so that two adjacent ends of strips 40a-40d arranged at each their edge terminating at the same VIG unit corner 9 abut.

However, in some embodiments of the present disclosure, the strips 40a-40d may not be connected to each other at the corners 9 of the VIG unit 1.

The fourth strip 40d may however also be disconnected from the other as illustrated in order to be fitted appropriately at a bottom frame profile of the frame assembly 20 when installing or exchanging the VIG unit in the frame 20. However, in other embodiments, the fourth gasket 40d may be connected to one or more of the other gasket members 40a-40d, or another type of suspension element may be used. Also, in other embodiments only two or three of the gasket members 40a-40d may be used.

An end wall member 44 of the fixation gasket 40 at the recess 43 bottom connects the gasket side walls 45a, 45b for providing the fixation arrangements between the VIG unit surfaces 4a, 4b and the holding members 28a, 28b. The end wall member 44 is configured to be placed opposite to the VIG unit edges 8a-8d, e.g. so as to abut the VIG unit edges 8a-8d, and the gasket side walls 45a, 45b will thus extend in over the outer surfaces 4a, 4b of the VIG unit 1.

In further embodiments, the gasket strips 45a, 45b may merely be two individual gasket strips.

Figure 17:
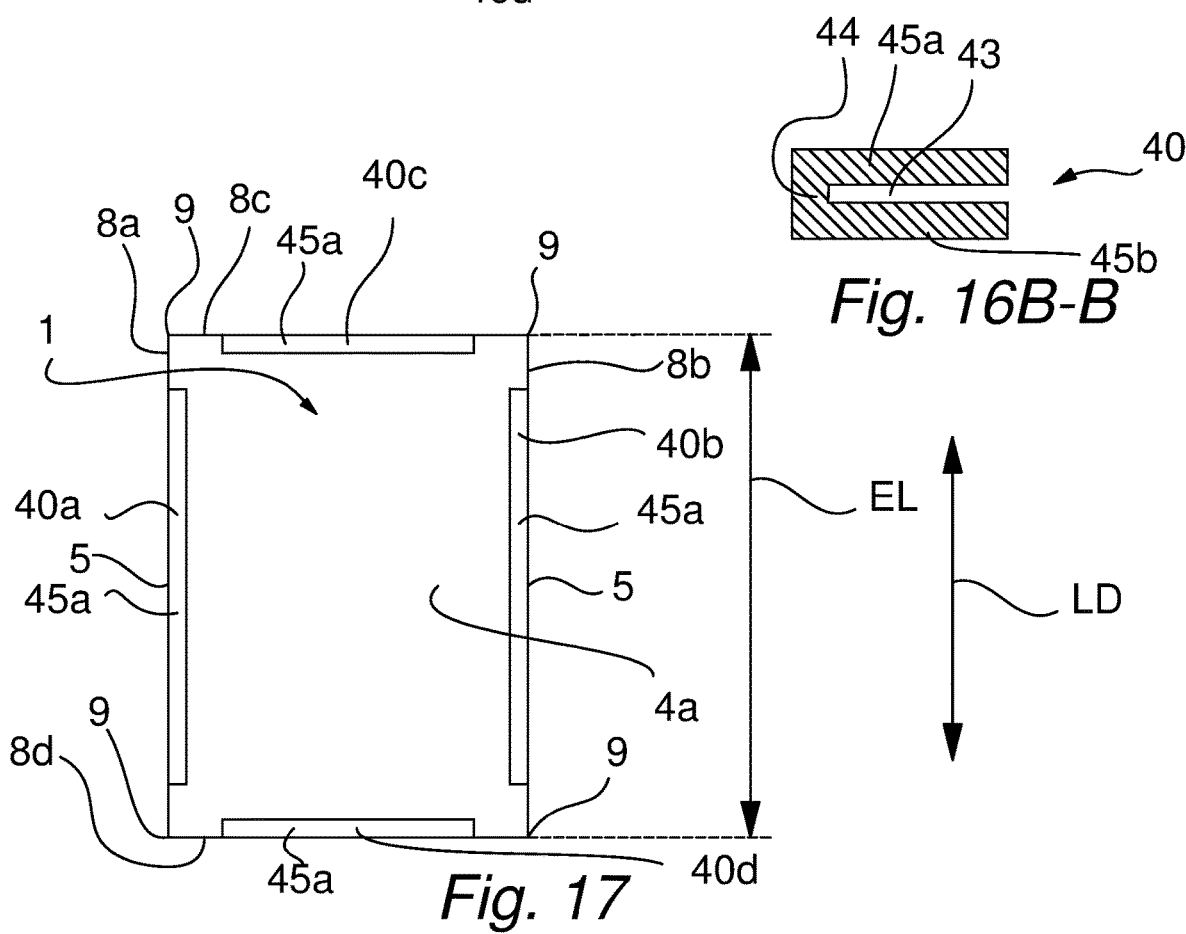

FIG. 17 illustrates schematically a VIG unit 1 according to embodiments of the present disclosure, wherein suspension elements 45a, 45b in the form of elongated gasket strips 40a-40d arranged at the edges 8a-8d of the VIG unit, and supporting on the surface 4a of the VIG unit at the edges around the circumference of the VIG unit. For improved clarity, the holding members and other parts of the frame 20 are not illustrated in FIG. 17.

In this example, the strips 40a-40d (as opposed to the embodiment illustrated in FIG. 11) are not configured to extend all the way to the corners 9 of the VIG unit. Rather, the suspension elements 45a, 45b are arranged to support the centre portion of the VIG unit edges and in both direction towards the corners where the respective edge terminates. The strips 45a, 45b terminates at a distance before the corner 9 of the edge, and thus, no fixation gasket/suspension element may be arranged at the ⅛, such as the 1/10, such as 1/12 of the edge length EL of the edge nearest a corner 9 where the respective edge terminates.

In embodiments of the present disclosure, the holding members 28a, 28b extending along the VIG unit edge, and/or the suspension elements 45a, 45b, may extend at least 40%, e.g. at least 60%, such as at least 80%, for example at least 95%, such as substantially the entire length of the respective edge of the VIG unit.

In embodiments of the present disclosure, the holding members 28a, 28b extending along the VIG unit edge, and/or the suspension elements 45a, 45b, may extend less than least 90%, such as less than 80%, e.g. less than 60%, of the length of the respective edge of the VIG unit.

Figure 18:
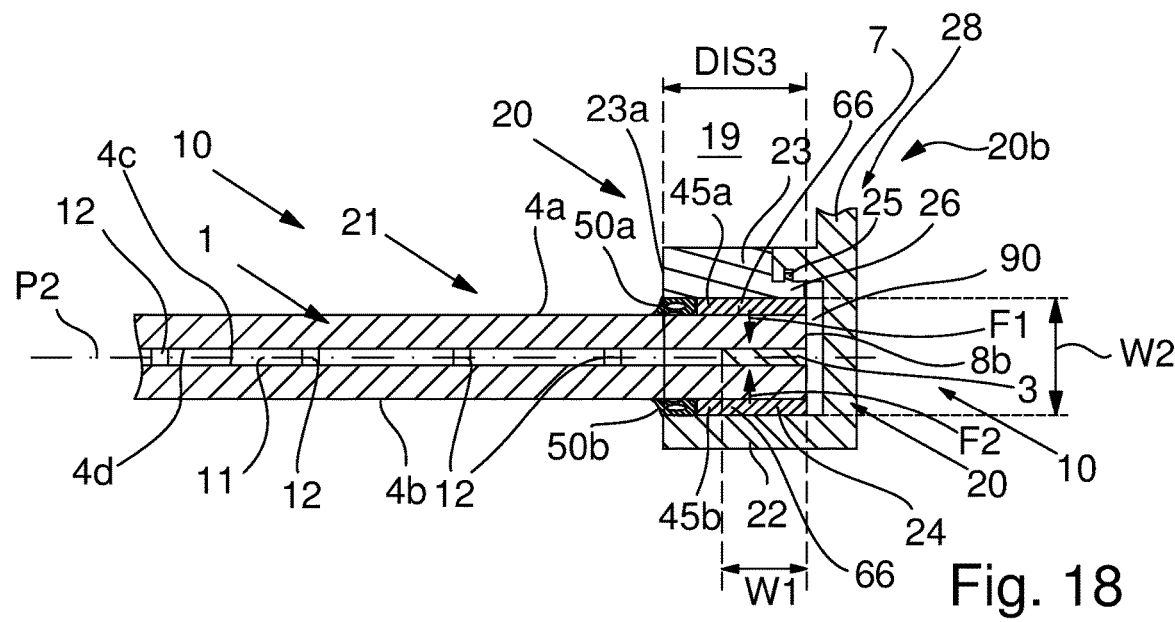

FIG. 18 illustrates schematically a cross sectional view of a VIG unit 1 frame assembly 10 with a base member/glazing member frame solution 20 according to embodiments of the present disclosure.

It is generally understood, that in embodiments of the present disclosure, the frame 20 may overlap the VIG unit edges (in FIG. 18 the VIG edge 8b is illustrated) by a certain amount/distance DIS3. This may help to provide an improved insulation performance of the VIG unit frame assembly 20, as the edge seal 3 material such as a metal material or a solder glass material, for example a low melting point solder glass, may provide a "cold bridge" at the VIG unit edge where it seals the gap 11.

The distance DIS3 may in embodiments of the present disclosure be at least two times the width W1, such as at least three times the width of the edge seal 3, measured along an inner surface facing the gap of one of the VIG glass sheets in a direction perpendicular to the nearby edge 8b. In embodiments of the present disclosure, the distance DIS3 is between two and five times the edge seal width W1.

For example, the overlap DIS3 may in embodiments of the present disclosure be between 10 mm and 50 mm, such as between 20 mm and 40 mm.

The distance DIS3 may be measured along an outer surface 4a, 4b from the edge 8b to the position where the frame assembly 20 ends and a view through the VIG unit 1 glass sheets 2a, 2b is possible. In the present example, it may be measured between the edge 8b and the surface 23a of the frame facing the frame opening 21 or between the edge 8b and edge of the gasket 50a most distal to the edge 8b (see FIG. 21).

It is understood that in further embodiments of the present disclosure (not illustrated in FIG. 18), the outwardly facing surface of the VIG unit 1 to face away from a temperature controlled room such as a room in a building (or a temperature controlled cavity in a freezer or a refrigerator) may either be less overlapped by the frame than the other surface, such as surface 4a, to face the room. This may e.g. be provided at one or more sides of the VIG unit at e.g. the bottom edge, top edge and/or side edges of the VIG unit.

It is generally understood that in one or more embodiments of the present disclosure, the frame profile arrangements 20a-20d may comprise a base member 22 and a glazing member 23. These may be elongated profiles made by means of e.g. an extrusion manufacturing process, a pultrusion manufacturing process, a moulding manufacturing process and/or the like. The material of the profile(s) 22, 23 may e.g., as previously explained be a plastic material such as a PVC (polyvinyl chloride) or PP (polypropylene) plastic material, it may be composite material such as a glass or carbon fibre material, the profiles may be made from a plastic material with fibres embedded to obtain a more strong/rigid profile and/or the like. Also, in one or more embodiments, one or more of the profiles 22, 23 of the frame may be made from a metal such as aluminium, and/or a wood material such as core wood or glued laminated wood material. These profiles may extend continuously between the corners of the frame 20. One frame example can be an aluminium profile with polymer interconnection between the interior and exterior to add a thermal break.

Another frame example according to the present disclosure may be a polymer profile with hollow chambers and reinforcements inside the hollow chambers for adequate strength. Another frame example is a compound frame of wood combined with a non-wood profile.

The glazing member 23 and base member 22 together provides a recess 24 into which the VIG unit edge 8b extend, and provides the functionality of the previously explained holding members described in various embodiments described in relation to one or more embodiments of one or more of FIGS. 6a-15.

Figure 19:
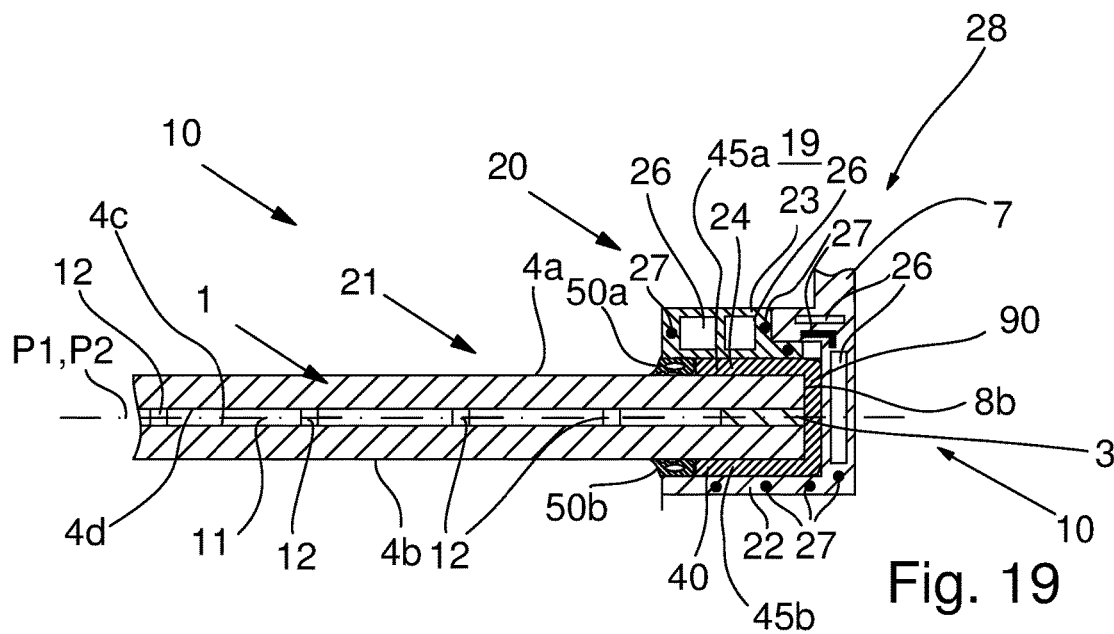

One or more of the frame profiles/holding members 22, 23 of the frame may in one or more embodiments be substantially solid see e.g. FIG. 18. In further embodiments of the present disclosure, the profiles 22, 23 may comprise internal, insulating cavities 26, see e.g. FIG. 19, illustrating schematically a cross sectional view of a part of the frame 20 holding the VIG unit according to embodiments of the present disclosure. In FIG. 19, both the glazing member 23 and the base member 22 comprises such cavities 26. These cavities 26 may be obtained during the production of the profiles 22, 23, and may extend in the longitudinal direction of the profiled 22, 23 inside the profiles 22, 23.

The cavity or cavities 26 may in embodiments of the present disclosure either be left empty to comprise a gas such as air, or a selected gas pumped into the cavity 26. Alternatively one or more of the cavities 26 may comprise an insulating material as previously described above in relation to FIGS. 6a and 6b.

It can be seen form several of the figures such as FIGS. 6b, 9-10 and 18-19 that the edges 8a-8d of the VIG unit 1 in embodiments of the present disclosure may be kept with a distance between the VIG unit edge 8a and the interconnecting wall member 28c of the frame profile 28, thus providing a space 90 between these. Hence, the VIG unit edge 8a may move/slide into or away from this provided space 90 due to differences in CTE between the glass sheets 2a, 2b and the material of the holding part 6 or another part of the frame. Also, or alternatively, the VIG unit edge 8a may move/slide into or away from this provided space 90 as the temperature difference between the VIG surfaces 4a, 4b varies, hence causing a change in the amount and/or direction of the thermal deflection of the VIG unit 1. Though, some of this movement of the VIG unit 1 may in embodiments of the present disclosure also or alternatively deflect/flex the flexible connection arrangement 7. Hence, it is understood that in other embodiments of the present disclosure, the edge 8a-8d may instead be very close to or abut the wall 8c FIG. 19 moreover illustrates a further embodiment of the present disclosure, wherein the frame profiles 22, 23 comprises strengthening/reinforcing members 27 embedded in the profiles 22, 23, e.g. by means of a co-manufacturing such as co-extrusion or co-pultrusion. These may have any suitable shape, extends in the longitudinal direction of the profiles and helps to improve/increase the rigidity and strength of the frame members 22, 23.

The further sealings/gaskets 50a, 50b illustrated in FIG. 18, 19 or other of the previously described figures may in embodiments of the present disclosure be separate and removable from the frame 20, but in other embodiments of the present disclosure (not illustrated), the sealings/gaskets 50a, 50b may be co-manufactured such as co-extruded or co-pultruded together with the base member 22 and/or the glazing member 23, or the profile 28 as described previously.

As illustrated in FIG. 18-19, the fixation arrangements 45a, 45b are arranged in the recess 24 between the base member 22 and the glazing member 23, and the outwardly facing VIG unit 1 surfaces 4a, 4b. The fixation arrangement 45b is compressed between the base member 22 and VIG unit surface 4b, and fixation arrangement 45a is compressed between the glazing member 23 and VIG unit surface 4a respectively as e.g. explained previously. This may in embodiments of the present disclosure causes the fixation arrangements to provide the holding force F1, F2 at the VIG unit surfaces and hence a clamping force. In other or further embodiments, there may be a glued/adhesive connection between fixation arrangements 45a, 45b and the VIG unit surfaces 4a, 4b and/or between arrangements 45a, 45b and the VIG unit surfaces 4a, 4b.

As can be seen in FIGS. 18 and 19, the base member 22 may in embodiments of the present disclosure extend from a position opposite to the major surface 4b of the VIG unit 1 and around the edge 8b, and e.g. also to be at least partly opposite to a part of the surface 4a, but it may also in other embodiments extend only from a major surface 4b of the VIG unit and around the edge 8b, and not extend to the oppositely directed surface 4a of the VIG unit The width W2 of the recess 24 provided between members 22, 23 may in embodiments of the present disclosure be configured to substantially not change when the VIG unit edge 8b thermally deflect to describe an edge deflection curve as described above, but in other embodiments, it may be allowed to vary as e.g. previously, during thermal deflection of the VIG unit. The width W2 is larger than the thickness of the part of the VIG unit edge extending into the recess 24, and hence, a predefined space 66 may in embodiments of the present disclosure (ref no. 66 however not illustrated in FIG. 118 or 19) be provided between the outer surface 4a, 4b of the glass sheets 2a, 2b of the VIG unit 1, and a frame profile member 22, 23. The VIG unit 1 may thermally deflect in this space 66 so as to describe the previously described "deflection curve" of the edge 8b in the recess 24, and/or the frame may bend together with the VIG unit edge as e.g. illustrated in FIG. 11.

One or more members of the frame 20, such as the base member 22 and glazing member 23, or the base member alone, may in embodiments of the present disclosure help to provide a counter force when the VIG unit thermally deflects, and may in further embodiments of the present disclosure help to provide a restriction towards the thermal deflection of the VIG unit. This may e.g. be provided within one or more temperature ranges of the temperature difference ΔT, e.g. at more extreme temperature differences such as temperature differences above 40° C. or above 65° C.

As can be seen in FIG. 18, the glazing member 23 may be connected and fixed to the base member 22 by means of a connection 25. This connection 25 is a tongue and groove connection, but it may also be a snap connection and/or the like. Alternatively or additionally, the glazing member 23 may be connected to the base member 22 by means of other releasable mechanical fastening means such as screws or nails, and/or by means of chemical fastening means such as an adhesive.

When removing the glazing member 23 (if possible), the suspension element(s) may be removed and then the VIG unit may be dismantled from the frame 20.

As previously described, the VIG unit may thermally deflects/bends relative to the frame profiles 22, 23, so that the distance between the outer major surfaces 4a, 4b of the VIG unit and the frame profiles 22, 23 at/near the edge of the VIG unit changes. This causes the further seals or gaskets 50a, 50b (see previous description) to expand or be compressed by the VIG unit 1 due to the thermal deflection along the longitudinal direction LD1 of the frame profiles 22a, 22b and the VIG unit. Hence, as the amount and even direction of the thermal deflection of the VIG unit may change over time due to a change in the temperature difference between the VIG glass sheets 2a, 2b as e.g. previously described, the amount of compression of the further seals/gaskets 50a, 50b may also change over time.

As can be seen in e.g. FIGS. 6a-10 and 18-19 the further resilient gasket or seal members 50a, 50b, 60a, 60b, 61 may be arranged between the frame opening 21 and the fixation arrangements 45a, 45b, to provide a water and/or air tightening of the recess 24, 29 and spaces 66.

It is generally understood that in one or more embodiments of the present disclosure, in case the fixation arrangements 45a, 45b are continuous gasket strips as e.g. described in relation to FIG. 16, one or both of the further gaskets/seals 50a, 50b, 60a, 60b, 61 as described above or below may be omitted, and the fixation arrangements 45a, 45b may thus provide a sufficient air and/or water tightening between VIG unit 1 and frame 20 at one or both sides of the VIG unit 1.

As can be seen in FIGS. 18 and 19, the base member 22 may be connected to the flexible connection arrangement 7. This flexible connection arrangement 7 connects the base member to a sash member 70. This may e.g. be provided e.g. as illustrated and/or described above in relation to one or more of FIGS. 6a-15. As can be seen in FIGS. 18 and 19, one of the holding members such as the glazing member or the holding member 28a may in embodiments of the present disclosure be provided by a leg or wall that is not provided by a wall 7a of the flexible connection arrangement.

Figure 20:
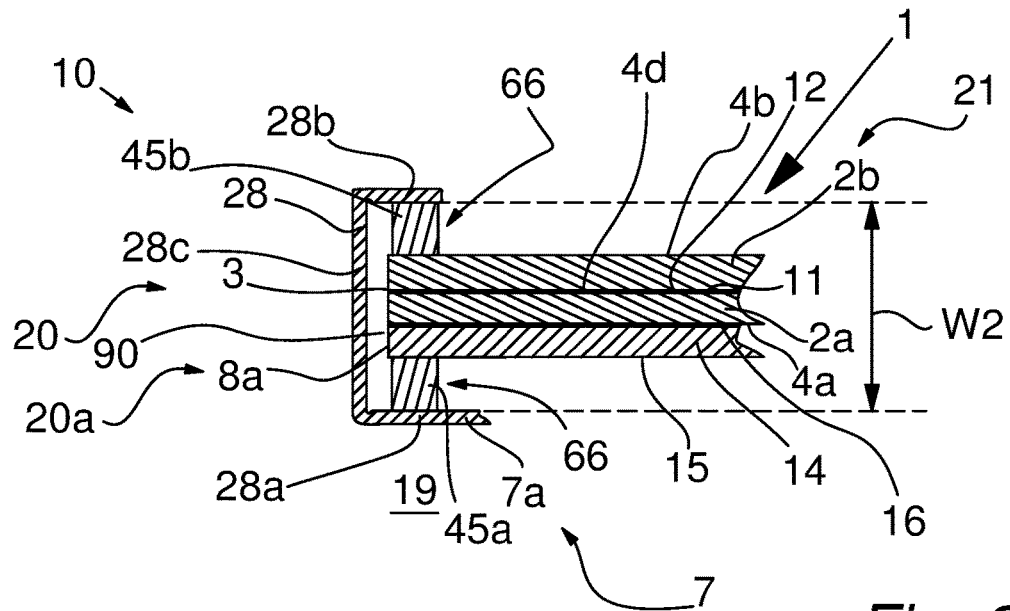
Figure 21:
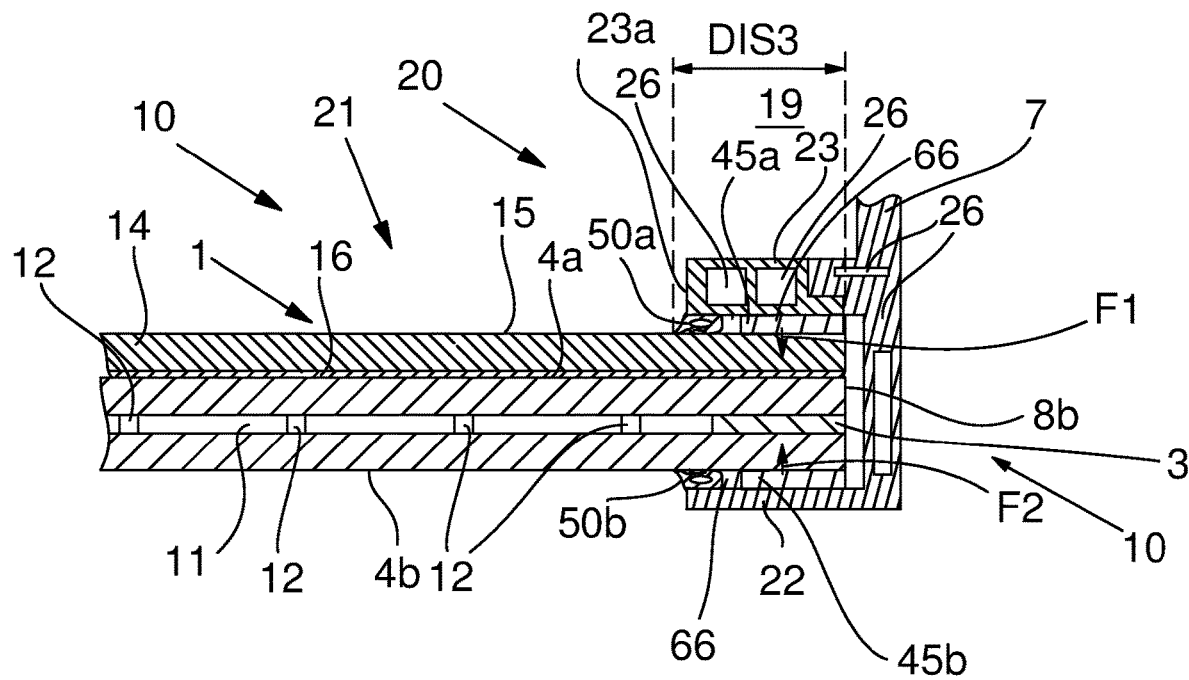

FIGS. 20 and 21 illustrates a laminated VIG unit arranged in a frame assembly 10 according to various embodiments of the present disclosure, where the VIG unit 1 is laminated.

The holding part 6 illustrated in FIG. 20 substantially corresponds to a holding part described in relation to various embodiments of the present disclosure described above, see e.g. one or more of FIGS. 6a-15 and/or the description thereto. However, the VIG unit 1 is laminated with a lamination glass sheet 14, such as an annealed glass sheet or a tempered glass sheet. This is laminated to an outer major surface 4a of the VIG glass sheet 2a providing a major surface 4d on which the support structures 12 support in the gap 11. The lamination glass sheet 14 is laminated to the VIG glass sheet 2a by means of a lamination layer 16 such as a polyvinyl butyral (PVB) or ethylene-vinyl acetate (EVA) layer. The lamination glass sheet 14 thus provides the outer major surface 15 of the VIG unit 1.

One of the fixation arrangements 45a, 45b is thus arranged to abut the outwardly facing surface 15 of the laminated glass sheet 14. The distance between the holding members 28a, 28b is thus adjusted to the increased VIG unit 1 thickness provided by the lamination glass sheet 14 and the lamination layer 16.

The lamination glass sheet's 14 outer major surface 15 may in embodiments of the present disclosure be configured to face the interior of the building. However, in other embodiments, it may be arranged in the frame to face the exterior of the building.

The frame solution in FIG. 21 substantially corresponds to the frame solution according to e.g. FIG. 18 or 19, where a glazing member 23 and a base member 22 of one or more of the frame profile arrangements 20a-20d are connected by connection 25 and/or by means of screws, nails or the like. However the VIG unit in FIG. 21 is laminated by a lamination glass sheet 14 as e.g. explained above in relation to FIG. 20, and the edge of the VIG unit glass sheets 2a, 2b and the lamination glass sheet 14 extend into the recess 24 in the frame 20 provided between the base member 22 and the glazing member 23.

It is generally understood that the size of the lamination glass sheet 14, i.e. the width and/or height may be substantially equal to the size of the glass sheet 2a of the VIG unit to which it is attached by the lamination layer 16. Though, in further embodiments of the present disclosure, the size (width and/or height) of the lamination glass sheet 14 may be reduced compared to the width and/or size of the VIG unit glass sheet to which it is attached. This is illustrated in a cross sectional, schematic view in FIG. 22. Here, the VIG unit glass sheets 2a, 2b enclosing the evacuated gap 11 extend into the recess 29 between the holding members 28a, 28b as e.g. illustrated in various embodiments off the present disclosure described above.

The lamination glass sheet's 14 narrow edge 17 extending between the major surfaces of the lamination glass sheet 14 faces the frame 20 bot does not extend into the recess 29. The edge 17 thus is arranged opposite to the frame 20, in the present example opposite to a seal 50a and a part of a separation wall 74 of a sash profile 70 as e.g. described previously.

In other embodiments (not illustrated), the lamination glass sheet 14 may instead be laminated to the glass sheet 2b surface 4b, and hence, the end edge 17 of the lamination glass sheet 14 may face the free end of the holding member 28b instead.

As can be seen, a gasket such as a rubber gasket, a silicone sealing or the like 33 may be placed between the lamination glass sheet 14 and the frame 20. The gasket 50a may thus either be maintained to improve water and/or air tightness, or be omitted if the gasket/sealing 33 is considered sufficient.

Figure 23:
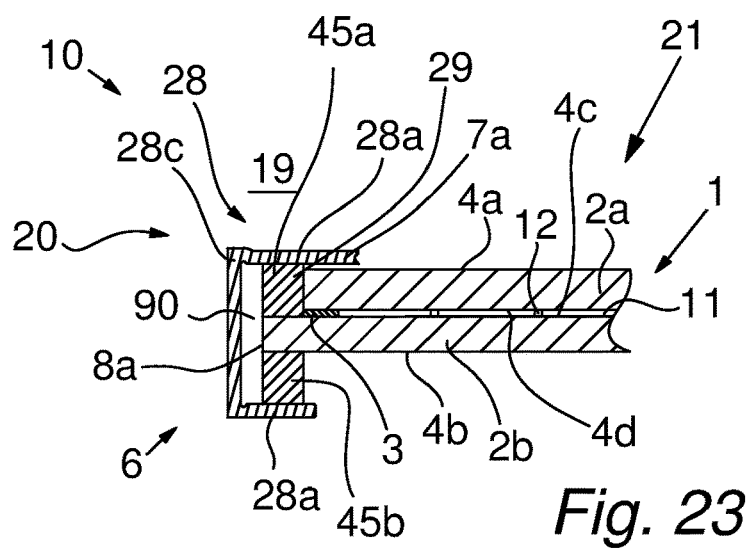

FIG. 23, illustrates schematically a cross sectional view of the VIG unit frame assembly 10 according to embodiments of the present disclosure. The fixation arrangements 45a, 45b holds the VIG unit 1 at one glass sheet 2a of the VIG unit between the holding members 28a, 28b e.g. by means clamping forces, by a glued/adhesive connection and/or the like, substantially in the same way as disclosed in relation to various embodiments disclosed above.

However, the glass sheet 4b is larger than the glass sheet 4a, hence providing an exposed major surface 4c of the glass sheet 2a which also faces the evacuated gap 11 at the other side of the edge sealing 3. Accordingly, the fixation arrangement 45a, 45b are connected to the VIG unit 1 at the opposite surfaces 4a, 4c of the glass sheet 4a, 4b. Even though gasket arrangements 40, 50a, 50b, 61, 60a, 60b are not disclosed in FIG. 23, these may naturally also be provided as e.g. previously disclosed in relation to various embodiments of the present disclosure.

Figure 22:
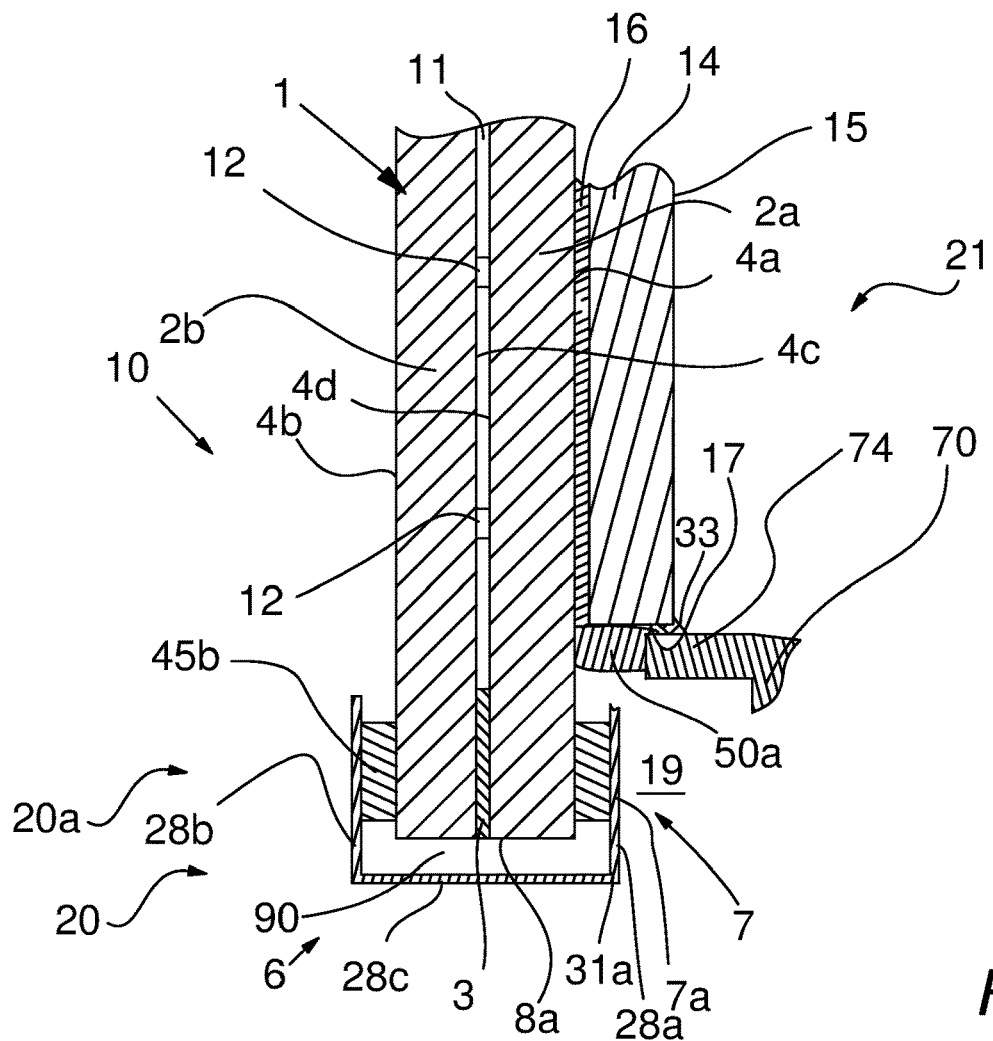
Figure 24:
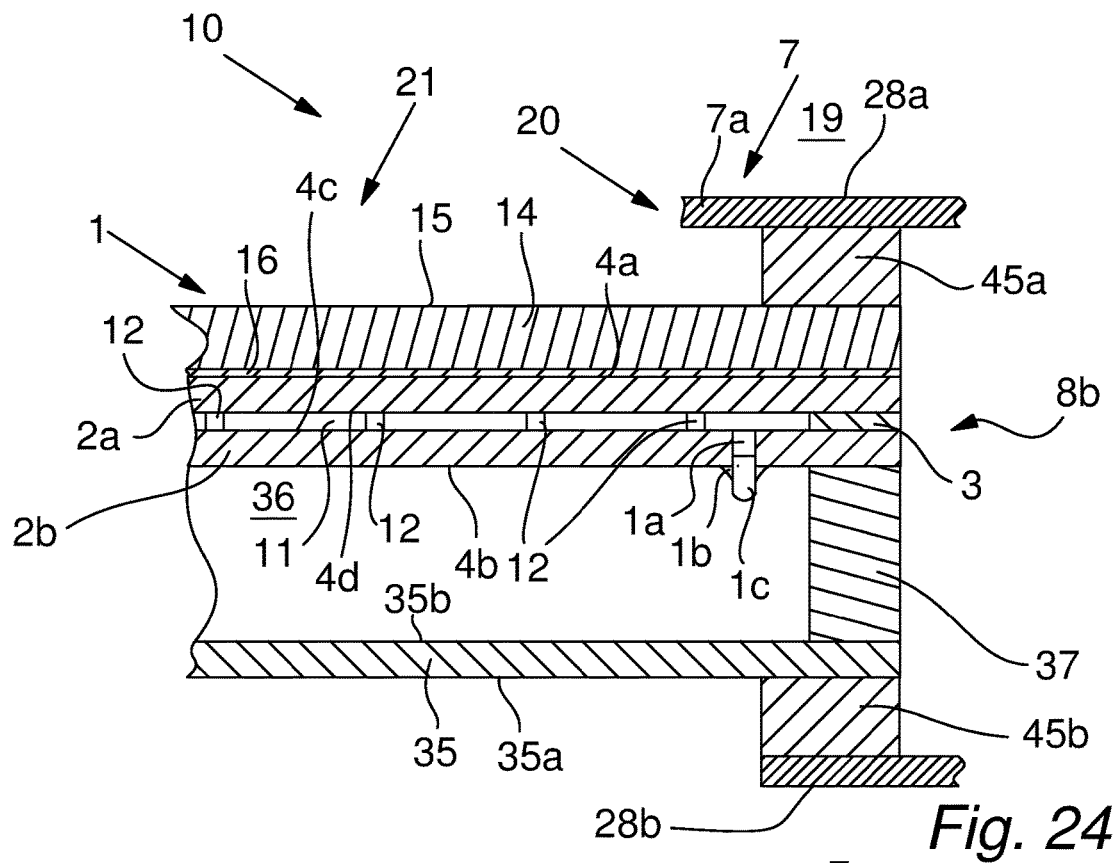

The VIG glass sheet 2a or the lamination glass sheet of the reduced size as illustrated in FIG. 22 or 24 of reduced size may thus help to provide a reduced the thickness of the holding member compared to if the frame 20 should extend over the entire thickness of all glass sheets 2a, 2b (and e.g. also a lamination glass sheet or a glass sheet 35 of a Hybrid VIG unit as described below).

FIG. 24 illustrates an embodiment of the present disclosure where the VIG unit 1 is a so-to-say hybrid VIG unit comprising three glass sheets 2a, 2b, 35. This VIG unit 1 comprises glass sheets 2a, 2b paired to provide an evacuated gap 11 between surfaces 4c, 4d, and the gap 11 comprising distributed support structures between these glass sheets 2a, 2b as explained above in relation to e.g. FIG. 2. The hybrid VIG unit 1 moreover comprises a further glass sheet 35 providing a further gap 36 between the major surface 4b of the glass sheet 2b facing away from the evacuated gap 11, and this gap 36 is sealed by means of a gas-space edge seal 37. The VIG glass sheets 35, and 2b respectively thus forms a gas IG (Insulated glass) unit where a gas such as Argon or any other suitable gas may be provide in the space 36 for insulating properties to slow the transfer of heat through the VIG unit.

As can be seen, an evacuation hole 1a in glass sheet 2b is sealed by a sealing system 1b, 1c in the form of a sealed evacuation port such as a tube 1c, and a sealing material 1b such as solder glass or metal solder for sealing the connection between tube 1c and glass sheet 2b. The tube 1c has been used to evacuate the gap 11. This system 1b, 1c may in embodiments of the present disclosure extend into the space 36, and is hence protected in the space.

As can be seen from FIG. 24, a lamination glass sheet 15 may in embodiments of the present disclosure be laminated 16 to the glass sheet 2a of the VIG unit in embodiments of the present disclosure, see e.g. FIGS. 20-22 and description above thereto.

The fixation arrangements 45a, 45b holds the VIG unit 1 between the holding members 28a, 28b at the outer surface 15 of the lamination glass sheet 14 and the outer surface 35a of the glass sheet providing an inner major surface 35b to the gas-filled space 36. In further embodiments of the present disclosure, a solution where e.g. the glass sheet 35 or lamination glass sheet 14 is smaller in width and/or height than the VIG unit glass sheets 2a, 2b may be utilized, e.g. as illustrated in FIG. 222 or 23. Hence, the frame may extend into the space provided due to this reduced size.

Generally, a coating, for example low-e coating (not illustrated), may in embodiments of the present disclosure be placed at one or more of surfaces 4c, 4d, 4b and/or 36b.

It is noted that even though parts of the frame 20 assembly have been omitted from FIGS. 24 (and 25) for simplicity, a frame solution as described in relation to any of the previous figures may be used in one or more aspects of the present disclosure.

Figure 25:
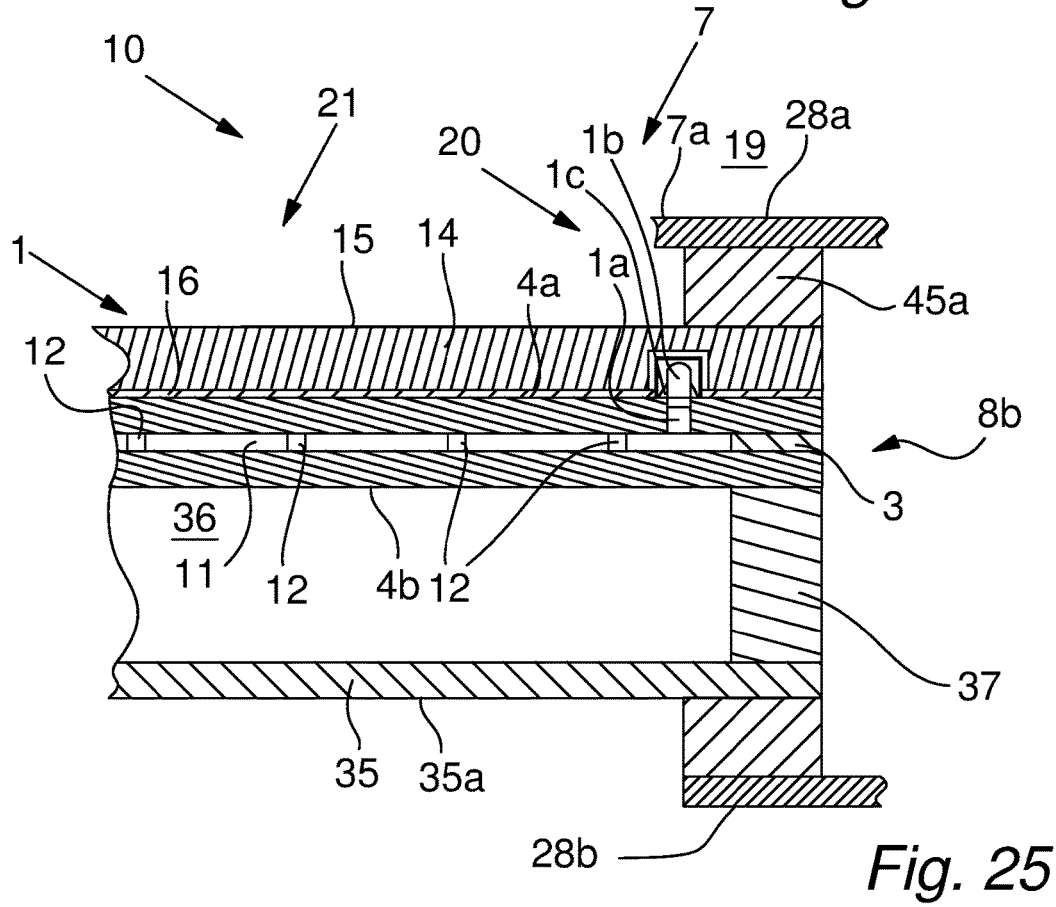

FIG. 25 illustrates an embodiment of the present disclosure where the sealing system 1b, 1c extend into a hole/recess in the lamination glass sheet, and is hence protected by the lamination glass sheet. This hole in the lamination glass sheet may be a through hole or a blind hole as illustrated. This may be provided in a Hybrid VIG solution as described above and illustrated in FIG. 25, or a laminated VIG unit solution such as described in relation to FIGS. 20, 21 and/or 22.

Figure 26:
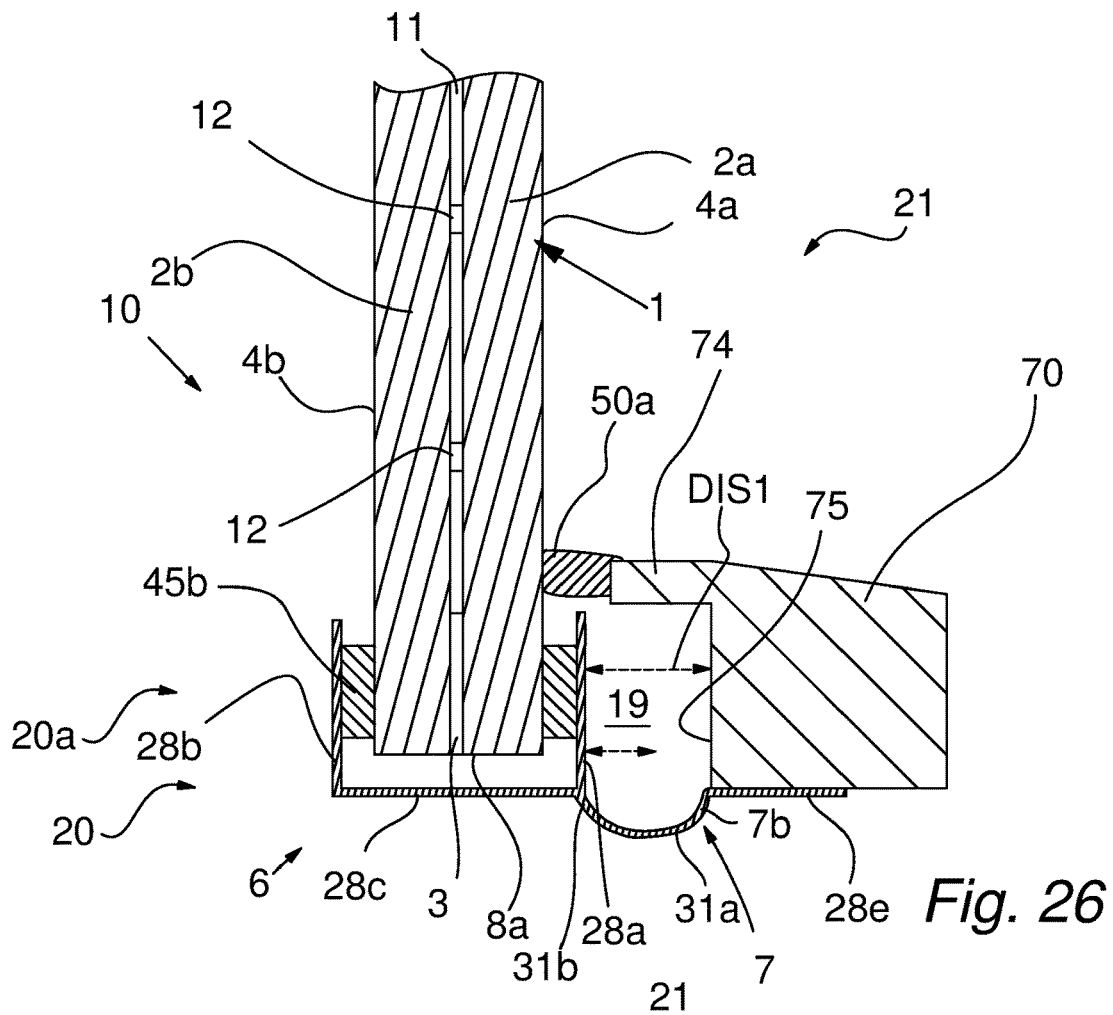

FIG. 26 illustrates schematically an embodiment of the present disclosure wherein the flexible portion comprises a distancing wall 7b extending away from the flexing space 19 and does not extend to be arranged opposite to the outwardly facing major surface 4a 4b, 15, 35a of the vacuum insulated glass unit. Instead, the wall 7b of the flexible connection system 6 comprises, from the holding part 6, a bend 31b away from the space 19 and away from the frame opening 21, and further towards the elongated sash profile 70, it bends 31a towards the frame opening 21 again. This provides the flexing space 19 between the outwardly facing major surface 4a of the vacuum insulated glass unit 1 and the sash profile 70 to which the holding part 6 is connected. However, the flexible connection arrangement 7 does not extend into the flexing space 19, as opposed to various other embodiments of the present disclosure illustrated in e.g. FIGS. 6a-9. The holding part 6 can deflect towards and away from the flexing space 19 in response to the thermal deflection of the VIG unit 1 edge 8a.

Figure 27:
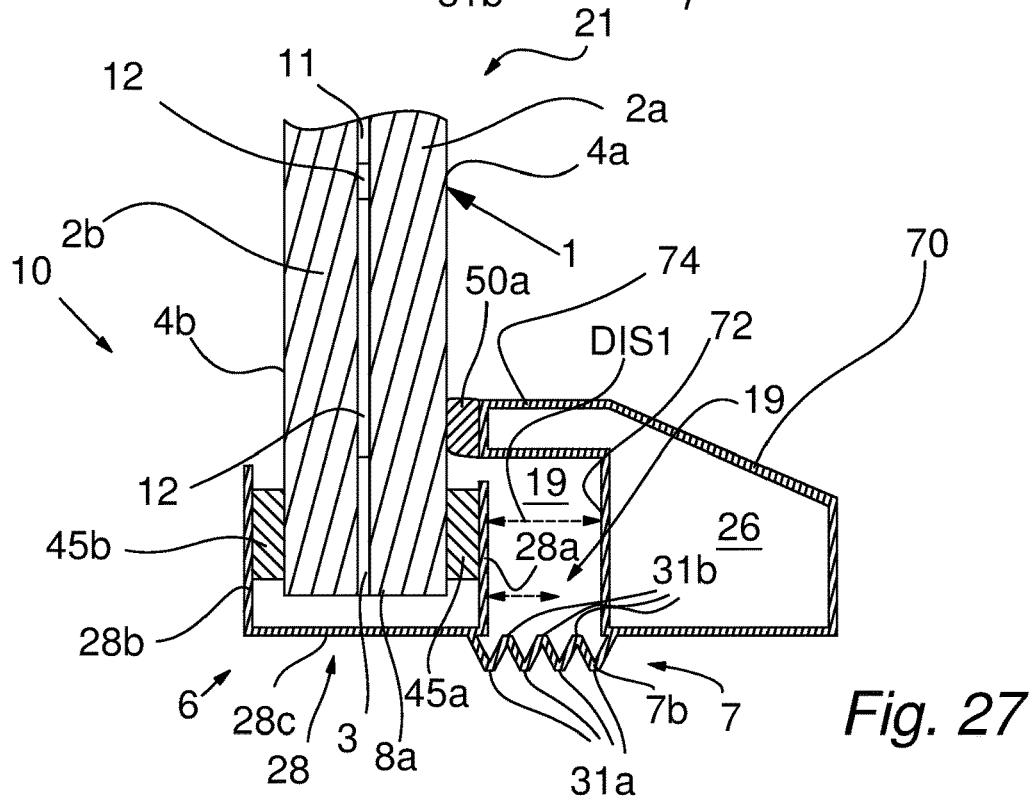

FIG. 27 illustrates an embodiment of the present disclosure where the wall(s) of the flexible connection arrangement 7 does not extend into the flexing space 19, as in the embodiment of FIG. 26. The wall here comprises a zigzag shaped distancing wall 7b extending between and connecting the holding part 6 and the elongated frame profile arrangement/sash profile 70. The zigzag shape provides a flexible wall solution.

In FIG. 27 the holding part 6, flexible connection arrangement 7 and the elongated frame profile arrangement/sash profile 70 are integrated in the same profile as e.g. also illustrated and described in relation to FIG. 9, but in other embodiments, the flexible connection arrangement may be connected to the elongated frame profile arrangement/sash profile 70 by means of a sash connection part 28e, see e.g. FIG. 26 or other figures. The zigzag shape provides a plurality of bends 31b away from the frame opening 21, and a plurality of bends 31a towards the frame opening 21 and a plurality of bends 31b away from the frame opening.

The distance between the walls between these bends 31a, 31b may be reduced or increased when the thermal deflection of the VIG unit changes dependent on the direction of the thermal deflection. The zigzag shape may also or alternatively provide that the wall 7d deflect towards or away from the frame opening 21 in response to the thermal deflection of the VIG unit edge 8a.

The zigzag wall 7b may in embodiments of the present disclosure comprise between 2 and 30, such as between 2 and 15, e.g. between 3 and 10 of the bends 31a and/or 31b in embodiments of the present disclosure, so as to provide the zigzag form.

Figure 28:
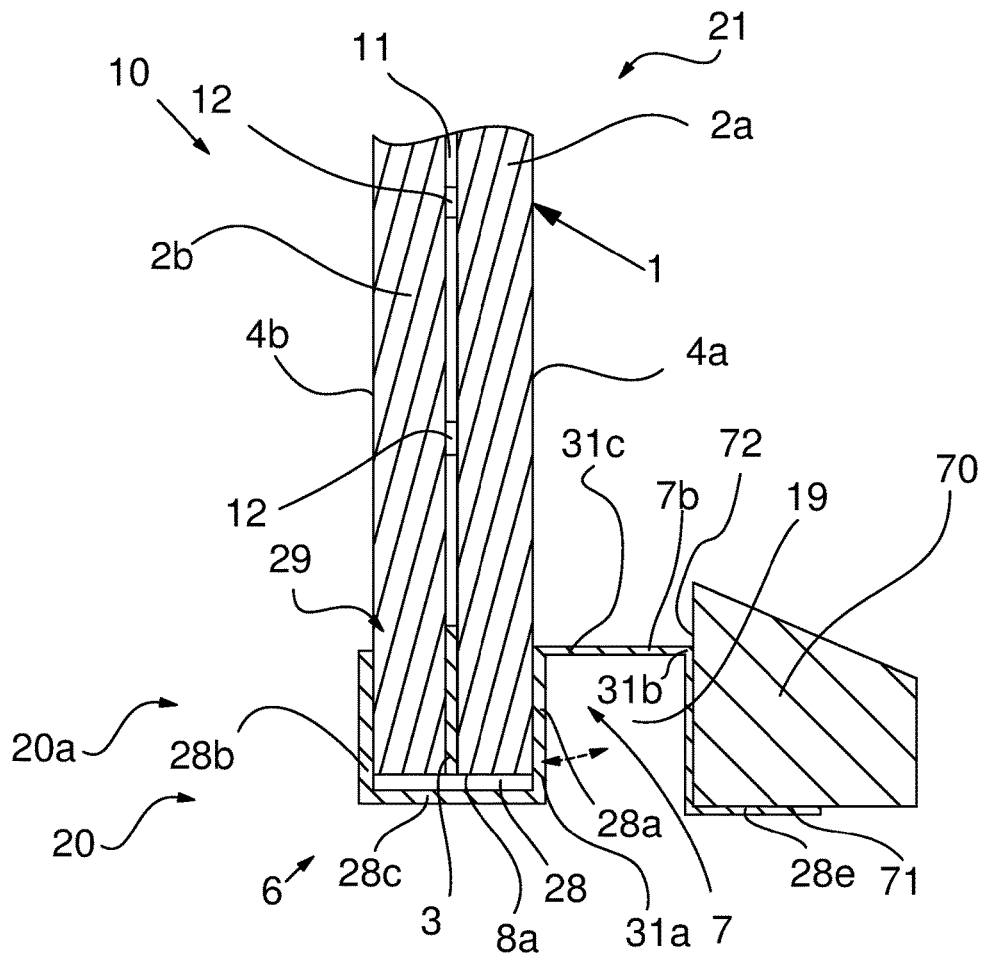

FIG. 28 illustrates schematically a cross sectional view of an embodiment of the present disclosure where substantially no fixation arrangements 45a, 45b such as a glue layer, a rubber gasket or the like is placed between the VIG unit surfaces 4a, 4b and the holding members 28a, 28b of the holding part 6. Instead, the edge 8a extends into the recess 29 and is clamped or merely held between the holding members 28a, 28b.

Figure 29:
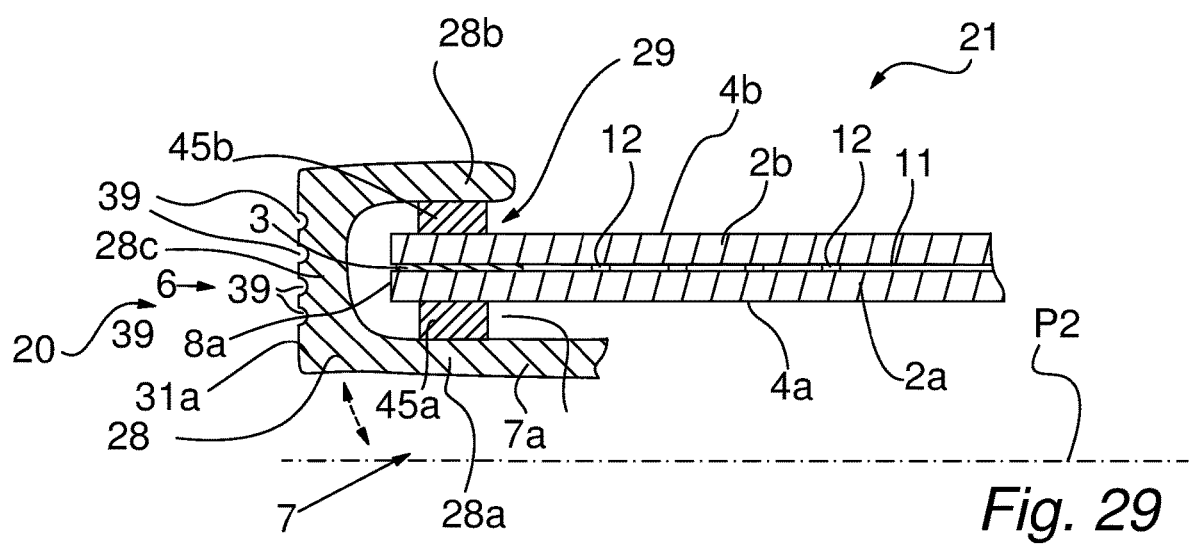

FIG. 29 illustrates schematically a cross sectional view of a holding part 6 according to embodiments of the present disclosure, where the holding part comprises weakening portions. Here, interconnecting wall part 28c providing the bottom wall member of the holding part recess 29, (but it may also be in the bends where the wall 8c interconnects with holding members 28a, 28b), comprises a weakening arrangement 39 in the form of slits or recesses in the wall surface, where the slits extends in the longitudinal direction of the edge 8a. In other or further embodiments, the weakening arrangement 39 may comprise holes, perforations and/or hollow, enclosed channels in the wall in the wall 28a, 28b and/or 28c. In other embodiments, the weakening arrangement 39 may also or alternatively be provided by a softer wall structure of the wall, such as wall 28c, comprising the weakening arrangement 39, (e.g. by selecting a softer or more flexible material for the wall) than the wall structure of e.g. the other walls of the holding part 6, and/or the wall may be made thinner than e.g. the holding members 28a, 28b. This may e.g. help to support/facilitate that the VIG unit edge extending into the recess can deflect between the VIG unit corners, and this may help to allow a change in the distance between the holding members in response thereto.

As further illustrated in FIG. 29, the frame opening plane P2 may, as early explained (see description to FIG. 4), not necessarily coincide with the plane of the VIG unit.

Generally, the profile 28 described above, providing the holding part 6, may in embodiments of the present disclosure be solid as illustrated in various figures escribed above. However, it is naturally understood that the walls of the profile 28 and/or the flexible connection arrangement 7, e.g. one or more of walls 28a, 28b, 28c, 7a, 7b, 7c, may also comprise one or more insulating cavities 26 as e.g. previously explained.

It is generally to be understood that in various embodiments of the present disclosure, one or more of the VIG unit's 1 major surfaces 4a, 4b, 4c, 4d, 15 and/or 35a, 35b as e.g. described above may be provided by one or more layers or coatings providing advantages/features improving or providing optical properties (such as tinted/tinting effects, frosting effects, colouring effects and/or the like), mechanical protection advantages and/or advantages with regard to improving (lowering) the $U_g$-value of the VIG unit (e.g. by means of one or more low-e coatings).

Figure 30:
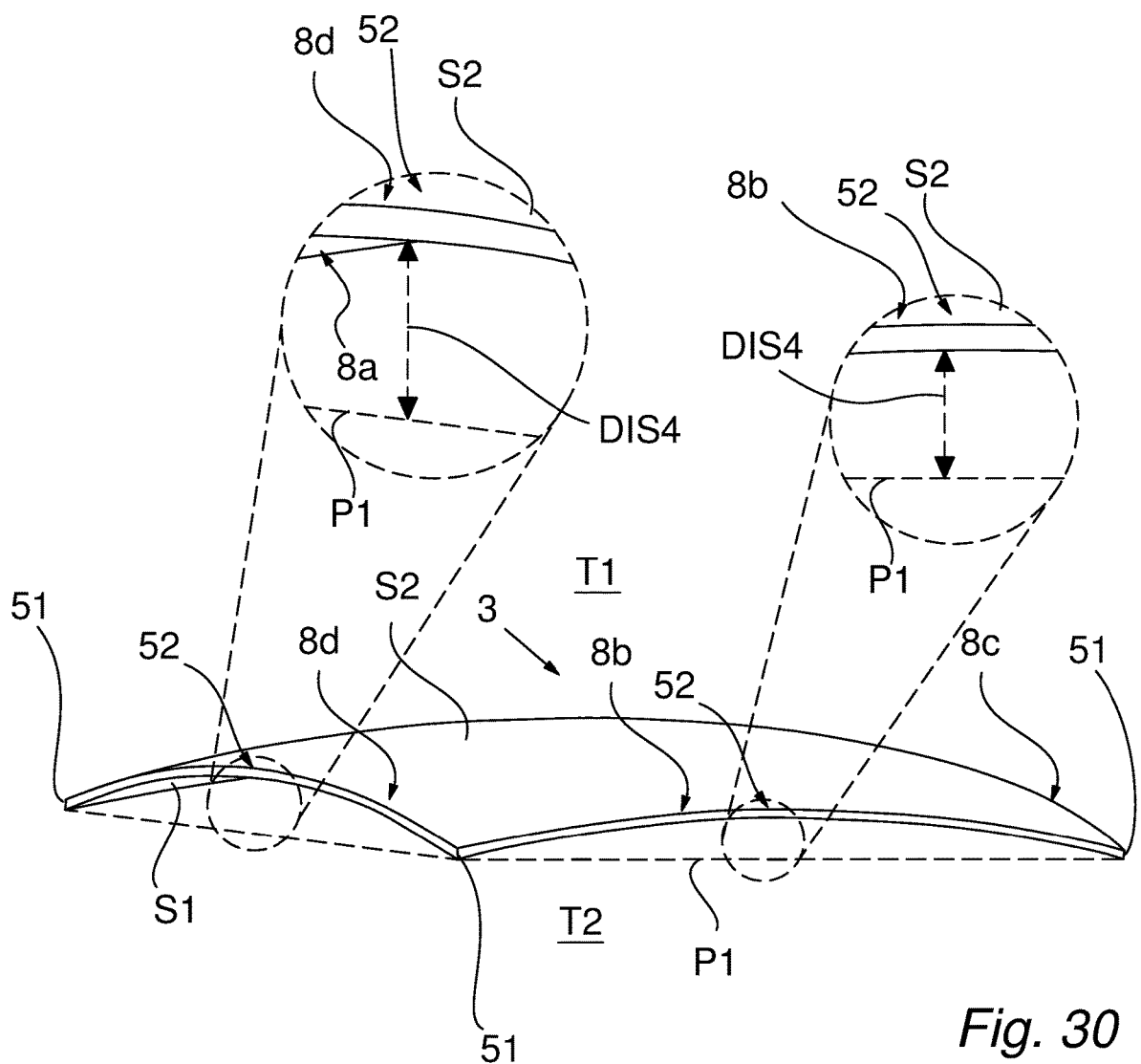

FIG. 30 illustrates a visualized computer simulation of a "free" thermal deflection of a VIG unit 1 that may be used for a frame as disclosed according to embodiments of the present disclosure, which has been provided by one of the present inventors. The VIG unit 1 simulated was based on a VIG unit model defined to have the following characteristics:

The VIG unit is laminated and hence comprises a lamination glass and a lamination interlayer
Length of shorter edges 8d, 8c: 114 cm
Length of the longer edges: 8a, 8b: 140 cm
Glass sheets 2a, 2b type: Thermally tempered glass sheets each having a thickness of 4 mm.
Lamination glass: annealed float glass of a thickness of 4 mm
Edge seal material: solder glass edge seal material
The VIG is arranged with the surfaces S1, S2 horizontally and is thus simulated so that gravity acts on the VIG unit.
Temperature difference between T1 and T2: about 60° C.
The hotter side (S2) was set to be the lamination glass side and hence the lamination glass sheet provides the outer major surface S2 in FIG. 30.

For the computer simulation model, a temperature difference/gradient profile was established in accordance with temperatures measured across the hotter/heated side. This profile was based on temperature measurements provided during the test described below. This profile was used in the simulation model for the hotter side. The lamination interlayer was a PVB material.

Under these conditions, the simulation results defined that the distance DIS4 from the centre part 52 of the longer edge 8b would be 7.82 mm from the plane P1.

Moreover, under these conditions, the simulation results defined that the distance DIS4 from the centre part 52 of the shorter edge 8d would be 5.15 mm from the plane P1.

Figure 31:
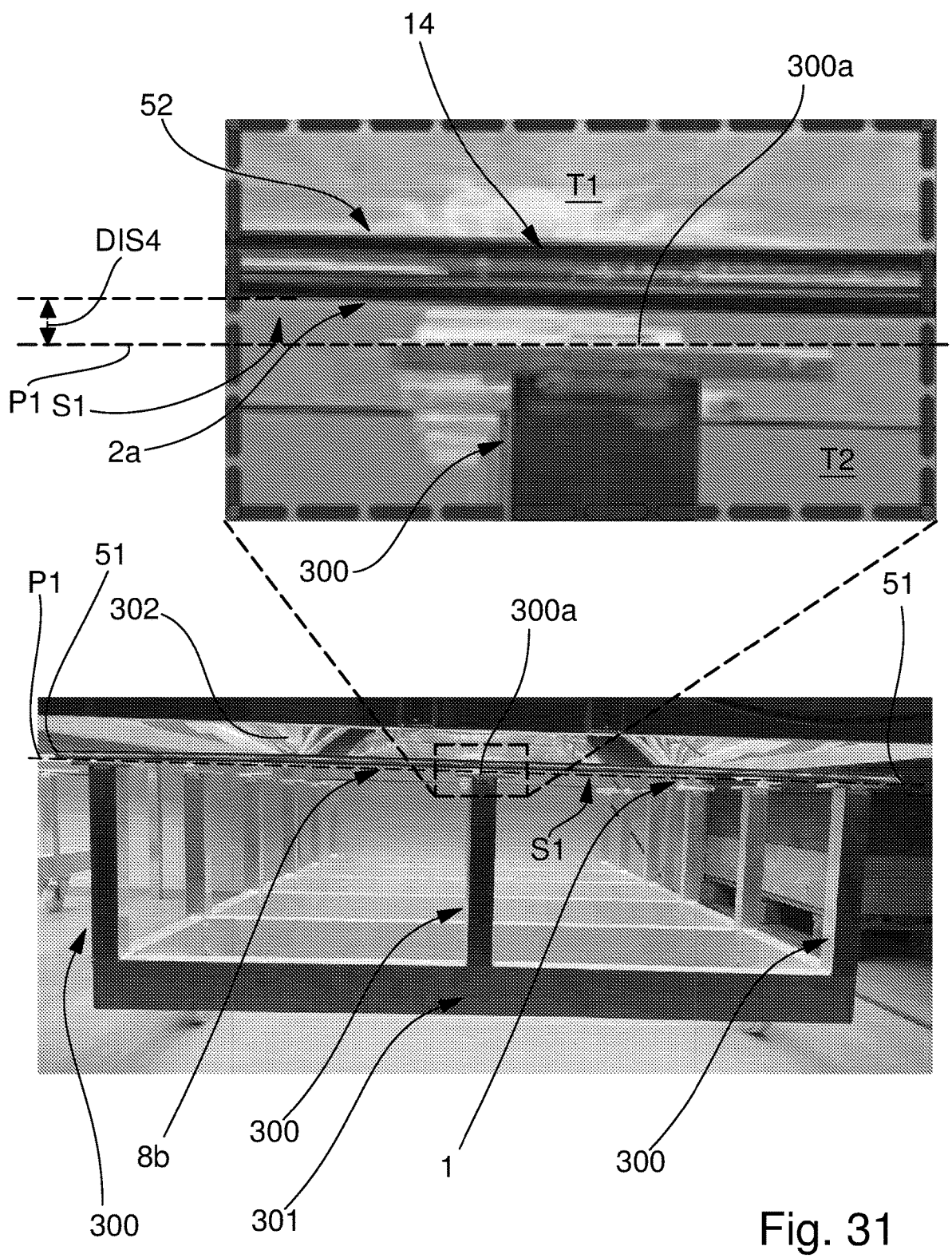
Figure 32:
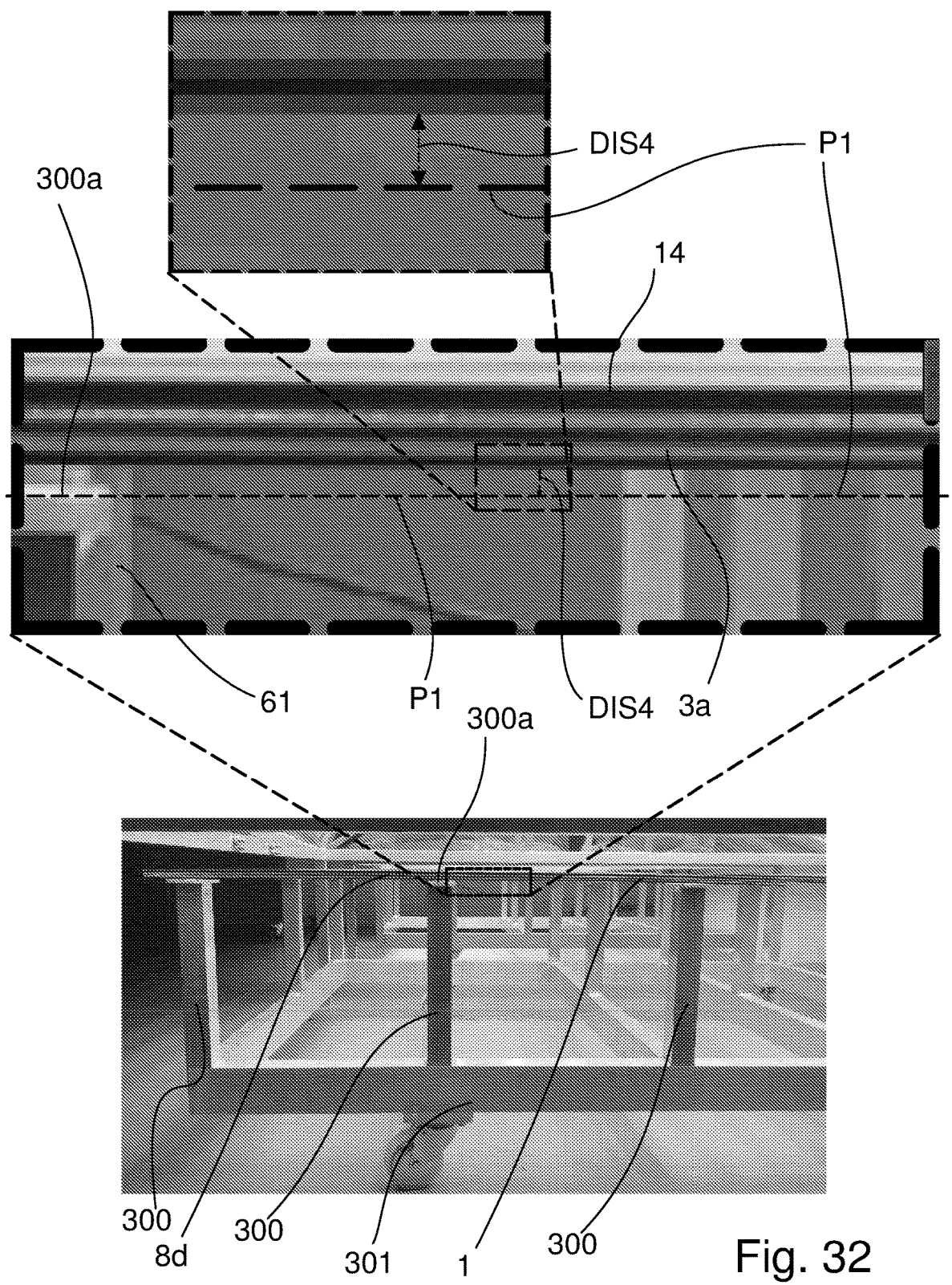

FIGS. 31 and 32 are images of a test of a thermal deflection of a laminated VIG unit 1 having substantially the parameters as defined above with regard to FIG. 30. The VIG unit 1 was placed horizontally to support on support surfaces 300a of a plurality of support rods 300 of a support frame 301. The VIG unit 1 supported initially, when the temperature difference ΔT=T1−T2 was substantially 0° C., on substantially all support surfaces of the frame 301 on which the VIG unit was arranged.

An infrared heat radiation arrangement 302 was arranged above the upper glass sheet, i.e. the lamination glass sheet, and covered the upper glass sheet to a bit beyond the side edge surfaces of the VIG unit 1. Then the heating arrangement 302 started to heat the upper glass sheet 14 of the VIG unit 3, so that the upper glass sheet reached a maximum temperature of approx. 100° C., and the lower glass was measured to have a temperature of approximately 35° C. It was expected and validated that the temperature of the heated glass facing the radiation heater varied over the surface due to cold bridges caused by among others the edge seal of the VIG unit. Hence, no completely uniform heating was obtained (as opposed to the simulation results), but the maximum temperature measured at the heated glass sheet was about 100° C., and for the majority of the heated surface, the temperature was determined to be above at least 85° C. and at many locations above 90° C.

The present inventors could after the heating by the infrared heating arrangement visually see and confirm a formation of an edge deflection curve DC between the VIG unit corners 51. This provided a maximum edge deflection DIS4 of the VIG unit due to the forced temperature difference ΔT=T1−T2, when compared to the temperature difference ΔT=T1−T2 of substantially 0° C. The distance DIS4 was determined by a first reference point defined by a support surface 300a (that was used as a reference for the plane P1), and the lower surface of the VIG unit 1, in a direction substantially perpendicular to the plane P1.

The maximum edge deflection DIS4 of the long edge 8b (FIG. 31) was measured to be approximately 7.4 mm, or more precisely 7.43 mm at the forced temperature difference, when compared to the temperature difference ΔT=T1−T2 of substantially 0° C.

FIG. 32 illustrates the edge deflection of the shorter edge 8d of the same VIG unit as tested in FIG. 31. Here, in a similar way, the shorter edge 8d described an edge deflection curve DC due to the forced heating and the temperature difference between T1 and T2. Additionally, the maximum edge deflection DIS4 of the shorter edge 8d was measured to be approximately 5.3 mm, or more precisely 5.33 mm, at the forced temperature difference, when compared to the temperature difference ΔT=T1−T2 of substantially 0° C.

Accordingly the maximum tested edge deflection DIS4 vs the simulated edge deflection resulted in the values of table 1 below.

TABLE 1

| | Simulated edge deflection DIS4 | Edge deflection test (FIGS. 31-32) DIS4 |
|---|---|---|
| Longer edge 8b | 7.82 mm | 7.43 mm |
| Shorter edge 8d | 5.15 mm | 5.33 mm |

The inventors concluded that the test illustrated in FIGS. 31-31 validated the computer simulations, and thus confirmed that the VIG unit computer simulations was sufficiently precise and reliable.

Additionally, the test approved that the edges of larger size laminated VIG units having rigid edge seals such as provided by fused edge seal material such as solder glass or a metal solder, when subjected to a larger temperature difference, will tend to provide/describe an edge deflection curve DC (see e.g. FIG. 5) that causes a substantial edge deflection DIS4 in an un-constricted situation where no "outer" mechanical forces constrains the edge deflection. This applies both in laminated VIG units and, according to simulations, VIG units which are not laminated.

It is understood that the vacuum insulated glass unit frame assembly disclosed above in relation to various embodiments of the present disclosure may be used for glazing. For example a building aperture cover such as a window, e.g. a vertical window, a horizontal window or a roof window arranged at an angle between 5° and 85°, or a door. In further embodiments of the present disclosure, the vacuum insulated glass unit frame assembly may be used in or as curtain walls, gates/doors or walls of heating arrangements such as heating ovens such as house hold ovens, and/or it may be used in or as walls or gate/doors cooling appliances such as freezers or refrigerators, such as refrigerators for storing food for human consumption at a temperature below 7° C. such as below 5° C., e.g. below 0° C. such as about or below −18° C.

While the present disclosure has been described in detail in connection with only a limited number of embodiments or aspects, it should be readily understood that the present disclosure is not limited to such disclosed embodiments or aspects. Rather, the present disclosure can be modified to incorporate any number of variations, alterations, substitutions or equivalent arrangements not heretofore described, but which are commensurate in scope with the present disclosure. Additionally, while various embodiments or aspects of the present disclosure have been described, it is to be understood that aspects of the present disclosure may include only some of the described embodiments or aspects or combinations of the various embodiments or aspects. Accordingly, the present disclosure is not to be seen as limited by the foregoing description.

FIGURE REFERENCES

1: Vacuum insulated glass unit
1a: Evacuation opening in glass sheet for evacuating gap in VIG
1b: Tube such as glass tube arranged in or at evacuation opening for sealing after the evacuation
1c: Sealing system for sealing between tube and glass sheet
2a, 2b: VIG unit glass sheets enclosing evacuated gap
3: Edge seal
4a, 4b: Major, outer surfaces of VIG unit glass sheets enclosing VIG gap.
4c, 4d: Major surfaces of VIG glass sheets facing the evacuated gap 11
5: Centre portion of VIG edge
6: Holding part
7: Flexible connection arrangement
7a: Wall member of flexible connection arrangement extending along and opposite to VIG unit surface
7b, 7d: Distancing wall of flexible connection arrangement
7c: Wall of flexible connection arrangement
8a-8d: Edge of VIG unit
9, 51: VIG corner
10: VIG unit frame assembly such as a window sash.
11: Evacuated gap in VIG unit defined between major surfaces of VIG glass sheets facing the evacuated gap
12: Support structure in VIG unit gap
14: VIG unit lamination glass sheet
15: Outer surface of VIG unit lamination glass sheet
16: Lamination layer.
17: Narrow Edge/surface of lamination glass sheet facing frame
18: Surface of frame
19, 19a, 19b: Flexing space for wall members of flexible connection arrangement
20: Frame holding a VIG unit 20a-20d: Frame profile arrangements
21: frame opening enclosed by frame profiles.
22: Base member
23: Glazing member
23a: frame surface facing the frame opening
24: Recess in frame into which VIG edge extends
25: Connection between glazing member and base member
26: Insulating cavity in frame profile
27: Strengthening/reinforcing members in frame profile
28: Frame profile member
28a, 28b: Holding members
28c: Wall part connecting support legs/walls
28d: Gasket support member
28e: Sash connection part
29: Recess/space between holding members
30: Fixed building aperture cover frame
31a: Bend of flexible connection member towards frame opening
31b: Bend of flexible connection member away from frame opening
33: Seal/gasket between frame and lamination glass sheet
35: Glass sheet enclosing gas filled cavity between this glass sheet and the evacuated gap in VIG unit
35a: Outwardly facing surface of glass sheet enclosing gas filled space of hybrid VIG unit
36: Gas-filled space of Hybrid VIG unit
37: Edge seal enclosing gas filled cavity
39: weakening portions in interconnecting wall of holding part
40: Fixation gasket assembly providing resilient suspension elements
40a-40d: Gasket strip of fixation gasket assembly providing resilient suspension element
44: End wall member of fixation gasket 40
45a, 45b: Fixation members/elements
50a, 50b: Resilient sealing or gasket for providing a water or airtight seal
60a, 60b, 61: Gasket flap/lip
63, 65: connection part of elongated gasket arrangement
64, 76: Gasket receiving recess or groove
66: Space between frame profile member and VIG unit glass sheet surface
70: Sash profile
71: Connection area of sash profile
72: Surface of elongated sash profile facing VIG unit surface
90: Space at VIG edge into which the VIG edge may slide during thermal bending.
DC: Edge deflection curve
T1, T2: Temperature of VIG unit glass sheet.
W1: Edge seal width
W2: Width of recess into which the VIG unit extends.
D1, D2: VIG Edge deflection direction
DIS1: Distance in flexing space
DIS3: Distance the frame extend in over the VIG unit glass sheet surface(s)
DIS4: Largest total edge deflection
LD: Longitudinal direction LD of VIG unit edge
P2: Frame opening plane
P1: VIG unit plane
P3: Plane in frame opening perpendicular to frame opening plane

The invention claimed is:

1. A vacuum insulated glass unit frame assembly, wherein said vacuum insulated glass unit frame assembly comprises:
a rectangular vacuum insulated glass unit comprising at least two glass sheets separated by a gap between said glass sheets, wherein a plurality of support structures are distributed in said gap and wherein said gap is sealed, and
a frame comprising elongated frame profile arrangements which frames said vacuum insulated glass unit in a frame opening, the frame further comprising:
holding parts for fixating said vacuum insulated glass unit, and
flexible connection arrangements connecting the holding parts to elongated frame profile arrangements,
wherein said flexible connection arrangements are configured to flex when said vacuum insulated glass unit exerts a bending moment on the holding parts, so that said holding parts will move relative to the elongated frame profile arrangements to which the individual holding part is connected;
wherein the largest total edge deflection of any of the edges of the vacuum insulated glass unit, at a temperature difference ($\Delta T=T1-72$) between the two glass sheets of 65° C. as compared to the vacuum insulated glass unit at a temperature difference ($\Delta T=T1-T2$) of 0° C. is at least 2 mm.

2. The vacuum insulated glass unit frame assembly according to claim 1, wherein said holding parts each comprise a recessed portion provided between holding members arranged at opposite outwardly facing surfaces of the vacuum insulated glass unit, and wherein an edge of the vacuum insulated glass unit extends into the recessed portion and is held in said recess by means of the holding members.

3. The vacuum insulated glass unit frame assembly according to claim 2, wherein said flexible connection arrangement is configured to allow a rotational and/or linear movement of the holding parts relative to the elongated frame profile arrangements to which the individual holding part is connected, in response to a thermal deflection of the edges of the vacuum insulated glass unit extending into the recessed portion of the respective holding part.

4. The vacuum insulated glass unit frame assembly according to claim 2, wherein an interconnecting wall part of the holding part interconnects said holding members and provides a bottom wall member of the recess receiving the vacuum insulated glass unit edge.

5. The vacuum insulated glass unit frame assembly according to claim 2, wherein said vacuum insulated glass unit is fixed between said holding members by means of fixation arrangements arranged between the respective holding member and an outwardly facing surface of the vacuum insulated glass unit, wherein said fixation arrangements comprises one or more suspension elements compressed between a first of said holding members and one of said opposite outwardly facing surfaces, and one or more resilient suspension elements compressed between a second of said holding members and the other of said opposite outwardly facing surfaces, wherein said compressed, resilient suspension elements provides a holding force towards said opposite outwardly facing surfaces of the vacuum insulated glass unit so as to suspend the vacuum insulated glass unit between said first and second holding members, and wherein each of said compressed, resilient suspension elements are configured to be further compressed or expand in response to said thermal deflection of the edge of the vacuum insulated glass unit due to a temperature difference ($\Delta T=T1-T2$) between the two glass sheets.

6. The vacuum insulated glass unit frame assembly according to claim 1, wherein said flexible connection arrangements comprises one or more wall members configured to provide said flexing and wherein a wall member of said one or more wall members of the flexible connection arrangement is configured to provide or support one of said holding members of the holding part.

7. The vacuum insulated glass unit frame assembly according to claim 1, wherein a flexing space is provided between an outwardly facing major surface of the vacuum insulated glass unit and said elongated frame profile arrangements to which the individual holding part is connected, wherein one or more distancing walls of the flexible connection arrangement provides said flexing space, and wherein said vacuum insulated glass unit is configured to flex towards and away from said flexing space in response to said bending moment.

8. The vacuum insulated glass unit frame assembly according to claim 7, wherein the minimum distance between an outer surface of the elongated frame profile arrangement facing the flexing space, and a surface of a holding member of the holding part proximate to and facing the flexing space is at least 0.4 cm when the temperature difference ($\Delta T=T1-T2$) of the glass sheets (2a, 2b) of the vacuum insulated glass unit is 0° C.

9. The vacuum insulated glass unit frame assembly according to claim 7, wherein a separation wall arrangement is arranged between said flexing space and the frame opening.

10. The vacuum insulated glass unit frame assembly according to claim 1, wherein said flexible connection arrangements comprises a wall member extending from said holding member, wherein the wall member comprises one or more bends towards and/or away from a plane, wherein said plane extends substantially perpendicularly to said frame opening and is substantially parallel to the respective edge of the vacuum insulated glass unit held by the holding part.

11. The vacuum insulated glass unit frame assembly according to claim 1, wherein an elongated tightening gaskets or sealing is/are arranged between said frame opening and the flexible connection arrangement, and wherein said elongated tightening gaskets or sealing provides a tightening between a major surface of the vacuum insulated glass unit and said frame.

12. The vacuum insulated glass unit frame assembly according to claim 1, wherein said flexible connection arrangements and holding parts are integrated in the same frame profile which is an extruded, moulded and/or pultruded profile.

13. The vacuum insulated glass unit frame assembly according to claim 1, wherein said flexible connection arrangements, elongated frame profile arrangements and holding parts are integrated in the same frame profile which is an extruded, moulded or pultruded profile.

14. The vacuum insulated glass unit frame assembly according to claim 1, wherein said flexible connection arrangements comprises a plurality of discrete flexible wall members distributed in the longitudinal direction of the edge of the vacuum insulated glass unit to which the flexible wall members are connected.

15. The vacuum insulated glass unit frame assembly according to claim 1, wherein the magnitude of the thermal deflection of the edges of the vacuum insulated glass unit is configured to vary along one or more of the vacuum insulated glass unit edges between the corners where the respective edge terminates due to said temperature difference ($\Delta T=T1-T2$) between the two glass sheets, thereby describing an edge deflection curve relative to a frame opening plane defined between the elongated frame profile arrangements.

16. The vacuum insulated glass unit frame assembly according to claim 1, wherein all four edges of said vacuum insulated glass unit are allowed to thermally deflect in a deflection direction perpendicular to the frame opening plane defined between the elongated frame profile arrangements due to a temperature difference ($\Delta T=T1-T2$) between the two glass sheets.

17. The vacuum insulated glass unit frame assembly according to claim 1, wherein said holding part is configured so as to allow a shift in the direction of the thermal deflection of the corners and/or centre parts of the edges of the vacuum insulated glass unit in response to a change in the temperature difference ($\Delta T=T1-T2$) between the two glass sheets of the vacuum insulated glass unit.

18. A vacuum insulated glass unit frame assembly, wherein said vacuum insulated glass unit frame assembly comprises:
 a rectangular vacuum insulated glass unit comprising at least two glass sheets separated by a gap between said glass sheets, wherein a plurality of support structures are distributed in said gap and wherein said gap is sealed, and
 a frame comprising elongated frame profile arrangements which frames said vacuum insulated glass unit in a frame opening, the frame further comprising:
  holding parts for fixating said vacuum insulated glass unit, and
  flexible connection arrangements connecting the holding parts to elongated frame profile arrangements,
 wherein said flexible connection arrangements are configured to flex when said vacuum insulated glass unit exerts a bending moment on the holding parts, so that said holding parts will move relative to the elongated frame profile arrangements to which the individual holding part is connected;
  wherein the largest total edge deflection of any of the edges of the vacuum insulated glass unit at a temperature difference ($\Delta T=T1-T2$) between the two glass sheets of 65° C. as compared to the vacuum insulated glass unit at a temperature difference ($\Delta T=T1-T2$) of 0° C. is at least 0.3% of the length of the deflecting edge.

* * * * *